US012374342B2

(12) United States Patent
Disch et al.

(10) Patent No.: US 12,374,342 B2
(45) Date of Patent: Jul. 29, 2025

(54) MULTI-CHANNEL AUDIO DECODER, MULTI-CHANNEL AUDIO ENCODER, METHODS, COMPUTER PROGRAM AND ENCODED AUDIO REPRESENTATION USING A DECORRELATION OF RENDERED AUDIO SIGNALS

(71) Applicant: Fraunhofer-Gesellschaft zur Foerderung der angewandten Forschung e.V., Munich (DE)

(72) Inventors: Sascha Disch, Fuerth (DE); Harald Fuchs, Roettenbach (DE); Oliver Hellmuth, Budenhof (DE); Juergen Herre, Erlangen (DE); Adrian Murtaza, Craiova (RO); Jouni Paulus, Nuremberg (DE); Falko Ridderbusch, V, Augsburg (DE); Leon Terentiv, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/059,832

(22) Filed: Aug. 9, 2018

(65) Prior Publication Data

US 2018/0350375 A1 Dec. 6, 2018

Related U.S. Application Data

(63) Continuation of application No. 15/004,548, filed on Jan. 22, 2016, now Pat. No. 10,431,227, which is a (Continued)

(30) Foreign Application Priority Data

| | | |
|---|---|---|
| Jul. 22, 2013 | (EP) | 13177374 |
| Oct. 18, 2013 | (EP) | 13189345 |
| Mar. 25, 2014 | (EP) | 14161611 |

(51) Int. Cl.

| | |
|---|---|
| ***G10L 19/008*** | (2013.01) |
| ***H04S 3/00*** | (2006.01) |
| ***H04S 3/02*** | (2006.01) |

(52) U.S. Cl.
CPC ............ *G10L 19/008* (2013.01); *H04S 3/008* (2013.01); *H04S 3/02* (2013.01); *H04S 2400/03* (2013.01);
(Continued)

(58) Field of Classification Search
CPC ..... G10L 19/00; G10L 19/0017; G10L 19/02; G10L 19/04; G10L 19/005; G10L 19/008;
(Continued)

(56) References Cited

U.S. PATENT DOCUMENTS

| | | |
|---|---|---|
| 8,255,228 B2 | 8/2012 | Hilpert et al. |
| 8,588,427 B2 | 11/2013 | Uhle et al. |

(Continued)

FOREIGN PATENT DOCUMENTS

| | | |
|---|---|---|
| CN | 1926607 A | 3/2007 |
| CN | 101010723 A | 8/2007 |

(Continued)

OTHER PUBLICATIONS

"ISO/IEC 23003: 2006(E), Part 1: MPEG Surround", 75. MPEG Meeting; Jan. 16, 2006-Jan. 20, 2006; Bangkok; No. N7947, Mar. 3, 2006, XP030014439, ISSN:0000-0341, pp. 1-289, provided in IDS filed on Mar. 6, 2017 (Year: 2006).*

(Continued)

*Primary Examiner* — Leshui Zhang
(74) *Attorney, Agent, or Firm* — Perkins Coie LLP; Michael A. Glenn

(57) ABSTRACT

A multi-channel audio decoder for providing at least two output audio signals on the basis of an encoded representation is configured to render a plurality of decoded audio signals, which are obtained on the basis of the encoded representation, in dependence on one or more rendering parameters, to obtain a plurality of rendered audio signals. The multi-channel audio decoder is configured to derive one or more decorrelated audio signals from the rendered audio signals, and to combine the rendered audio signals, or a scaled version thereof, with the one or more decorrelated audio signals, to obtain the output audio signals. A multi-channel audio encoder provides a decorrelation method parameter to control an audio decoder.

47 Claims, 40 Drawing Sheets

Related U.S. Application Data continuation of application No. PCT/EP2014/065397, filed on Jul. 17, 2014.

(52) U.S. Cl.
CPC ....... *H04S 2400/11* (2013.01); *H04S 2420/03* (2013.01)

(58) Field of Classification Search
CPC ....... G10L 19/18; G10L 19/24; G10L 19/167; G10L 21/0208; G10L 21/0205; G10L 19/002; G10L 19/0204–038; G10L 19/20; G10L 19/08; H04R 3/005; H04R 3/12; H04R 25/407; H04R 25/30; H04R 25/00; H04R 25/01; H04R 29/00; H04R 5/02; H04H 60/58; G11B 2020/00057; H04S 2420/03; H04S 2420/13; H04S 1/00; H04S 3/00; H04S 3/02; H04S 3/008; H04S 2400/11; H04S 2400/03; H04S 3/11; H04N 19/00781; H04N 19/00775; H04N 21/2368; H04N 21/4394; H04N 19/00951; H04L 27/01; H04B 7/17; H04B 15/00; H04B 3/20; H04B 3/23; H04M 1/00; G10K 11/16
USPC ....... 381/1, 2, 15, 16, 17–23, 302, 303, 306, 381/307, 309, 310, 311, 26, 61, 86, 91, 381/92, 94, 94.3, 94.4, 97, 98, 103, 11, 381/77, 80; 704/200, 203, 205, 258, 263, 704/237, 216, 217, 218, 13.005, 19.005, 704/10.001, 19.042, 19.048, 500–504; 455/450; 700/94
See application file for complete search history.

(56) References Cited

U.S. PATENT DOCUMENTS 8,818,764 B2 8/2014 Kishi et al.
2006/0083385 A1 4/2006 Allamanche et al.
2006/0165238 A1* 7/2006 Spille ....................... G10L 19/00 381/23
2007/0121954 A1* 5/2007 Kim ......................... H04S 3/008 381/307
2007/0189426 A1* 8/2007 Kim ....................... G10L 19/008 375/343
2007/0194952 A1 8/2007 Breebaart et al.
2007/0233296 A1* 10/2007 Kim ....................... G10L 19/008 700/94
2007/0236858 A1 10/2007 Disch et al.
2008/0097750 A1 4/2008 Seefeldt et al.
2008/0126104 A1* 5/2008 Seefeldt ................ G10L 19/008 704/503
2009/0003635 A1* 1/2009 Pang ....................... H04S 1/007 381/307
2009/0080666 A1 3/2009 Uhle et al.
2009/0110203 A1 4/2009 Taleb
2009/0147975 A1 6/2009 Horbach et al.
2009/0185693 A1* 7/2009 Johnston ................. H04S 3/002 381/17
2009/0194756 A1 8/2009 Kau et al.
2009/0240503 A1* 9/2009 Miyasaka ................. H04S 3/02 704/500
2009/0262949 A1 10/2009 Takagi et al.
2009/0274308 A1 11/2009 Oh et al.
2010/0094631 A1 4/2010 Engdegard et al.
2010/0153118 A1 6/2010 Hotho et al.
2010/0226500 A1 9/2010 Wang et al.
2010/0329466 A1 12/2010 Berge
2011/0013790 A1 1/2011 Hilpert et al.
2011/0022402 A1 1/2011 Engdegard et al.
2011/0091045 A1* 4/2011 Schuijers ................. H04R 5/04 381/22
2011/0106543 A1* 5/2011 Jaillet ................... G10L 19/008 704/500
2011/0182432 A1 7/2011 Ishikawa et al.
2011/0194712 A1* 8/2011 Potard ..................... H04S 1/002 381/300
2011/0255714 A1 10/2011 Neusinger et al.
2011/0264456 A1* 10/2011 Koppens ............... G10L 19/008 704/500
2012/0076308 A1 3/2012 Kuech et al.
2012/0143613 A1 6/2012 Herre et al.
2012/0177204 A1* 7/2012 Hellmuth .............. G10L 19/008 381/22
2012/0207307 A1 8/2012 Engdegard et al.
2013/0138446 A1 5/2013 Hellmuth et al.
2015/0296086 A1 10/2015 Eckert et al.
2016/0005406 A1* 1/2016 Yen ....................... G10L 19/008 381/23
2016/0157039 A1 6/2016 Disch et al.

FOREIGN PATENT DOCUMENTS

| | | | |
|---|---|---|---|
| CN | 101061751 | A | 10/2007 |
| CN | 101253810 | A | 8/2008 |
| CN | 101809654 | A | 8/2010 |
| CN | 101911732 | A | 12/2010 |
| CN | 101933344 | A | 12/2010 |
| EP | 2093911 | A2 | 8/2009 |
| EP | 2102856 | A1 | 9/2009 |
| EP | 2225893 | B1 | 9/2012 |
| EP | 2495723 | A1 | 9/2012 |
| JP | 2008511044 | A | 4/2008 |
| JP | 2009531724 | A | 9/2009 |
| JP | 2009539283 | A | 11/2009 |
| JP | 2010507114 | A | 3/2010 |
| JP | 2010525403 | A | 7/2010 |
| JP | 2012505575 | A | 3/2012 |
| JP | 2012530952 | A | 12/2012 |
| JP | 6434013 | B2 | 11/2018 |
| JP | 6687683 | B2 | 4/2020 |
| KR | 20070094422 | A | 9/2007 |
| RU | 2439719 | C2 | 1/2012 |
| RU | 2011100135 | A | 7/2012 |
| TW | 200627380 | A | 8/2006 |
| TW | 200803190 | A | 1/2008 |
| TW | 200828269 | A | 7/2008 |
| TW | 200915300 | A | 4/2009 |
| TW | 201108204 | A | 3/2011 |
| WO | 2006026452 | A1 | 3/2006 |
| WO | 2007109338 | | 9/2007 |
| WO | 2007111568 | A2 | 10/2007 |
| WO | 2007140809 | A1 | 12/2007 |
| WO | 2008069593 | A1 | 6/2008 |
| WO | 2008131903 | A1 | 11/2008 |
| WO | 2012009851 | A1 | 1/2012 |
| WO | 2012025282 | A1 | 3/2012 |
| WO | 2012025283 | A1 | 3/2012 |
| WO | 2013064957 | A1 | 5/2013 |
| WO | 2014126689 | A1 | 8/2014 |

OTHER PUBLICATIONS

"ISO/IEC 23003-2, 1st edit, Part 2: Spatial Audio Object Coding SAOC", 1st edition, Oct. 1, 2010, pp. 1-138 (Year: 2010).*
"Spatial Audio Object Coding SAOC—The Upcoming MPEG Standard on Parametric Object Based Audio Coding", Audio Engineering Society Convention Paper 7377, the 124th Convention, Amsterdam, The Netherlands, May 17-20, 2008, pp. 1-15 (Year: 2008).*
"MPEG Surround—The ISO/MPEG Standard for Efficient and Compatiable Multi-Channel Audio Coding" by Jurgen Herre et al., AES 122nd Convention, Vienna, Austria, pp. 1-23, May 5-8, (Year: 2007).*
Taiwanese Office Action dated Jan. 26, 2016, Taiwan Patent Appl. No. 103124969 with English Translation, 7 pages.
"Iso/Iec 23003-1:2006/FCD, Mpeg Surround", Motion Pictureexpert Group or Iso/Iec JTC1/SC29/WG11; No. N7947, Jan. 16-20, 2006, pp. 1-178.

(56) References Cited

OTHER PUBLICATIONS

"Iso/Iec Fdis 23003-2: 2010, Spatial Audio Object Coding", Motion Picture Expertgroup or Iso/Iec JTC1/SC29/WG11 No. N11207, Issn 0000-0030, XP030017704 [Da] 3 *Section 3.1.1*, Jan. 18-22, 2010, pp. 79-127.
Blauert, J. , "Spatial Hearing - The Psychophysics of Human Sound Localization", Revised Edition, The MIT Press, London, 1997,.
Breebaart, J et al., "MPEG Spatial Audio Coding/MPEG Surround: Overview and Current Status", Audio Engineering Society Convention Paper presented at the 119th Convention, Oct. 7-10, 2005, pp. 1-17.
Engdegard, J et al., "Spatial Audio Object Coding (SAOC) - The Upcoming MPEG Standard on Parametric Object Based Audio Coding", 124th AES Convention, Amsterdam, 2008,.
Faller, C et al., "Binaural Cue Coding - Part II: Schemes and applications", IEEE Trans. on Speech and Audio Proc., vol. 11, No. 6, Nov. 2003,.
Faller, C. , "Parametric Joint-Coding of Audio Sources", AES Convention Paper 6752, Presented at the 120th Convention, Paris, France, May 20-23, 2006, 12 pages.
Girin, L et al., "Informed Audio Source Separation from Compressed Linear Stereo Mixtures", AES 42nd International Conference: Semantic Audio, Ilmenau, Germany, Jul. 22-24, 2011, 10 pages.
Herre, Jurgen et al., "From SAC To SAOC - Recent Developments in Parametric Coding of Spatial Audio", Fraunhofer Institute for Integrated Circuits, Illusions in Sound, AES 22nd UK Conference 2007,, Apr. 2007, pp. 12-1 through 12-8.
Herre, Jurgen et al., "MPEG Surround-The ISO/MPEG Standard for Efficient and Compatible Multichannel Audio Coding", J. Audio Eng. Soc., vol. 56, No. 11, Nov. 2008, pp. 932-955.
Herre, Jurgen et al., "New Concepts in Parametric Coding of Spatial Audio: From SAC to Saoc", IEEE International Conference On Multimedia and Expo; Isbn 978-1- 4244-1016-3, Jul. 2-5, 2007, pp. 1894-1897.
ISO/IEC, , "Information Technology - MPEG Audio Technologies - Part 1: MPEG Surround", Iso/Iec Fdis 23003-1:2006(E), Iso/Iec Jtc 1/SC 29/WG11, Jul. 21, 2006, 289 pages.
ISO/IEC, , "Information Technology: Generic coding of moving pictures an associated audio information", Part 7: Advanced Audio Coding Aac, Iso/Iec 13818-7 IE, 2003, 198 pages.
ISO/IEC, , "Information Technology-MPEG Audio Technologies-Part 1: MPEG Surround", Iso/Iec 23003-1:2007(E), Feb. 15, 2007, 288 pages.
ISO/IEC, , "Informational Technology-MPEG audio technologies Part 2: Spatial Audio Object Coding (Saoc)", Iso/Iec 23003-2 1ST Edition 2010-10-01, Oct. 1, 2010, 138 pages.
ISO/IEC, , "MPEG audio technologies - Part 2: Spatial Audio Object Coding (Saoc)", Iso/Iec JTC1/SC29/WG11 (Mpeg) International Standard 23003-2., Oct. 1, 2010, pp. 1-130.
ISO/IEC 23003-1: 2007, , "Information technology - MPEG audio technologies - Part 1: MPEG Surround", Iso/Iec JTC1/SC29/WG11 (Mpeg) International Standard:, 2007-02-15, 288 pages.
ISO/IEC 23003-1:2006, , "MPEG Surround", MPEG Meeting, 1/16/2006- Jan. 20, 2006, Bangkok; Motion Picture Expert Group or Iso/Iec JTC1/ SC29/ WG11, Mar. 3, 2006,.
ISO/IEC 23003-3, , "Information Technology- MPEG audio technologies- Part 3: Unified Speech and Audio Coding", 2012, 286 pages.
Lang, Yue et al., "Novel Low Complexity Coherence Estimation and Synthesis Algorithms for Parametric Stereo Coding", Huawei European Research Center, Germany. Illusonic GmbH, Switzerland., 20th European Signal Processing Conference, Bucharest, Romania, Aug. 27, 2012, pp. 2427-2431.
Liutkus, A et al., "Informed source separation through spectrogram coding and data embedding", Signal Processing Journal, Jul. 18, 2011, 30 pages.
Ozerov, A et al., "Informed source separation: source coding meets source separation", IEEE Workshop on Applications of Signal Processing to Audio and Acoustics, 2011,.
Parvaix, M et al., "A Watermarking-Based Method for Informed Source Separation of Audio Signals With a Single Sensor", IEEE Transactions on Audio, Speech and Language Processing, vol. 18, No. 6, May 26, 2010, pp. 1464-1475.
Parvaix, M et al., "Informed Source Separation of underdetermined instantaneous Stereo Mixtures using Source Index Embedding", IEEE Icassp, Mar. 2010, pp. 245-248.
Mlkamo, J et al., "Optimized covariance domain framework for time-frequency processing of spatial audio", Journal of the Audio Engineering Society, vol. 61, No. 6, Jun. 2013, pp. 403-411.
Zhang, S et al., "An informed source separation system for speech signals", 12th Annual Conference of the International Speech Communication Association (Interspeech 2011), Aug. 2011, pp. 573-576.

* cited by examiner

OVERVIEW OF AN MMSE BASED PARAMETRIC DOWNMIX/UPMIX CONCEPT

Geometric representation for orthogonality principle in three-dimensional space

PARAMETRIC RECONSTRUCTION SYSTEM WITH DECORRELATION APPLIED ON RENDERED OUTPUT

DECORRELATAION UNIT

REDUCED COMPLEXITY DECORRELATAION UNIT

Loudspeaker positions and output formats 1800

| | | | | | | output formats | | | | | |
|---|---|---|---|---|---|---|---|---|---|---|---|
| No. | LS Label | Az. ° | Az. Tol. ° | El. ° | El. Tol. ° | 0-2.0 | 0-5.1 | 0-7.1 | 0-8.1 | 0-10.1 | 0-22.2 |
| 1 | CH_M_000 | 0 | ±2 | 0 | ±2 | | 3 | 3 | | 3 | 3 |
| 2 | CH_M_L030 | 30 | ±2 | 0 | ±2 | 1 | 1 | 1 | 1 | 1 | 7 |
| 3 | CH_M_R030 | -30 | ±2 | 0 | ±2 | 2 | 2 | 2 | 2 | 2 | 8 |
| 4 | CH_M_L060 | 60 | ±2 | 0 | ±2 | | | | | | 1 |
| 5 | CH_M_R060 | -60 | ±2 | 0 | ±2 | | | | | | 2 |
| 6 | CH_M_L090 | 90 | ±5 | 0 | ±2 | | | | | | 11 |
| 7 | CH_M_R090 | -90 | ±5 | 0 | ±2 | | | | | | 12 |
| 8 | CH_M_L110 | 110 | ±5 | 0 | ±2 | | 5 | 5 | 5 | 5 | |
| 9 | CH_M_R110 | -110 | ±5 | 0 | ±2 | | 6 | 6 | 6 | 6 | |
| 10 | CH_M_L135 | 135 | ±5 | 0 | ±2 | | | | | | 5 |
| 11 | CH_M_R135 | -135 | ±5 | 0 | ±2 | | | | | | 6 |
| 12 | CH_M_180 | 180 | ±5 | 0 | ±2 | | | | | | 9 |
| 13 | CH_U_000 | 0 | ±2 | 35 | ±10 | | | | 3 | | 15 |
| 14 | CH_U_L045 | 45 | ±5 | 35 | ±10 | | | | | | 13 |
| 15 | CH_U_R045 | -45 | ±5 | 35 | ±10 | | | | | | 14 |
| 16 | CH_U_L030 | 30 | ±5 | 35 | ±10 | | | 7 | 7 | 7 | |
| 17 | CH_U_R030 | -30 | ±5 | 35 | ±10 | | | 8 | 8 | 8 | |
| 18 | CH_U_L090 | 90 | ±5 | 35 | ±10 | | | | | | 19 |
| 19 | CH_U_R090 | -90 | ±5 | 35 | ±10 | | | | | | 20 |
| 20 | CH_U_L110 | 110 | ±5 | 35 | ±10 | | | | | 9 | |
| 21 | CH_U_R110 | -110 | ±5 | 35 | ±10 | | | | | 10 | |
| 22 | CH_U_L135 | 135 | ±5 | 35 | ±10 | | | | | | 17 |
| 23 | CH_U_R135 | -135 | ±5 | 35 | ±10 | | | | | | 18 |
| 24 | CH_U_180 | 180 | ±5 | 35 | ±10 | | | | | | 21 |
| 25 | CH_T_000 | 0 | ±2 | 90 | ±10 | | | | | 11 | 16 |
| 26 | CH_L_000 | 0 | ±2 | -15 | +5-25 | | | | 9 | | 22 |
| 27 | CH_L_L045 | 45 | ±5 | -15 | +5-25 | | | | | | 23 |
| 28 | CH_L_R045 | -45 | ±5 | -15 | +5-25 | | | | | | 24 |
| 29 | CH_LFE1 | 45 | ±15 | -15 | ±15 | | 4 | 4 | 4 | 4 | 4 |
| 30 | CH_LFE2 | -45 | ±15 | -15 | ±15 | | | | | | 10 |

1810 1820 1830 1832 1840 1842 1850 1860 1864 1870 1880 1890

FIG 18

Complexity reduction for 22.2 output format

- Premixing coefficients for N=22 and K=11, $\mathrm{cond}(M_{pre}M_{pre}^{H})=1$.

1910

| Ch. ID | CH_M_000 | CH_L_000 | CH_U_000 | CH_T_000 | CH_M_L135 | CH_U_L135 | CH_M_R135 | CH_U_R135 | CH_M_180 | CH_U_180 | CH_M_L030 | CH_L_L045 | CH_M_R030 | CH_L_R045 | CH_M_L090 | CH_U_L090 | CH_M_R090 | CH_U_R090 | CH_M_L060 | CH_U_L045 | CH_M_R060 | CH_U_R045 |
|---|---|---|---|---|---|---|---|---|---|---|---|---|---|---|---|---|---|---|---|---|---|---|
| $M_{pre}^{i,j}$ | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 |
| 2 | 0 | 0 | 1 | 1 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 1 | 1 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 1 | 1 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 1 | 1 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 1 | 1 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 1 | 1 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 | 1 | 1 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 | 1 | 1 | 0 | 0 | 0 | 0 |
| 10 | 0 | 0 | 0 | 0 | 0 | 0 | 0 | 0 | 0 | 0 | 0 | 0 | 0 | 0 | 0 | 0 | 0 | 0 | 1 | 1 | 0 | 0 |
| 11 | 0 | 0 | 0 | 0 | 0 | 0 | 0 | 0 | 0 | 0 | 0 | 0 | 0 | 0 | 0 | 0 | 0 | 0 | 0 | 0 | 1 | 1 |

FIG 19A

- Premixing coefficients for N=22 and K=10, cond($M_{pre}M_{pre}^H$)=2.

| Ch. ID | CH_M_000 | CH_L_000 | CH_U_000 | CH_T_000 | CH_M_L135 | CH_U_L135 | CH_M_R135 | CH_U_R135 | CH_M_180 | CH_U_180 | CH_M_L030 | CH_L_L045 | CH_M_R030 | CH_L_R045 | CH_M_L090 | CH_U_L090 | CH_M_R090 | CH_U_R090 | CH_M_L060 | CH_U_L045 | CH_M_R060 | CH_U_R045 |
|---|---|---|---|---|---|---|---|---|---|---|---|---|---|---|---|---|---|---|---|---|---|---|
| $M_{pre}^{i,j}$ | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 1 | 1 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 1 | 1 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 1 | 1 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 1 | 1 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 1 | 1 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 1 | 1 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 | 0 | 1 | 1 | 0 | 0 | 0 | 0 |
| 9 | 0 | 0 | 0 | 0 | 0 | 0 | 0 | 0 | 0 | 0 | 0 | 0 | 0 | 0 | 0 | 0 | 0 | 0 | 1 | 1 | 0 | 0 |
| 10 | 0 | 0 | 0 | 0 | 0 | 0 | 0 | 0 | 0 | 0 | 0 | 0 | 0 | 0 | 0 | 0 | 0 | 0 | 0 | 0 | 1 | 1 |

FIG 19B

- Premixing coefficients for N=22 and K=9, $cond(M_{pre}M_{pre}^{H})=2$.

| Ch. ID | CH_M_000 | CH_L_000 | CH_U_000 | CH_T_000 | CH_M_L135 | CH_U_L135 | CH_M_R135 | CH_U_R135 | CH_M_180 | CH_U_180 | CH_M_L030 | CH_L_L045 | CH_M_R030 | CH_L_R045 | CH_M_L090 | CH_U_L090 | CH_M_R090 | CH_U_R090 | CH_M_L060 | CH_U_L045 | CH_M_R060 | CH_U_R045 |
|---|---|---|---|---|---|---|---|---|---|---|---|---|---|---|---|---|---|---|---|---|---|---|
| $M_{pre}^{i,j}$ | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 1 | 1 | 1 | 1 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 1 | 1 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 1 | 1 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 1 | 1 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 1 | 1 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 | 1 | 1 | 0 | 0 | 0 | 0 |
| 8 | 0 | 0 | 0 | 0 | 0 | 0 | 0 | 0 | 0 | 0 | 0 | 0 | 0 | 0 | 0 | 0 | 0 | 0 | 1 | 1 | 0 | 0 |
| 9 | 0 | 0 | 0 | 0 | 0 | 0 | 0 | 0 | 0 | 0 | 0 | 0 | 0 | 0 | 0 | 0 | 0 | 0 | 0 | 0 | 1 | 1 |

FIG 19C

- Premixing coefficients for N=22 and K=8, $cond(M_{pre}M_{pre}^{H})=2$.

| Ch. ID | CH_M_000 | CH_L_000 | CH_U_000 | CH_T_000 | CH_M_L135 | CH_U_L135 | CH_M_R135 | CH_U_R135 | CH_M_180 | CH_U_180 | CH_M_L030 | CH_L_L045 | CH_M_R030 | CH_L_R045 | CH_M_L090 | CH_U_L090 | CH_M_R090 | CH_U_R090 | CH_M_L060 | CH_U_L045 | CH_M_R060 | CH_U_R045 |
|---|---|---|---|---|---|---|---|---|---|---|---|---|---|---|---|---|---|---|---|---|---|---|
| $M_{pre}^{i,j}$ | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 1 | 1 | 1 | 1 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 1 | 1 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 1 | 1 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 1 | 1 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 1 | 1 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 | 1 | 1 | 0 | 0 | 0 | 0 |
| 8 | 0 | 0 | 0 | 0 | 0 | 0 | 0 | 0 | 0 | 0 | 0 | 0 | 0 | 0 | 0 | 0 | 0 | 0 | 1 | 1 | 1 | 1 |

FIG 19D

- Premixing coefficients for N=22 and K=7, $cond(M_{pre} M_{pre}^{H}) = 2$.

| Ch. ID | CH_M_000 | CH_L_000 | CH_U_000 | CH_T_000 | CH_M_L135 | CH_U_L135 | CH_M_R135 | CH_U_R135 | CH_M_180 | CH_U_180 | CH_M_L030 | CH_L_L045 | CH_M_R030 | CH_L_R045 | CH_M_L090 | CH_U_L090 | CH_M_R090 | CH_U_R090 | CH_M_L060 | CH_U_L045 | CH_M_R060 | CH_U_R045 |
|---|---|---|---|---|---|---|---|---|---|---|---|---|---|---|---|---|---|---|---|---|---|---|
| $M_{pre}^{i,j}$ | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 1 | 1 | 1 | 1 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 1 | 1 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 1 | 1 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 1 | 1 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 1 | 1 | 1 | 1 | 0 | 0 | 0 | 0 |
| 7 | 0 | 0 | 0 | 0 | 0 | 0 | 0 | 0 | 0 | 0 | 0 | 0 | 0 | 0 | 0 | 0 | 0 | 0 | 1 | 1 | 1 | 1 |

FIG 19E

- Premixing coefficients for N=22 and K=6, $cond(M_{pre}M_{pre}^{H})=2$.

| Ch. ID | CH_M_000 | CH_L_000 | CH_U_000 | CH_T_000 | CH_M_L135 | CH_U_L135 | CH_M_R135 | CH_U_R135 | CH_M_180 | CH_U_180 | CH_M_L030 | CH_L_L045 | CH_M_R030 | CH_L_R045 | CH_M_L090 | CH_U_L090 | CH_M_R090 | CH_U_R090 | CH_M_L060 | CH_U_L045 | CH_M_R060 | CH_U_R045 |
|---|---|---|---|---|---|---|---|---|---|---|---|---|---|---|---|---|---|---|---|---|---|---|
| $M_{pre}^{i,j}$ | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 1 | 1 | 1 | 1 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 1 | 1 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 1 | 1 | 1 | 1 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 1 | 1 | 1 | 1 | 0 | 0 | 0 | 0 |
| 6 | 0 | 0 | 0 | 0 | 0 | 0 | 0 | 0 | 0 | 0 | 0 | 0 | 0 | 0 | 0 | 0 | 0 | 0 | 1 | 1 | 1 | 1 |

FIG 19F

- Premixing coefficients for N=22 and K=5, cond($M_{pre}M_{pre}^{H}$)=1.5.

| Ch. ID | CH_M_000 | CH_L_000 | CH_U_000 | CH_T_000 | CH_M_L135 | CH_U_L135 | CH_M_R135 | CH_U_R135 | CH_M_180 | CH_U_180 | CH_M_L030 | CH_L_L045 | CH_M_R030 | CH_L_R045 | CH_M_L090 | CH_U_L090 | CH_M_R090 | CH_U_R090 | CH_M_L060 | CH_U_L045 | CH_M_R060 | CH_U_R045 |
|---|---|---|---|---|---|---|---|---|---|---|---|---|---|---|---|---|---|---|---|---|---|---|
| $M_{pre}^{i,j}$ | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 1 | 1 | 1 | 1 | 1 | 1 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 1 | 1 | 1 | 1 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 1 | 1 | 1 | 1 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 | 0 | 1 | 1 | 1 | 1 |

FIG 19G

Complexity reduction for 10.1 output format

- Premixing coefficients for N=10 and K=5, $cond(M_{pre}M_{pre}^{H})=1$.

| Ch. ID | CH_M_L030 | CH_U_L030 | CH_M_R030 | CH_U_R030 | CH_M_000 | CH_T_000 | CH_M_L110 | CH_U_L110 | CH_M_R110 | CH_U_R110 |
|---|---|---|---|---|---|---|---|---|---|---|
| $M_{pre}^{i,j}$ | 1 | 2 | 3 | 4 | 5 | 6 | 7 | 8 | 9 | 10 |
| 1 | 1 | 1 | 0 | 0 | 0 | 0 | 0 | 0 | 0 | 0 |
| 2 | 0 | 0 | 1 | 1 | 0 | 0 | 0 | 0 | 0 | 0 |
| 3 | 0 | 0 | 0 | 0 | 1 | 1 | 0 | 0 | 0 | 0 |
| 4 | 0 | 0 | 0 | 0 | 0 | 0 | 1 | 1 | 0 | 0 |
| 5 | 0 | 0 | 0 | 0 | 0 | 0 | 0 | 0 | 1 | 1 |

FIG 20A

- Premixing coefficients for N=10 and K=4, $cond(M_{pre}M_{pre}^{H})=2$.

| Ch. ID | CH_M_L030 | CH_U_L030 | CH_M_R030 | CH_U_R030 | CH_M_000 | CH_T_000 | CH_M_L110 | CH_U_L110 | CH_M_R110 | CH_U_R110 |
|---|---|---|---|---|---|---|---|---|---|---|
| $M_{pre}^{i,j}$ | 1 | 2 | 3 | 4 | 5 | 6 | 7 | 8 | 9 | 10 |
| 1 | 1 | 1 | 0 | 0 | 0 | 0 | 0 | 0 | 0 | 0 |
| 2 | 0 | 0 | 1 | 1 | 0 | 0 | 0 | 0 | 0 | 0 |
| 3 | 0 | 0 | 0 | 0 | 1 | 1 | 0 | 0 | 0 | 0 |
| 4 | 0 | 0 | 0 | 0 | 0 | 0 | 1 | 1 | 1 | 1 |

FIG 20B

- Premixing coefficients for N=10 and K=3, cond($M_{pre}M_{pre}^{H}$)=2.

| Ch. ID | CH_M_L030 | CH_U_L030 | CH_M_R030 | CH_U_R030 | CH_M_000 | CH_T_000 | CH_M_L110 | CH_U_L110 | CH_M_R110 | CH_U_R110 |
|---|---|---|---|---|---|---|---|---|---|---|
| $M_{pre}^{i,j}$ | 1 | 2 | 3 | 4 | 5 | 6 | 7 | 8 | 9 | 10 |
| 1 | 1 | 1 | 1 | 1 | 0 | 0 | 0 | 0 | 0 | 0 |
| 2 | 0 | 0 | 0 | 0 | 1 | 1 | 0 | 0 | 0 | 0 |
| 3 | 0 | 0 | 0 | 0 | 0 | 0 | 1 | 1 | 1 | 1 |

FIG 20C

- Premixing coefficients for N=10 and K=2, cond($M_{pre}M_{pre}^{H}$)=1.5.

| Ch. ID | CH_M_L030 | CH_U_L030 | CH_M_R030 | CH_U_R030 | CH_M_000 | CH_T_000 | CH_M_L110 | CH_U_L110 | CH_M_R110 | CH_U_R110 |
|---|---|---|---|---|---|---|---|---|---|---|
| $M_{pre}^{i,j}$ | 1 | 2 | 3 | 4 | 5 | 6 | 7 | 8 | 9 | 10 |
| 1 | 1 | 1 | 1 | 1 | 1 | 1 | 0 | 0 | 0 | 0 |
| 2 | 0 | 0 | 0 | 0 | 0 | 0 | 1 | 1 | 1 | 1 |

FIG 20D

Complexity reduction for 8.1 output format

- Premixing coefficients for N=8 and K=4, $cond(M_{pre}M_{pre}^{H})=1$.

| Ch. ID | CH_M_L030 | CH_U_L030 | CH_M_R030 | CH_U_R030 | CH_M_000 | CH_T_000 | CH_M_L110 | CH_M_R110 |
|---|---|---|---|---|---|---|---|---|
| $M_{pre}^{i,j}$ | 1 | 2 | 3 | 4 | 5 | 6 | 7 | 8 |
| 1 | 1 | 1 | 0 | 0 | 0 | 0 | 0 | 0 |
| 2 | 0 | 0 | 1 | 1 | 0 | 0 | 0 | 0 |
| 3 | 0 | 0 | 0 | 0 | 1 | 1 | 0 | 0 |
| 4 | 0 | 0 | 0 | 0 | 0 | 0 | 1 | 1 |

FIG 21A

- Premixing coefficients for N=8 and K=3, $cond(M_{pre}M_{pre}^{H})=2$.

| Ch. ID | CH_M_L030 | CH_U_L030 | CH_M_R030 | CH_U_R030 | CH_M_000 | CH_T_000 | CH_M_L110 | CH_M_R110 |
|---|---|---|---|---|---|---|---|---|
| $M_{pre}^{i,j}$ | 1 | 2 | 3 | 4 | 5 | 6 | 7 | 8 |
| 1 | 1 | 1 | 1 | 1 | 0 | 0 | 0 | 0 |
| 2 | 0 | 0 | 0 | 0 | 1 | 1 | 0 | 0 |
| 3 | 0 | 0 | 0 | 0 | 0 | 0 | 1 | 1 |

FIG 21B

- Premixing coefficients for N=8 and K=2, $cond(M_{pre}M_{pre}^{H})=3$.

| Ch. ID | CH_M_L030 | CH_U_L030 | CH_M_R030 | CH_U_R030 | CH_M_000 | CH_T_000 | CH_M_L110 | CH_M_R110 |
|---|---|---|---|---|---|---|---|---|
| $M_{pre}^{i,j}$ | 1 | 2 | 3 | 4 | 5 | 6 | 7 | 8 |
| 1 | 1 | 1 | 1 | 1 | 1 | 1 | 0 | 0 |
| 3 | 0 | 0 | 0 | 0 | 0 | 0 | 1 | 1 |

FIG 21C

Complexity reduction for 7.1 output format

- Premixing coefficients for N=7 and K=4, $cond(M_{pre}M_{pre}^{H})=1$.

| Ch. ID | CH_M_L030 | CH_U_L030 | CH_M_R030 | CH_U_R030 | CH_M_000 | CH_M_L110 | CH_M_R110 |
|---|---|---|---|---|---|---|---|
| $M_{pre}^{i,j}$ | 1 | 2 | 3 | 4 | 5 | 6 | 7 |
| 1 | 1 | 1 | 0 | 0 | 0 | 0 | 0 |
| 2 | 0 | 0 | 1 | 1 | 0 | 0 | 0 |
| 3 | 0 | 0 | 0 | 0 | 1 | 0 | 0 |
| 4 | 0 | 0 | 0 | 0 | 0 | 1 | 1 |

FIG 21D

- Premixing coefficients for N=7 and K=3, $cond(M_{pre}M_{pre}^{H})=2$.

| Ch. ID | CH_M_L030 | CH_U_L030 | CH_M_R030 | CH_U_R030 | CH_M_000 | CH_M_L110 | CH_M_R110 |
|---|---|---|---|---|---|---|---|
| $M_{pre}^{i,j}$ | 1 | 2 | 3 | 4 | 5 | 6 | 7 |
| 1 | 1 | 1 | 1 | 1 | 0 | 0 | 0 |
| 2 | 0 | 0 | 0 | 0 | 1 | 0 | 0 |
| 3 | 0 | 0 | 0 | 0 | 0 | 1 | 1 |

FIG 21E

- Premixing coefficients for N=7 and K=2, $cond(M_{pre}M_{pre}^{H})=2.5$.

| Ch. ID | CH_M_L030 | CH_U_L030 | CH_M_R030 | CH_U_R030 | CH_M_000 | CH_M_L110 | CH_M_R110 |
|---|---|---|---|---|---|---|---|
| $M_{pre}^{i,j}$ | 1 | 2 | 3 | 4 | 5 | 6 | 7 |
| 1 | 1 | 1 | 1 | 1 | 1 | 0 | 0 |
| 2 | 0 | 0 | 0 | 0 | 0 | 1 | 1 |

FIG 21F

Complexity reduction for 5.1 output format

- Premixing coefficients for N=5 and K=3, $cond(M_{pre}M_{pre}^H)=2$.

| Ch. ID | CH_M_L030 | CH_M_R030 | CH_M_000 | CH_M_L110 | CH_M_R110 |
|---|---|---|---|---|---|
| $M_{pre}^{i,j}$ | 1 | 2 | 3 | 4 | 5 |
| 1 | 1 | 1 | 0 | 0 | 0 |
| 2 | 0 | 0 | 1 | 0 | 0 |
| 3 | 0 | 0 | 0 | 1 | 1 |

FIG 22A

- Premixing coefficients for N=5 and K=2, $cond(M_{pre}M_{pre}^H)=1.5$.

| Ch. ID | CH_M_L030 | CH_M_R030 | CH_M_000 | CH_M_L110 | CH_M_R110 |
|---|---|---|---|---|---|
| $M_{pre}^{i,j}$ | 1 | 2 | 3 | 4 | 5 |
| 1 | 1 | 1 | 1 | 0 | 0 |
| 2 | 0 | 0 | 0 | 1 | 1 |

FIG 22B

Complexity reduction for 2.0 output format

- Premixing coefficients for N=2 and K=1, $\mathrm{cond}(M_{pre}M_{pre}^{H})=2$.

| Ch. ID | CH_M_L030 | CH_M_R030 |
|---|---|---|
| $M_{pre}^{i,j}$ | 1 | 2 |
| 1 | 1 | 1 |

FIG 23

| | | | | | | | |
|---|---|---|---|---|---|---|---|
| 2410 | Group 1 | CH_M_000 (Ch. ID. 3) | CH_L_000 (Ch. ID. 22) | CH_U_000 (Ch. ID. 15) | CH_T_000 (Ch. ID. 16) | | |
| 2412 | Group 2 | CH_M_L135 (Ch. ID. 5) | CH_U_L135 (Ch. ID. 17) | CH_M_R135 (Ch. ID. 6) | CH_U_R135 (Ch. ID. 18) | CH_M_180 (Ch. ID. 9) | CH_U_180 (Ch. ID. 21) |
| 2414 | Group 3 | CH_M_L030 (Ch. ID. 7) | CH_L_L045 (Ch. ID. 23) | CH_M_R030 (Ch. ID. 8) | CH_L_R045 (Ch. ID. 24) | | |
| 2416 | Group 4 | CH_M_L090 (Ch. ID. 11) | CH_U_L090 (Ch. ID. 19) | CH_M_R090 (Ch. ID. 12) | CH_U_R090 (Ch. ID. 20) | | |
| 2418 | Group 5 | CH_M_L060 (Ch. ID. 1) | CH_U_L045 (Ch. ID. 13) | CH_M_R060 (Ch. ID. 2) | CH_U_R045 (Ch. ID. 14) | | |

FIG 24

| | | |
|---|---|---|
| bsDecorrelationMethod; | 2 | uimsbf |
| bsDecorrelationLevel; | 2 | uimsbf |

FIG 25 bsDecorrelationMethod

Indicates the decoder decorrelation operating mode according to:

bsDecorrelationMethod

| bsDecorrelationMethod | Meaning |
|---|---|
| 0 | Energy compensation mode |
| 1 | Limited covariance adjustment mode |
| 2 | General covariance adjustment mode |
| 3 | N/A |

FIG 26 bsDecorrelationLevel

Defines the decorrelation level according to:

bsDecorrelationLevel

| bsDecorrelationLevel | 22.2 | 10.1 | 8.1 | 7.1 | 5.1 | 2.1 |
|---|---|---|---|---|---|---|
| 0 | 11 | 10 | 8 | 7 | 5 | 2 |
| 1 | 9 | 5 | 4 | 4 | 3 | 1 |
| 2 | 7 | 3 | 3 | 3 | 2 | 0 |
| 3 | 5 | 2 | 2 | 2 | 0 | 0 |

FIG 27

OVERVIER 3D-AUDIO ENCODER

OVERVIER 3D-AUDIO DECODER

STRUCTUR OF FORMAT CONVERTER

| bsNumSaocDmxObjects | decoding mode | meaning |
|---|---|---|
| 0 | combined | The input channel based signals and the input object based signals are downmixed together into $N_{ch}$ channels. |
| >=1 | independent | The input channel based signals are downmixed into $N_{ch}$ channels. The input object based signals are downmixed into $N_{obj}$ channels. |

- Syntax of SAOC3DSpecificConfig()

| Syntax | No. of bits | Mnemonic |
|---|---|---|
| SAOC3DSpecificConfig() | | |
| { | | |
| bsSamplingFrequencyIndex; | 4 | uimsbf |
| if ( bsSamplingFrequencyIndex == 15 ) { | | |
| bsSamplingFrequency; | 24 | uimsbf |
| } | | |
| bsFreqRes; | 3 | uimsbf |
| bsFrameLenth; | 7 | uimsbf |
| bsNumSaocDmxChannels; | 5 | uimsbf |
| bsNumSaocDmxObjects; | 5 | uimsbf |
| bsDecorrelationMethod; | 2 | uimsbf |
| NumInputSignals = 0; | | |
| if (bsNumSaocDmxChannels < 0) { | | |
| bsNumSaocChannels; | 6 | uimsbf |
| bsNumSaocLFEs; | 2 | uimsbf |
| NumInputSigns += bsNumSaocChannels; | | |
| } | | |
| bsNumSaocObjects; | 8 | uimsbf |
| bsDecorrelationLevel; | 2 | uimsbf |
| NumInputSignals += bsNumSaocObjects; | | |
| for ( i=0; i<bsNumSaocChannels; i++ ) { | | |
| bsRelatedTo[i][j] = 1; | | |
| for( j=i+1; j< bsNumSaocChannels; j++ ) { | | |
| bsRelatedTo[i][j]; | 1 | uimsbf |
| bsRelatedTo[j][i] = bsRelatedTo[i][j]; | | |
| } | | |
| } | | |

FIG 33A | FIG 33A-1 | FIG 33A-2

FIG 33A-1

```
for ( i=bsNumSaocChannels; i<NumInputSignals; i++ ) {
    for ( j=0; j<bsNumSaocChannels; j++ ) {
        bsRelatedTo[i][j] = 0;
        bsRelatedTo[j][i] = 0;
    }
}
for ( i=bsNumSaocChannels; i<NumInputSignals; i++ ) {
    bsRelatedTo[i][j] = 1;
    for ( j=i+1; j<NumInputSignals; j++ ) {
        bsRelatedTo[i][j];                                1    uimsbf
        bsRelatedTo[j][i] = bsRelatedTo[i][j];
    }
}
bsOneIOC;                                                 1    uimsbf
bsSaocDmxMethod;                                          4    uimsbf
if (bsSaocDmxMethod == 15) {
    bsNumPremixedChannels;                                5    uimsbf
}
bsDualMode;                                               1    uimsbf
if (bsDualMode) {
    bsBandsLow;                                           5    uimsbf
    bsBandsHigh = numBands;                                    Note 1
} else {
    bsBandsLow = numBands;
```

| FIG 33A | FIG 33A-1 |
| --- | --- |
| | FIG 33A-2 |

FIG 33A-2

```
    }
    bsDcuFlag;                                   1     uimsbf
    if ( bsDcuFlag == 1 ) {
        bsDcuMandatory;                          1     uimsbf
        bsDcuDynamic;                            1     uimsbf
        if ( bsDcuDynamic == 0 ) {
            bsDcuMode;                           1     uimsbf
            bsDcuParam;                          4     uimsbf
        }
    } ele {
        bsDcuMandatory = 0;
        bsDcuDynamic = 0;
        bsDcuMode = 0;
        bsDcuParam = 0;
    }
    bsSaocReserved;                              3     uimsbf
    ByteAlign();
    SAOC3DExtensionConfig();
}
```

Note 1: numBands is defined in Table 33 in ISO/IEC 23003-2:2010.

FIG 33B

MULTI-CHANNEL AUDIO DECODER, MULTI-CHANNEL AUDIO ENCODER, METHODS, COMPUTER PROGRAM AND ENCODED AUDIO REPRESENTATION USING A DECORRELATION OF RENDERED AUDIO SIGNALS

CROSS-REFERENCE TO RELATED APPLICATIONS

This application is a continuation of U.S. patent application Ser. No. 15/004,548 filed Jan. 22, 2016, which is a continuation of International Application No. PCT/EP2014/065397 filed Jul. 17, 2014, which is incorporated herein by reference in its entirety, and additionally claims priority from European Applications Nos. EP 13177374.9, filed Jul. 22, 2014, EP 13189345.5, filed Oct. 18, 2013 and EP14161611.0, filed Mar. 25, 2014, which are all incorporated herein by reference in their entirety.

BACKGROUND OF THE INVENTION

Embodiments according to the invention are related to a multi-channel audio decoder for providing at least two output audio signals on the basis of an encoded representation.

Further embodiments according to the invention are related to a multi-channel audio encoder for providing an encoded representation on the basis of at least two input audio signals.

Further embodiments according to the invention are related to a method for providing at least two output audio signals on the basis of an encoded representation.

Further embodiments according to the invention are related to a method for providing an encoded representation on the basis of at least two input audio signals.

Further embodiments according to the invention are related to a computer program for performing one of said methods.

Further embodiments according to the invention are related to an encoded audio representation.

Generally speaking, embodiments according to the present invention are related to a decorrelation concept for multi-channel downmix/upmix parametric audio object coding systems.

In recent years, demand for storage and transmission of audio contents has steadily increased. Moreover, the quality requirements for the storage and transmission of audio contents have also steadily increased. Accordingly, the concepts for the encoding and decoding of audio content have been enhanced.

For example, the so called "Advanced Audio Coding" (AAC) has been developed, which is described, for example, in the international standard ISO/IEC 13818-7:2003. Moreover, some spatial extensions have been created, like for example the so called "MPEG Surround" concept, which is described, for example, in the international standard ISO/IEC 23003-1:2007. Moreover, additional improvements for encoding and decoding of spatial information of audio signals are described in the international standard ISO/IEC 23003-2:2010, which relates to the so called "Spatial Audio Object Coding".

Moreover, a switchable audio encoding/decoding concept which provides the possibility to encode both general audio signals and speech signals with good coding efficiency and to handle multi-channel audio signals is defined in the international standard ISO/IEC 23003-3:2012, which describes the so called "Unified Speech and Audio Coding" concept.

Moreover, further conventional concepts are described in the references, which are mentioned at the end of the present description.

However, there is a desire to provide an even more advanced concept for an efficient coding and decoding of 3-dimensional audio scenes.

SUMMARY

An embodiment may have a multi-channel audio decoder for providing at least two output audio signals on the basis of an encoded representation, wherein the multi-channel audio decoder is configured to render a plurality of decoded audio signals, which are obtained on the basis of the encoded representation, to a multi-channel target scene in dependence on one or more rendering parameters which define a rendering matrix, to obtain a plurality of rendered audio signals, and wherein the multi-channel audio decoder is configured to derive one or more decorrelated audio signals from the rendered audio signals, and wherein the multi-channel audio decoder is configured to combine the rendered audio signals, or a scaled version thereof, with the one or more decorrelated audio signals, to obtain the output audio signals; wherein the multi-channel audio decoder is configured to obtain the decoded audio signals, which are rendered to obtain the plurality of rendered audio signals, using a parametric reconstruction, wherein the decoded audio signals are reconstructed object signals, and wherein the multi-channel audio decoder is configured to derive the reconstructed object signals from one or more downmix signals using a side information.

Another embodiment may have a multi-channel audio encoder for providing an encoded representation on the basis of at least two input audio signals, wherein the multi-channel audio encoder is configured to provide one or more downmix signals on the basis of the at least two input audio signals, and wherein the multi-channel audio encoder is configured to provide one or more parameters describing a relationship between the at least two input audio signals, and wherein the multi-channel audio encoder is configured to provide a decorrelation method parameter describing which decorrelation mode out of a plurality of decorrelation modes should be used at the side of an audio decoder; wherein the multi-channel audio encoder is configured to selectively provide the decorrelation method parameter, to signal one out of the following three modes for the operation of an audio decoder: a first mode, in which a mixing between different rendered audio signals is allowed when combining the rendered audio signals, or a scaled version thereof, with the one or more decorrelated audio signals, a second mode in which no mixing between different rendered audio signals is allowed when combining the rendered audio signals, or a scaled version thereof, with the one or more decorrelated audio signals, and in which it is allowed that a given decorrelated signal is combined, with same or different scaling, with a plurality of rendered audio signals, or a scaled version thereof, in order to adjust cross-correlation characteristics or cross-covariance characteristics of the output audio signals, and a third mode in which no mixing between different rendered audio signals is allowed when combining the rendered audio signals, or a scaled version thereof, with the one or more decorrelated audio signals, and in which it is not allowed that a given decorrelated signal is combined with rendered audio signals other than a rendered audio signal from which the given decorrelated signal is derived.

According to another embodiment, a method for providing at least two output audio signals on the basis of an encoded representation may have the steps of: rendering a plurality of decoded audio signals, which are obtained on the basis of the encoded representation, to a multi-channel target scene in dependence on one or more rendering parameters which define a rendering matrix, to obtain a plurality of rendered audio signals, deriving one or more decorrelated audio signals from the rendered audio signals, and combining the rendered audio signals, or a scaled version thereof, with the one or more decorrelated audio signals, to obtain the output audio signals; wherein the decoded audio signals, which are rendered to obtain the plurality of rendered audio signals, are obtained using a parametric reconstruction; wherein the decoded audio signals are reconstructed object signals; and wherein the reconstructed object signals are derived from one or more downmix signals using a side information.

According to another embodiment, a method for providing an encoded representation on the basis of at least two input audio signals may have the steps of: providing one or more downmix signals on the basis of the at least two input audio signals, providing one or more parameters describing a relationship between the at least two input audio signals, and providing a decorrelation method parameter describing which decorrelation mode out of a plurality of decorrelation modes should be used at the side of an audio decoder; wherein the method includes selectively providing the decorrelation method parameter, to signal one out of the following three modes for the operation of an audio decoder: a first mode, in which a mixing between different rendered audio signals is allowed when combining the rendered audio signals, or a scaled version thereof, with the one or more decorrelated audio signals, a second mode in which no mixing between different rendered audio signals is allowed when combining the rendered audio signals, or a scaled version thereof, with the one or more decorrelated audio signals, and in which it is allowed that a given decorrelated signal is combined, with same or different scaling, with a plurality of rendered audio signals, or a scaled version thereof, in order to adjust cross-correlation characteristics or cross-covariance characteristics of the output audio signals, and a third mode in which no mixing between different rendered audio signals is allowed when combining the rendered audio signals, or a scaled version thereof, with the one or more decorrelated audio signals, and in which it is not allowed that a given decorrelated signal is combined with rendered audio signals other than a rendered audio signal from which the given decorrelated signal is derived.

According to another embodiment, an encoded audio representation may have: an encoded representation of a downmix signal; an encoded representation of one or more parameters describing a relationship between the at least two input audio signals, and an encoded decorrelation method parameter describing which decorrelation mode out of a plurality of decorrelation modes should be used at the side of an audio decoder; wherein the decorrelation method parameter signals one out of the following three modes for the operation of an audio decoder: a first mode, in which a mixing between different rendered audio signals is allowed when combining the rendered audio signals, or a scaled version thereof, with the one or more decorrelated audio signals, a second mode in which no mixing between different rendered audio signals is allowed when combining the rendered audio signals, or a scaled version thereof, with the one or more decorrelated audio signals, and in which it is allowed that a given decorrelated signal is combined, with same or different scaling, with a plurality of rendered audio signals, or a scaled version thereof, in order to adjust cross-correlation characteristics or cross-covariance characteristics of the output audio signals, and a third mode in which no mixing between different rendered audio signals is allowed when combining the rendered audio signals, or a scaled version thereof, with the one or more decorrelated audio signals, and in which it is not allowed that a given decorrelated signal is combined with rendered audio signals other than a rendered audio signal from which the given decorrelated signal is derived.

Another embodiment may have a multi-channel audio decoder for providing at least two output audio signals on the basis of an encoded representation, wherein the multi-channel audio decoder is configured to render a plurality of decoded audio signals, which are obtained on the basis of the encoded representation, in dependence on one or more rendering parameters, to obtain a plurality of rendered audio signals, and wherein the multi-channel audio decoder is configured to derive one or more decorrelated audio signals from the rendered audio signals, and wherein the multi-channel audio decoder is configured to combine the rendered audio signals, or a scaled version thereof, with the one or more decorrelated audio signals, to obtain the output audio signals; wherein the multi-channel audio decoder is configured to switch between a first mode, in which a mixing between different rendered audio signals is allowed when combining the rendered audio signals, or a scaled version thereof, with the one or more decorrelated audio signals, a second mode in which no mixing between different rendered audio signals is allowed when combining the rendered audio signals, or a scaled version thereof, with the one or more decorrelated audio signals, and in which it is allowed that a given decorrelated signal is combined, with same or different scaling, with a plurality of rendered audio signals, or a scaled version thereof, in order to adjust cross-correlation characteristics or cross-covariance characteristics of the output audio signals, and a third mode in which no mixing between different rendered audio signals is allowed when combining the rendered audio signals, or a scaled version thereof, with the one or more decorrelated audio signals, and in which it is not allowed that a given decorrelated signal is combined with rendered audio signals other than a rendered audio signal from which the given decorrelated signal is derived.

According to another embodiment, a method for providing at least two output audio signals on the basis of an encoded representation may have the steps of: rendering a plurality of decoded audio signals, which are obtained on the basis of the encoded representation, in dependence on one or more rendering parameters, to obtain a plurality of rendered audio signals, deriving one or more decorrelated audio signals from the rendered audio signals, and combining the rendered audio signals, or a scaled version thereof, with the one or more decorrelated audio signals, to obtain the output audio signals; wherein the method includes switching between a first mode, in which a mixing between different rendered audio signals is allowed when combining the rendered audio signals, or a scaled version thereof, with the one or more decorrelated audio signals, a second mode in which no mixing between different rendered audio signals is allowed when combining the rendered audio signals, or a scaled version thereof, with the one or more decorrelated audio signals, and in which it is allowed that a given decorrelated signal is combined, with same or different scaling, with a plurality of rendered audio signals, or a scaled version thereof, in order to adjust cross-correlation characteristics or cross-covariance characteristics of the output audio signals, and a third mode in which no mixing between different rendered audio signals is allowed when combining the rendered audio signals, or a scaled version thereof, with the one or more decorrelated audio signals, and in which it is not allowed that a given decorrelated signal is combined with rendered audio signals other than a rendered audio signal from which the given decorrelated signal is derived.

Another embodiment may have a computer program for performing the inventive methods when the computer program runs on a computer.

An embodiment according to the invention creates a multi-channel audio decoder for providing at least two output audio signals on the basis of an encoded representation. The multi-channel audio decoder is configured to render a plurality of decoded audio signals, which are obtained on the basis of the encoded representation, in dependence on one or more rendering parameters, to obtain a plurality of rendered audio signals. The multi-channel audio decoder is configured to derive one or more decorrelated audio signals from the rendered audio signals. Moreover, the multi-channel audio decoder is configured to combine the rendered audio signals, or a scaled version thereof, with the one or more decorrelated audio signals, to obtain the output audio signals.

This embodiment according to the invention is based on the finding that audio quality can be improved in a multi-channel audio decoder by deriving one or more decorrelated audio signals from rendered audio signals, which are obtained on the basis of a plurality of decoded audio signals, and by combining the rendered audio signals, or a scaled version thereof, with the one or more decorrelated audio signals, to obtain the output audio signals. It has been found that it is more efficient to adjust the correlation characteristics, or the covariance characteristics, of the output audio signals by adding decorrelated signals after the rendering when compared to adding decorrelated signals before the rendering or during the rendering. It has been found that this concept is more efficient in general cases, in which there are more decoded audio signals, which are input to the rendering, than rendered audio signals, because more decorrelators would be necessitated if the decorrelation was performed before the rendering or during the rendering. Moreover, it has been found that artifacts are often provided when decorrelated signals are added to the decoded audio signals before the rendering, because the rendering typically brings along a combination of decoded audio signals. Accordingly, the concept according to the present embodiment of the invention outperforms conventional approaches, in which decorrelated signals are added before the rendering. For example, it is possible to directly estimate the desired correlation characteristics or covariance characteristics of the rendered signals, and to adapt the provision of decorrelated audio signals to the actually rendered signals, which results in a better tradeoff between efficiency and audio quality, and often even results in an increased efficiency and a better quality at the same time.

In an embodiment, the multi-channel audio decoder is configured to obtain the decoded audio signals, which are rendered to obtain the plurality of rendered audio signals, using a parametric reconstruction. It has been found that the concept according to the present invention brings along advantages in combination with a parametric reconstruction of audio signals, wherein the parametric reconstruction is, for example, based on a side information describing object signals and/or a relationship between object signals (wherein the object signals may constitute the decoded audio signals). For example, there may be a comparatively large number of object signals (decoded audio signals) in such a concept, and it has been found that the application of the decorrelation on the basis of the rendered audio signals is particularly efficient and avoids artifacts in such a scenario.

In an embodiment, the decoded audio signals are reconstructed object signals (for example, parametrically reconstructed object signals) and the multi-channel audio decoder is configured to derive the reconstructed object signals from the one or more downmix signals using a side information. Accordingly, the combination of the rendered audio signals with one or more decorrelated audio signals, which are based on the rendered audio signals, allows for an efficient reconstruction of correlation characteristics or covariance characteristics in the output audio signals, even if there is a comparatively large number of reconstructed object signals (which may be larger than a number of rendered audio signals or output audio signals).

In an embodiment, the multi-channel audio decoder may be configured to derive un-mixing coefficients from the side information and to apply the un-mixing coefficients to derive the (parametrically) reconstructed object signals from the one or more downmix signals using the un-mixing coefficients. Accordingly, the input signals for the rendering may be derived from a side information, which may for example be an object-related side information (like, for example, an inter-object-correlation information or an object-level difference information, wherein the same result may be obtained by using absolute energies).

In an embodiment, the multi-channel audio decoder may be configured to combine the rendered audio signals with the one or more decorrelated audio signals, to at least partially achieve desired correlation characteristics or covariance characteristics of the output audio signals. It has been found that the combination of the rendered audio signals with the one or more decorrelated audio signals, which are derived from the rendered audio signals, allows for an adjustment (or reconstruction) of desired correlation characteristics or covariance characteristics. Moreover, it has been found that it is important for the auditory impression to have the proper correlation characteristics or covariance characteristics in the output audio signal, and that this can be achieved best by modifying the rendered audio signals using the decorrelated audio signals. For example, any degradations, which are caused in previous processing stages, may also be considered when combining the rendered audio signals and the decorrelated audio signals based on the rendered audio signals.

In an embodiment, the multi-channel audio decoder may be configured to combine the rendered audio signals with the one or more decorrelated audio signals, to at least partially compensate for an energy loss during a parametric reconstruction of the decoded audio signals, which are rendered to obtain the plurality of rendered audio signals. It has been found that the post-rendering application of the decorrelated audio signals allows to correct for signal imperfections which are caused by a processing before the rendering, for example, by the parametric reconstruction of the decoded audio signals. Consequently, it is not necessitated to reconstruct correlation characteristics or covariance characteristics of the decoded audio signals, which are input into the rendering, with high accuracy. This simplifies the reconstruction of the decoded audio signals and therefore brings along a high efficiency.

In an embodiment, the multi-channel audio decoder is configured to determine desired correlation characteristics of covariance characteristics of the output audio signals. Moreover, the multi-channel audio decoder is configured to adjust a combination of the rendered audio signals with the one or more decorrelated audio signals, to obtain the output audio signals, such that correlation characteristics or covariance characteristics of the obtained output audio signals approximate or equal the desired correlation characteristics or desired covariance characteristics. By computing (or determining) desired correlation characteristics or covariance characteristics of the output audio signals (which should be reached after the combination of the rendered audio signals with the decorrelated audio signals), it is possible to adjust the correlation characteristics or covariance characteristics at a late stage of the processing, which in turn allows for a relatively precise reconstruction. Accordingly, a spatial hearing impression of the output audio signals is well adapted to a desired hearing impression.

In an embodiment, the multi-channel audio decoder may be configured to determine the desired correlation characteristics or desired covariance characteristics in dependence on a rendering information describing a rendering of the plurality of decoded audio signals, which are obtained on the basis of the encoded representation, to obtain the plurality of rendered audio signals. By considering the rendering process in the determination of the desired correlation characteristics or the desired covariance characteristics, it is possible to achieve a precise information for adjusting the combination of the rendered audio signals with the one or more decorrelated audio signals, which brings along the possibility to have output audio signals that match a desired hearing impression.

In an embodiment, the multi-channel audio decoder may be configured to determine the desired correlation characteristics or desired covariance characteristics in dependence on an object correlation information or an object covariance information describing characteristics of a plurality of audio objects and/or a relationship between a plurality of audio objects. Accordingly, it is possible to restore correlation characteristics or covariance characteristics, which are adapted to the audio objects, at a late processing stage, namely after the rendering. Accordingly, the complexity for decoding the audio objects is reduced. Moreover, by considering the correlation characteristics or covariance characteristics of the audio objects after the rendering, a detrimental impact of the rendering can be avoided and the correlation characteristics or covariance characteristics can be reconstructed with good accuracy.

In an embodiment, the multi-channel audio decoder is configured to determine the object correlation information or the object covariance information on the basis of a side information included in the encoded representation. Accordingly, the concept can be well-adapted to a spatial audio object coding approach, which uses side information.

In an embodiment, the multi-channel audio decoder is configured to determine actual correlation characteristics or covariance characteristics of the rendered audio signals and to adjust the combination of the rendered audio signals with the one or more decorrelated audio signals, to obtain the output audio signals in dependence on the actual correlation characteristics or covariance characteristics of the rendered audio signals. Accordingly, it can be reached that imperfections in earlier processing stages like, for example, an energy loss when reconstructing audio objects, or imperfections caused by the rendering, can be considered. Thus, the combination of the rendered audio signals with the one or more decorrelated audio signals can be adjusted in a very precise manner to the needs, such that the combination of the actual rendered audio signals with the decorrelated audio signals results in the desired characteristics.

In an embodiment, the multi-channel audio decoder may be configured to combine the rendered audio signals with the one or more decorrelated audio signals, wherein the rendered audio signals are weighted using a first mixing matrix P and wherein the one or more decorrelated audio signals are weighted using a second mixing matrix M. This allows for simple derivation of the output audio signals, wherein a linear combination operation is performed, which is described by the mixing matrix P which is applied to the rendered audio signals and a mixing matrix M which is applied to the one or more decorrelated audio signals.

In an embodiment, the multi-channel audio decoder is configured to adjust at least one out of the mixing matrix P and the mixing matrix M such that correlation characteristics or covariance characteristics of the obtained output audio signals approximate or equal to the desired correlation characteristics or desired covariance characteristics. Thus, there is a way to adjust one or more of the mixing matrices, which is typically possible with moderate effort and good results.

In an embodiment, the multi-channel audio decoder is configured to jointly compute the mixing matrix P and the mixing matrix M. Accordingly, it is possible to obtain the mixing matrices such that the correlation characteristics or covariance characteristics of the obtained output audio signals can be set to approximate or equal the desired correlation characteristics or desired covariance characteristics. Moreover, when jointly computing the mixing matrix P and the mixing matrix M, some degrees of freedom are typically available, such that is possible to best fit the mixing matrix P and the mixing matrix M to the requirements.

In an embodiment, the multi-channel audio decoder is configured to obtain a combined mixing matrix F, which comprises the mixing matrix P and the mixing matrix M, such that a covariance matrix of the obtained output audio signals is equal to a desired covariance matrix.

In an embodiment, the combined mixing matrix can be computed in accordance with the equations described below.

In an embodiment, the multi-channel audio decoder may be configured to determine the combined mixing matrix F using matrices, which are determined using a singular value decomposition of a first covariance matrix, which describes the rendered audio signal and the decorrelated audio signal, and of a second covariance matrix, which describes desired covariance characteristics of the output audio signals. Using such a singular value decomposition constitutes a numerically efficient solution for determining the combined mixing matrix.

In an embodiment, the multi-channel audio decoder is configured to set the mixing matrix P to be an identity matrix, or a multiple thereof, and to compute the mixing matrix M. This avoids a mixing of different rendered audio signals, which helps to preserve a desired spatial impression. Moreover, the number of degrees of freedom is reduced.

In an embodiment, the multi-channel audio decoder may be configured to determine the mixing matrix M such that a difference between a desired covariance matrix and a covariance matrix of the rendered audio signals approximate or equals a covariance of the one or more decorrelated signals, after mixing with the mixing matrix M. Thus, a computationally simple concept for obtaining the mixing matrix M is given.

In an embodiment, the multi-channel audio decoder may be configured to determine the mixing matrix M using matrices which are determined using a singular value decomposition of the difference between the desired covariance matrix and the covariance matrix of the rendered audio signals and of the covariance matrix of the one or more decorrelated signals. This is a computationally very efficient approach for determining the mixing matrix M.

In an embodiment, the multi-channel audio decoder is configured to determine the mixing matrices P, M under the restriction that a given rendered audio signal is only mixed with a decorrelated version of the given rendered audio signal itself. This concept limits to a small modification (for example, in the presence of imperfect decorrelators) or prevents a modification of cross-correlation characteristics or cross-covariance characteristics (for example, in case of ideal decorrelators) and may therefore be desirable in some cases to avoid a change of a perceived object position. However, in the presence of non-ideal decorrelators, autocorrelation values (or autocovariance values) are explicitly modified, and the changes in the cross-terms are ignored.

In an embodiment, the multi-channel audio decoder is configured to combine the rendered audio signals with the one or more decorrelated audio signals such that only autocorrelation values or autocovariance values of rendered audio signals are modified while cross-correlation characteristics or cross-covariance characteristics are left unmodified or modified with a small value (for example, in the presence of imperfect decorrelators). Again, a degradation of a perceived position of audio objects can be avoided. Moreover, the computational complexity can be reduced. However, for example, the cross-covariance values are modified as consequence of the modification of the energies (autocorrelation values), but the cross-correlation values remain unmodified (they represent normalized version of the cross-covariance values).

In an embodiment, the multi-channel audio decoder is configured to set the mixing matrix P to be an identity matrix, or a multiple thereof, and to compute the mixing matrix M under the restriction that M is a diagonal matrix. Thus, a modification of cross-correlation characteristics or cross-covariance characteristics can be avoided or restricted to a small value (for example, in the presence of imperfect decorrelators).

In an embodiment, the multi-channel audio decoder is configured to combine the rendered audio signals with the one or more decorrelated audio signals, to obtain the output audio signal, wherein a diagonal matrix M is applied to the one or more decorrelated audio signals W. In this case, the multi-channel audio decoder is configured to compute diagonal elements of the mixing matrix M such that diagonal elements of a covariance matrix of the output audio signals are equal to desired energies. Accordingly, an energy loss, which may be obtained by the rendering operation and/or by the reconstruction of audio objects on the basis of one or more downmix signals and a spatial side-information, can be compensated. Thus, a proper intensity of the output audio signals can be achieved.

In an embodiment, the multi-channel audio decoder may be configured to compute the elements of the mixing matrix M in dependence on diagonal elements of a desired covariance matrix, diagonal elements of a covariance matrix of the rendered audio signals, and diagonal elements of a covariance matrix of the one or more decorrelated signals. Non-diagonal elements of the mixing matrix M may be set to zero, and the desired covariance matrix may be computed on the basis of the rendering matrix used for the rendering operation and an object covariance matrix. Furthermore, a threshold value may be used to limit an amount of decorrelation added to the signals. This concept provides for a very computationally efficient determination of the elements of the mixing matrix M.

In an embodiment, the multi-channel audio decoder may be configured to consider correlation characteristics or covariance characteristics of the decorrelated audio signals when determining how to combine the rendered audio signals, or the scaled version thereof, with the one or more decorrelated audio signals. Accordingly, imperfections of the decorrelation can be considered.

In an embodiment, the multi-channel audio decoder may be configured to mix rendered audio signals and decorrelated audio signals, such that a given output audio signal is provided on the basis of two or more rendered audio signals and at least one decorrelated audio signal. By using this concept, cross-correlation characteristics can be efficiently adjusted without the need to introduce large amounts of decorrelated signals (which may degrade a auditory spatial impression).

In an embodiment, the multi-channel audio decoder may be configured to switch between different modes, in which different restrictions are applied for determining how to combine the rendered audio signals, or a scaled version thereof, with the one or more decorrelated audio signals, to obtain the output audio signals. Accordingly, complexity and processing characteristics can be adjusted to the signals which are processed.

In an embodiment, the multi-channel audio decoder may be configured to switch between a first mode, in which a mixing between different rendered audio signals is allowed when combining the rendered audio signals, or a scaled version thereof, with the one or more decorrelated audio signals, a second mode in which no mixing between different rendered audio signals is allowed when combining the rendered audio signals, or a scaled version thereof, with the one or more decorrelated audio signals, and in which it is allowed that a given decorrelated signal is combined, with same or different scaling, with a plurality of rendered audio signals, or a scaled version thereof, in order to adjust cross-correlation characteristics or cross-covariance characteristics of the output audio signals, and a third mode in which no mixing between different rendered audio signals is allowed when combining the rendered audio signals, or a scaled version thereof, with the one or more decorrelated audio signals, and in which it is not allowed that a given decorrelated signal is combined with rendered audio signals other than a rendered audio signal from which the given decorrelated signal is derived. Thus, both complexity and processing characteristics can be adjusted to the type of audio signal which is currently being rendered. Modifying only the auto-correlation characteristics or autocovariance characteristics and not explicitly modifying the cross-correlation characteristics or cross-covariance characteristics may, for example, be helpful if a spatial impression of the audio signals would be degraded by such a modification, while it is nevertheless desirable to adjust intensities of the output audio signals. On the other hand, there are cases in which it is desirable to adjust cross-correlation characteristics or cross-covariance characteristics of the output audio signals. The multi-channel audio decoder mentioned here allows for such an adjustment, wherein in the first mode, it is possible to combine rendered audio signals, such that an amount (or intensity) of decorrelated signal components, which is necessitated for adjusting the cross-correlation characteristics or cross-covariance characteristics, is comparatively small. Thus, “localizable” signal components are used in the first mode to adjust the cross-correlation characteristics or cross-covariance characteristics. In contrast, in the second mode, decorrelated signals are used to adjust cross-correlation characteristics or cross-covariance characteristics, which naturally brings along a different hearing impression. Accordingly, by providing three different modes, the audio decoder can be well-adapted to the audio content being handled.

In an embodiment, the multi-channel audio decoder is configured to evaluate a bitstream element of the encoded representation indicating which of the three modes for combining the rendered audio signals, or a scaled version thereof, with the one or more decorrelated audio signals is to be used, and to select the mode in dependence on said bitstream element. Accordingly, an audio encoder can signal an appropriate mode in dependence on its knowledge of the audio contents. Thus, a maximum quality of the output audio signals can be achieved under any circumstance.

An embodiment according to the invention creates a multi-channel audio encoder for providing an encoded representation on the basis of at least two input audio signals. The multi-channel audio encoder is configured to provide one or more downmix signals on the basis of the at least two input audio signals. Moreover, the multi-channel audio encoder is configured to provide one or more parameters describing a relationship between the at least two input audio signals. In addition, the multi-channel audio encoder is configured to provide a decorrelation method parameter describing which decorrelation mode out of a plurality of decorrelation modes should be used at the side of an audio encoder. Accordingly, the multi-channel audio encoder can control the audio decoder to use an appropriate decorrelation mode, which is well adapted to the type of audio signal which is currently encoded. Thus, the multi-channel audio encoder described here is well-adapted for cooperation with the multi-channel audio decoder discussed before.

In an embodiment, the multi-channel audio encoder is configured to selectively provide the decorrelation method parameter, to signal one out of the following three modes for the operation of an audio decoder: a first mode, in which a mixing between different rendered audio signals is allowed when combining the rendered audio signals, or a scaled version thereof, with the one or more decorrelated audio signals, a second mode in which no mixing between different of the rendered audio signals is allowed when combining the rendered audio signals, or a scaled version thereof, with the one or more decorrelated audio signals, and in which it is allowed that a given decorrelated audio signal is combined, with same or different scaling, with a plurality of rendered audio signals, or a scaled version thereof, in order to adjust cross-correlation characteristics or cross-covariance characteristics of the output audio signals, and a third mode in which no mixing between different of the rendered audio signals is allowed when combining the rendered audio signals, or a scaled version thereof, with the one or more decorrelated audio signals, and in which it is not allowed that a given decorrelated audio signal is combined with rendered audio signals other than a rendered audio signal from which the given decorrelated audio signal is derived. Thus, the multi-channel audio encoder can switch a multi-channel audio decoder through the above discussed three modes in dependence on the audio content, wherein the mode in which the multi-channel audio decoder is operated can be well-adapted by the multi-channel audio encoder to the type of audio content currently encoded. However, in some embodiments, only one or two of the above mentioned three modes for the operation of the audio decoder may be used (or may be available).

In an embodiment, the multi-channel audio encoder is configured to select the decorrelation method parameter in dependence on whether the input audio signals comprise a comparatively high correlation or a comparatively lower correlation. Thus, an adaptation of the decorrelation, which is used in the decoder, can be made on the basis of an important characteristic of the audio signals which are currently encoded.

In an embodiment, the multi-channel audio encoder is configured to select the decorrelation method parameter to designate the first mode or the second mode if a correlation or covariance between the input audio signals is comparatively high, and to select the decorrelation method parameter to designate the third mode if a correlation or covariance between the input audio signals is comparatively lower. Accordingly, in the case of comparatively small correlation or covariance between the input audio signals, a decoding mode is chosen in which there is no correction of cross-covariance characteristics or cross-correlation characteristics. It has been found that this is an efficient choice for signals having a comparatively low correlation (or covariance), since such signals are substantially independent, which eliminates the need for an adaptation of cross-correlations or cross-covariances. Rather, an adjustment of cross-correlations or cross-covariances for substantially independent input audio signals (having a comparatively small correlation or covariance) would typically degrade an audio quality and at the same time increase a decoding complexity. Thus, this concept allows for a reasonable adaptation of the multi-channel audio decoder to the signal input into the multi-channel audio encoder.

An embodiment according to the invention creates a method for providing at least two output audio signals on the basis of an encoded representation. The method comprises rendering a plurality of decoded audio signals, which are obtained on the basis of the encoded representation, in dependence on one or more rendering parameters, to obtain a plurality of rendered audio signals. The method also comprises deriving one or more decorrelated audio signals from the rendered audio signals and combining the rendered audio signals, or a scaled version thereof, with the one or more decorrelated audio signals, to obtain the output audio signals. This method is based on the same considerations as the above described multi-channel audio decoder. Moreover, the method can be supplemented by any of the features and functionalities discussed above with respect to the multi-channel audio decoder.

Another embodiment according to the invention creates a method for providing an encoded representation on the basis of at least two input audio signals. The method comprises providing one or more downmix signals on the basis of the at least two input audio signals, providing one or more parameters describing a relationship between the at least two input audio signals, and providing a decorrelation method parameter describing which decorrelation mode out of a plurality of decorrelation modes should be used at the side of an audio decoder. This method is based on the same considerations as the above described multi-channel audio encoder. Moreover, the method can be supplemented by any of the features and functionalities described herein with respect to the multi-channel audio encoder.

Another embodiment according to the invention creates a computer program for performing one or more of the methods described above.

Another embodiment according to the invention creates an encoded audio representation, comprising an encoded representation of a downmix signal, an encoded representation of one or more parameters describing a relationship between the at least two input audio signals, and an encoded decorrelation method parameter describing which decorrelation mode out of a plurality of decorrelation modes should be used at the side of an audio decoder. This encoded audio representation allows to signal an appropriate decorrelation mode and therefore helps to implement the advantages described with respect to the multi-channel audio encoder and the multi-channel audio decoder.

BRIEF DESCRIPTION OF THE DRAWINGS

Embodiments of the present invention will be detailed subsequently referring to the appended drawings, in which:

FIG. 18 shows a table representation of loudspeaker positions, according to an embodiment of the present invention;

FIGS. 19*a* to 19*g* show table representations of premixing coefficients for N=22 and K between 5 and 11;

FIGS. 20*a* to 20*d* show table representations of premixing coefficients for N=10 and K between 2 and 5;

FIGS. 21*a* to 21*c* show table representations of premixing coefficients for N=8 and K between 2 and 4;

FIGS. 21*d* to 21*f* show table representations of premixing coefficients for N=7 and K between 2 and 4;

FIGS. 22*a* and 22*b* show table representations of premixing coefficients for N=5 and K=2 or K=3;

FIG. 23 shows a table representation of premixing coefficients for N=2 and K=1;

FIG. 24 shows a table representation of groups of channel signals;

FIG. 25 shows a syntax representation of additional parameters, which may be included into the syntax of SAOCSpecifigConfig( ) or, equivalently, SAOC3DSpecificConfig( );

FIG. 26 shows a table representation of different values for the bitstream variable bsDecorrelationMethod;

FIG. 27 shows a table representation of a number of decorrelators for different decorrelation levels and output configurations, indicated by the bitstream variable bsDecorrelationLevel;

FIGS. 33A, consisting of 33A-1 and 33A-2, and 33B show a syntax representation of a bitstream element "SAOC3DSpecificConfig".

DETAILED DESCRIPTION OF THE INVENTION

1. Multi-Channel Audio Decoder According to FIG. 1

Figure 1:
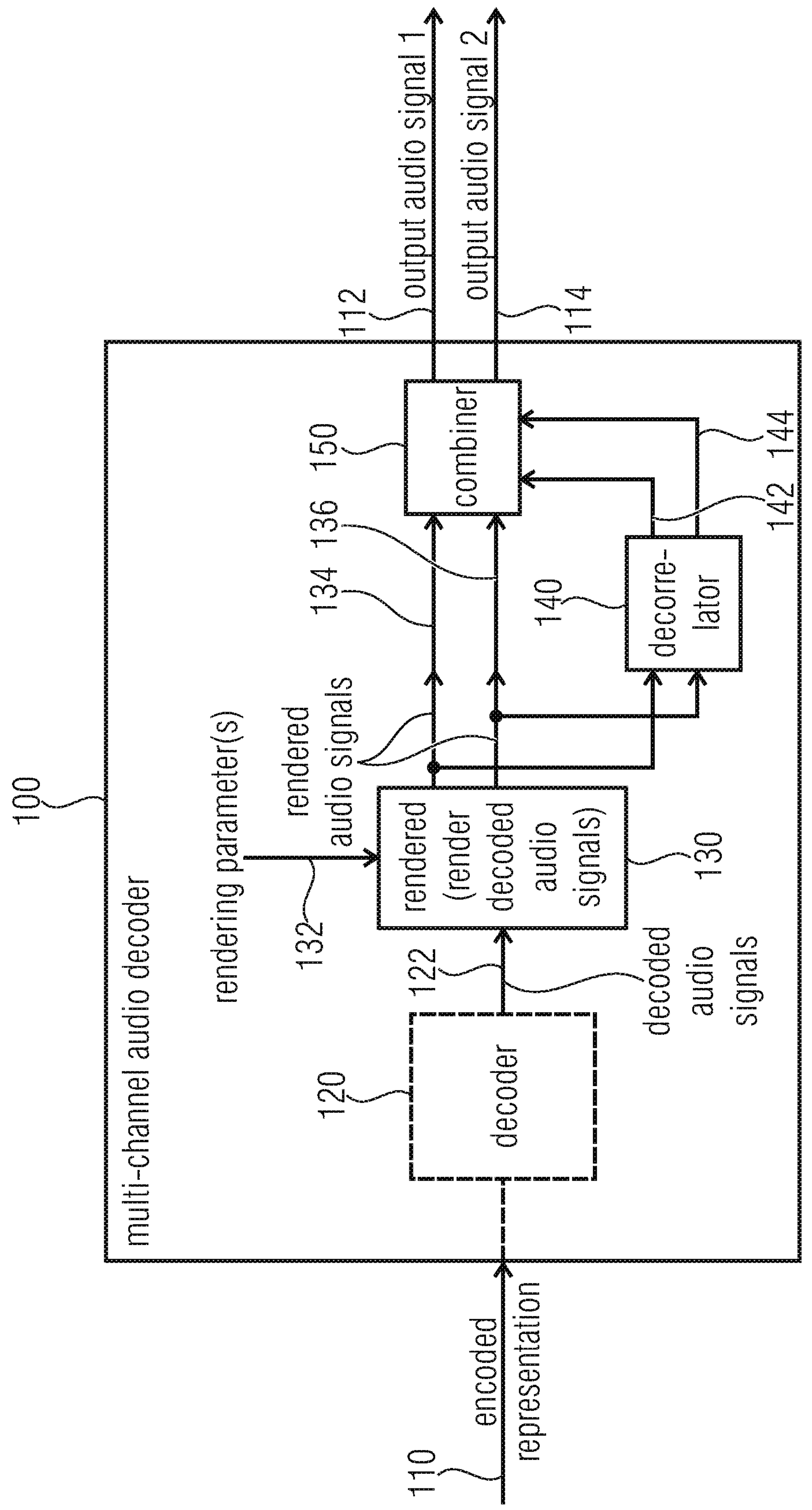
FIG. 1 shows a block schematic diagram of a multi-channel audio decoder, according to an embodiment of the present invention.

FIG. 1 shows a block schematic diagram of a multi-channel audio decoder 100, according to an embodiment of the present invention.

The multi-channel audio decoder 100 is configured to receive an encoded representation 110 and to provide, on the basis thereof, at least two output audio signals 112, 114.

The multi-channel audio decoder 100 comprises a decoder 120 which is configured to provide decoded audio signals 122 on the basis of the encoded representation 110. Moreover, the multi-channel audio decoder 100 comprises a renderer 130, which is configured to render a plurality of decoded audio signals 122, which are obtained on the basis of the encoded representation 110 (for example, by the decoder 120) in dependence on one or more rendering parameters 132, to obtain a plurality of rendered audio signals 134, 136. Moreover, the multi-channel audio decoder 100 comprises a decorrelator 140, which is configured to derive one or more decorrelated audio signals 142, 144 from the rendered audio signals 134, 136. Moreover, the multi-channel audio decoder 100 comprises a combiner 150, which is configured to combine the rendered audio signals 134, 136, or a scaled version thereof, with the one or more decorrelated audio signals 142, 144 to obtain the output audio signals 112, 114.

However, it should be noted that a different hardware structure of the multi-channel audio decoder 100 may be possible, as long as the functionalities described above are given.

Regarding the functionality of the multi-channel audio decoder 100, it should be noted that the decorrelated audio signals 142, 144 are derived from the rendered audio signals 134, 136, and that the decorrelated audio signals 142, 144 are combined with the rendered audio signals 134, 136 to obtain the output audio signals 112, 114. By deriving the decorrelated audio signals 142, 144 from the rendered audio signals 134, 136, a particularly efficient processing can be achieved, since the number of rendered audio signals 134, 136 is typically independent from the number of decoded audio signals 122 which are input into the renderer 130. Thus, the decorrelation effort is typically independent from the number of decoded audio signals 122, which improves the implementation efficiency. Moreover, applying the decorrelation after the rendering avoids the introduction of artifacts, which could be caused by the renderer when combining multiple decorrelated signals in the case that the decorrelation is applied before the rendering. Moreover, characteristics of the rendered audio signals can be considered in the decorrelation performed by the decorrelator 140, which typically results in output audio signals of good quality.

Moreover, it should be noted that the multi-channel audio decoder 100 can be supplemented by any of the features and functionalities described herein. In particular, it should be noted that individual improvements as described herein may be introduced into the multi-channel audio decoder 100 in order to thereby even improve the efficiency of the processing and/or the quality of the output audio signals.

2. Multi-Channel Audio Encoder According to FIG. 2

Figure 2:
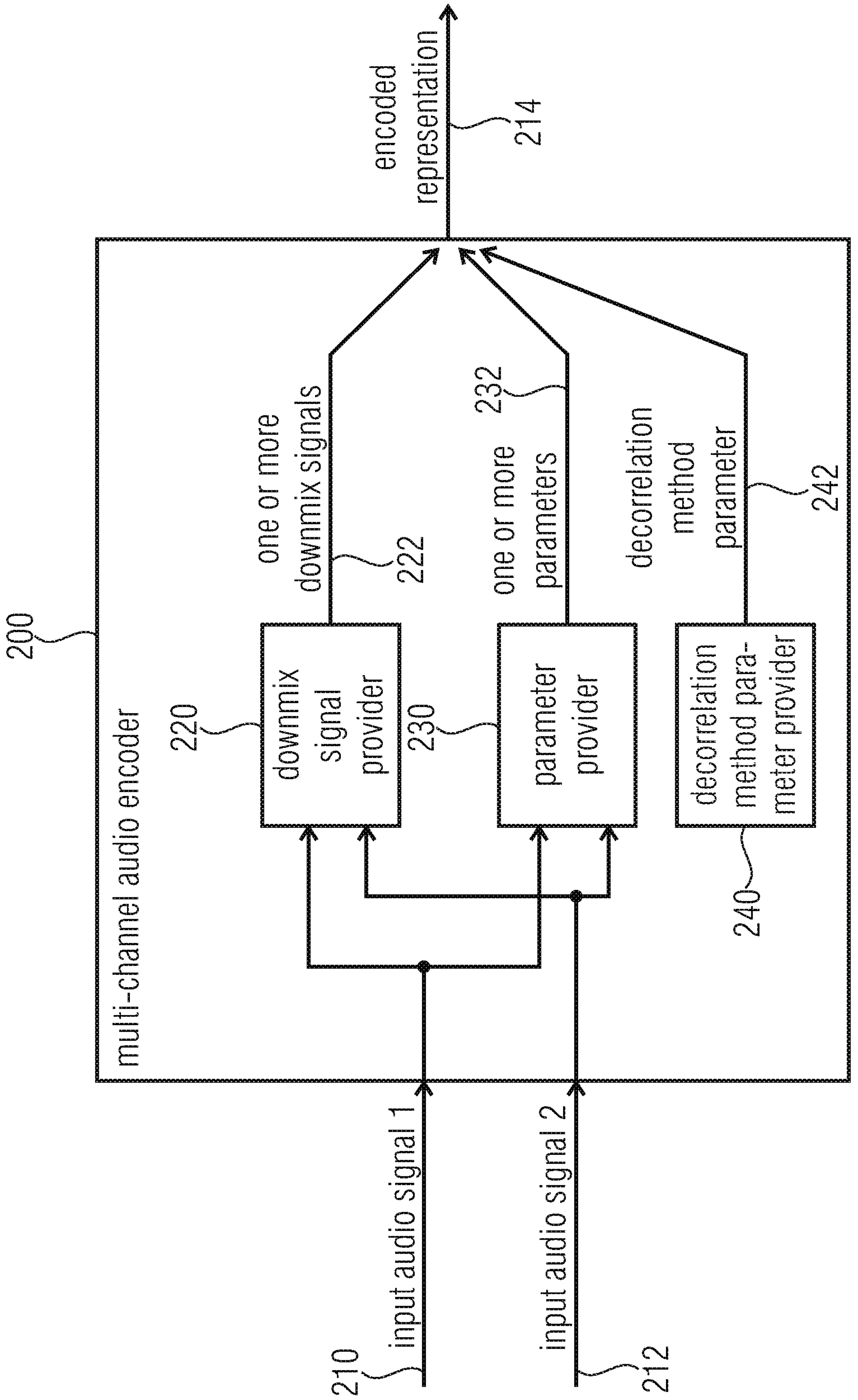
FIG. 2 shows a block schematic diagram of a multi-channel audio encoder, according to an embodiment of the present invention.

FIG. 2 shows a block schematic diagram of a multi-channel audio encoder 200, according to an embodiment of the present invention. The multi-channel audio encoder 200 is configured to receive two or more input audio signals 210, 212, and to provide, on the basis thereof, an encoded representation 214. The multi-channel audio encoder comprises a downmix signal provider 220, which is configured to provide one or more downmix signals 222 on the basis of the at least two input audio signals 210, 212. Moreover, the multi-channel audio encoder 200 comprises a parameter provider 230, which is configured to provide one or more parameters 232 describing a relationship (for example, a cross-correlation, a cross-covariance, a level difference or the like) between the at least two input audio signals 210, 212.

Moreover, the multi-channel audio encoder 200 also comprises a decorrelation method parameter provider 240, which is configured to provide a decorrelation method parameter 242 describing which decorrelation mode out of a plurality of decorrelation modes should be used at the side of an audio decoder. The one or more downmix signals 222, the one or more parameters 232 and the decorrelation method parameter 242 are included, for example, in an encoded form, into the encoded representation 214.

However, it should be noted that the hardware structure of the multi-channel audio encoder 200 may be different, as long as the functionalities as described above are fulfilled. In other words, the distribution of the functionalities of the multi-channel audio encoder 200 to individual blocks (for example, to the downmix signal provider 220, to the parameter provider 230 and to the decorrelation method parameter provider 240) should only be considered as an example.

Regarding the functionality of the multi-channel audio encoder 200, it should be noted that the one or more downmix signals 222 and the one or more parameters 232 are provided in a conventional way, for example like in an SAOC multi-channel audio encoder or in a USAC multi-channel audio encoder. However, the decorrelation method parameter 242, which is also provided by the multi-channel audio encoder 200 and included into the encoded representation 214, can be used to adapt a decorrelation mode to the input audio signals 210, 212 or to a desired playback quality. Accordingly, the decorrelation mode can be adapted to different types of audio content. For example, different decorrelation modes can be chosen for types of audio contents in which the input audio signals 210, 212 are strongly correlated and for types of audio content in which the input audio signals 210, 212 are independent. Moreover, different decorrelation modes can, for example, be signaled by the decorrelation mode parameter 242 for types of audio contents in which a spatial perception is particularly important and for types of audio content in which a spatial impression is less important or even of subordinate importance (for example, when compared to a reproduction of individual channels). Accordingly, a multi-channel audio decoder, which receives the encoded representation 214, can be controlled by the multi-channel audio encoder 200, and may be set to a decoding mode which brings along a best possible compromise between decoding complexity and reproduction quality.

Moreover, it should be noted that the multi-channel audio encoder 200 may be supplemented by any of the features and functionalities described herein. It should be noted that the possible additional features and improvements described herein may be added to the multi-channel audio encoder 200 individually or in combination, to thereby improve (or enhance) the multi-channel audio encoder 200.

3. Method for Providing at Least Two Output Audio Signals According to FIG. 3

Figure 3:
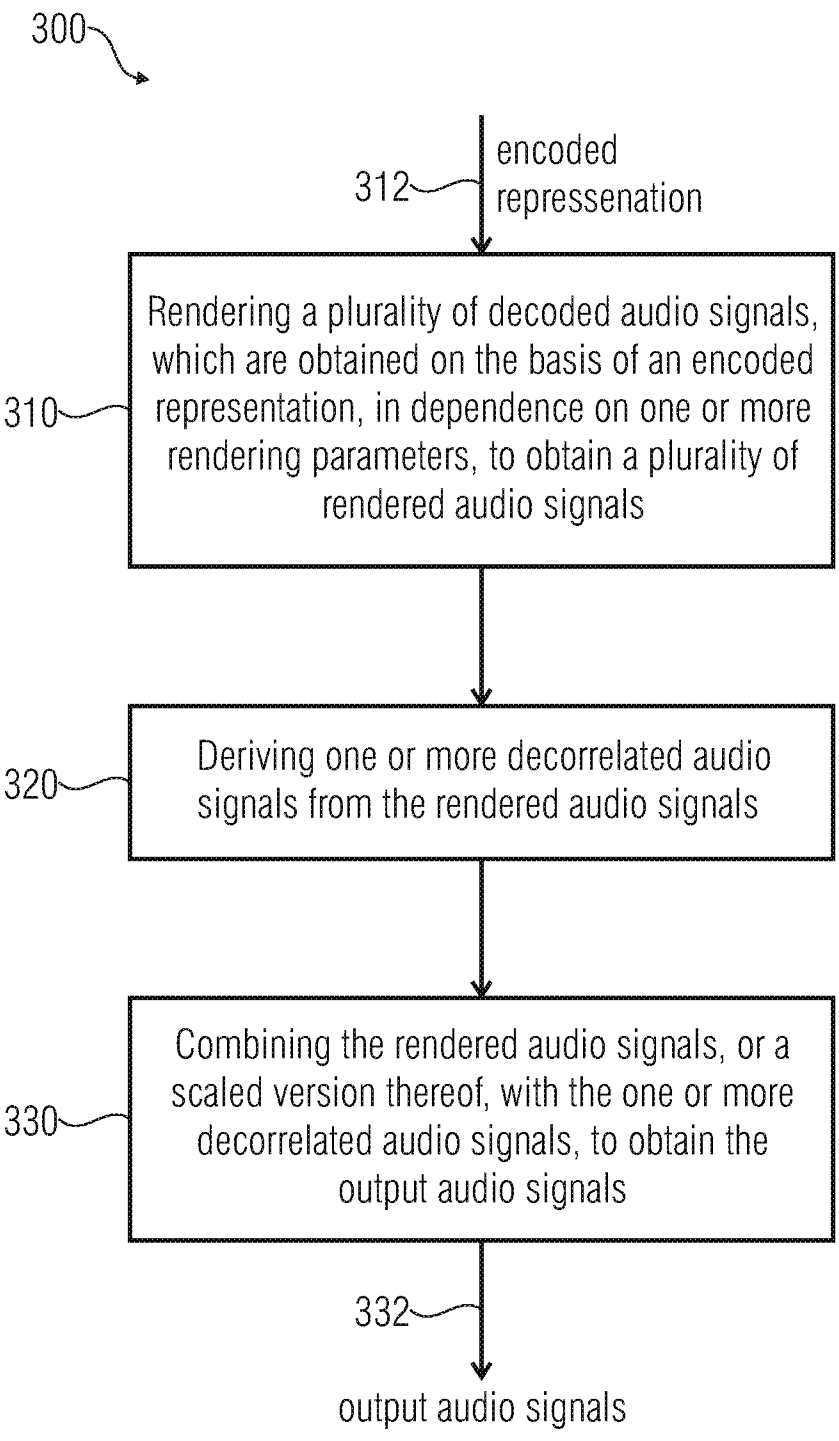
FIG. 3 shows a flowchart of a method for providing at least two output audio signals on the basis of an encoded representation, according to an embodiment of the invention.

FIG. 3 shows a flowchart of a method 300 for providing at least two output audio signals on the basis of an encoded representation. The method comprises rendering 310 a plurality of decoded audio signals, which are obtained on the basis of an encoded representation 312, in dependence on one or more rendering parameters, to obtain a plurality of rendered audio signals. The method 300 also comprises deriving 320 one or more decorrelated audio signals from the rendered audio signals. The method 300 also comprises combining 330 the rendered audio signals, or a scaled version thereof, with the one or more decorrelated audio signals, to obtain the output audio signals 332.

It should be noted that the method 300 is based on the same considerations as the multi-channel audio decoder 100 according to FIG. 1. Moreover, it should be noted that the method 300 may be supplemented by any of the features and functionalities described herein (either individually or in combination). For example, the method 300 may be supplemented by any of the features and functionalities described with respect to the multi-channel audio decoders described herein.

4. Method for Providing an Encoded Representation According to FIG. 4

Figure 4:
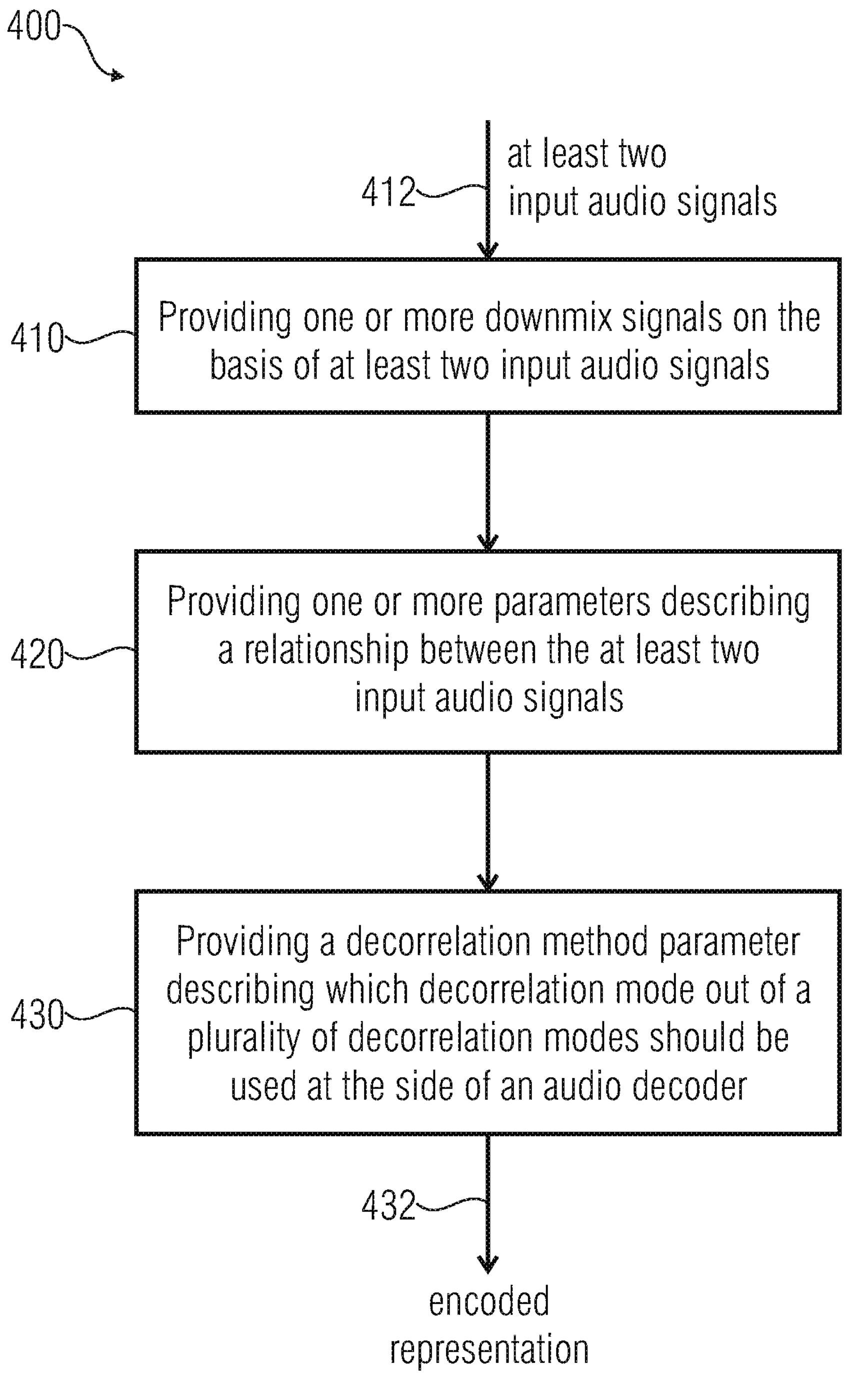
FIG. 4 shows a flowchart of a method for providing an encoded representation on the basis of at least two input audio signals, according to an embodiment of the present invention.

FIG. 4 shows a flowchart of a method 400 for providing an encoded representation on the basis of at least two input audio signals. The method 400 comprises providing 410 one or more downmix signals on the basis of at least two input audio signals 412. The method 400 further comprises providing 420 one or more parameters describing a relationship between the at least two input audio signals 412 and providing 430 a decorrelation method parameter describing which decorrelation mode out of a plurality of decorrelation modes should be used at the side of an audio decoder. Accordingly, an encoded representation 432 is provided, which includes an encoded representation of the one or more downmix signals, one or more parameters describing a relationship between the at least two input audio signals, and the decorrelation method parameter.

It should be noted that the method 400 is based on the same considerations as the multi-channel audio encoder 200 according to FIG. 2, such that the above explanations also apply.

Moreover, it should be noted that the order of the steps 410, 420, 430 can be varied flexibly, and that the steps 410, 420, 430 may also be performed in parallel as far as this is possible in an execution environment for the method 400. Moreover, it should be noted that the method 400 can be supplemented by any of the features and functionalities described herein, either individually or in combination. For example, the method 400 may be supplemented by any of the features and functionalities described herein with respect to the multi-channel audio encoders. However, it is also possible to introduce features and functionalities which correspond to the features and functionalities of the multi-channel audio decoders described herein, which receive the encoded representation 432.

5. Encoded Audio Representation According to FIG. 5

Figure 5:
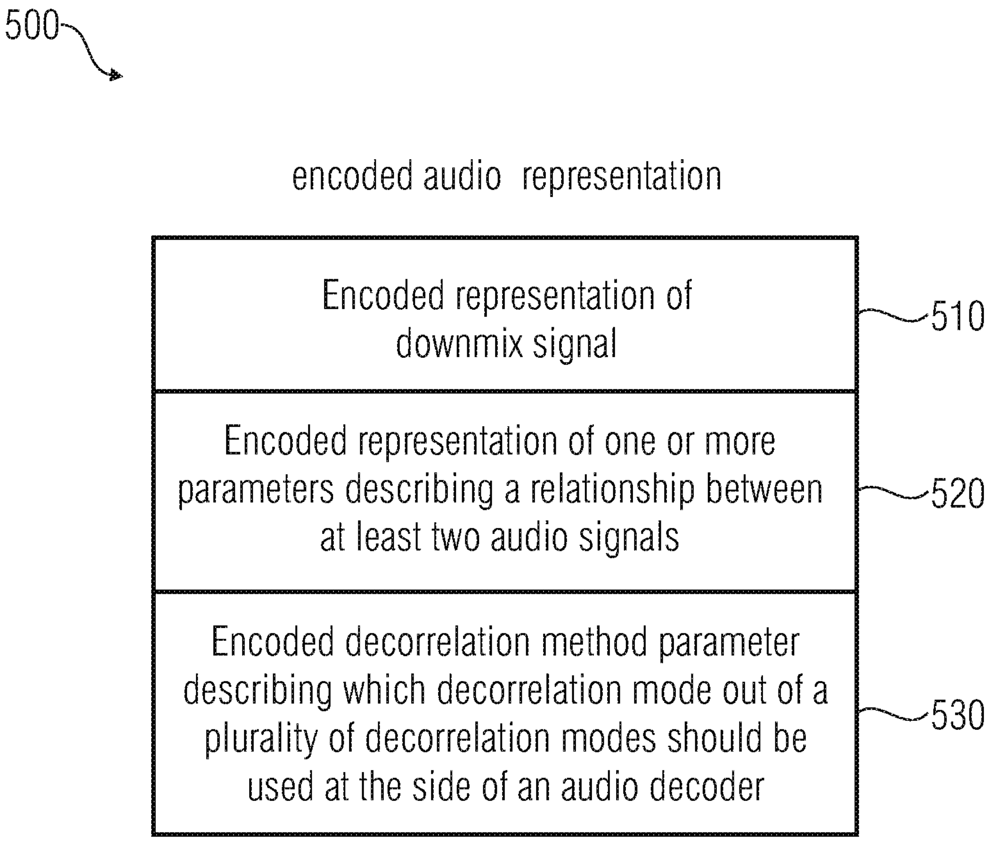
FIG. 5 shows a schematic representation of an encoded audio representation, according to an embodiment of the present invention.

FIG. 5 shows a schematic representation of an encoded audio representation 500 according to an embodiment of the present invention.

The encoded audio representation 500 comprises an encoded representation 510 of a downmix signal, an encoded representation 520 of one or more parameters describing a relationship between at least two audio signals. Moreover, the encoded audio representation 500 also comprises an encoded decorrelation method parameter 530 describing which decorrelation mode out of a plurality of decorrelation modes should be used at the side of an audio decoder. Accordingly, the encoded audio representation allows to signal a decorrelation mode from an audio encoder to an audio decoder. Accordingly, it is possible to obtain a decorrelation mode which is well-adapted to the characteristics of the audio content (which is described, for example, by the encoded representation 510 of one or more downmix signals and by the encoded representation 520 of one or more parameters describing a relationship between at least two audio signals (for example, the at least two audio signals which have been downmixed into the encoded representation 510 of one or more downmix signals)). Thus, the encoded audio representation 500 allows for a rendering of an audio content represented by the encoded audio representation 500 with a particularly good auditory spatial impression and/or a particularly good tradeoff between auditory spatial impression and decoding complexity.

Moreover, it should be noted that the encoded representation 500 may be supplemented by any of the features and functionalities described with respect to the multi-channel audio encoders and the multi-channel audio decoders, either individually or in combination.

6. Multi-Channel Decorrelator According to FIG. 6

Figure 6:
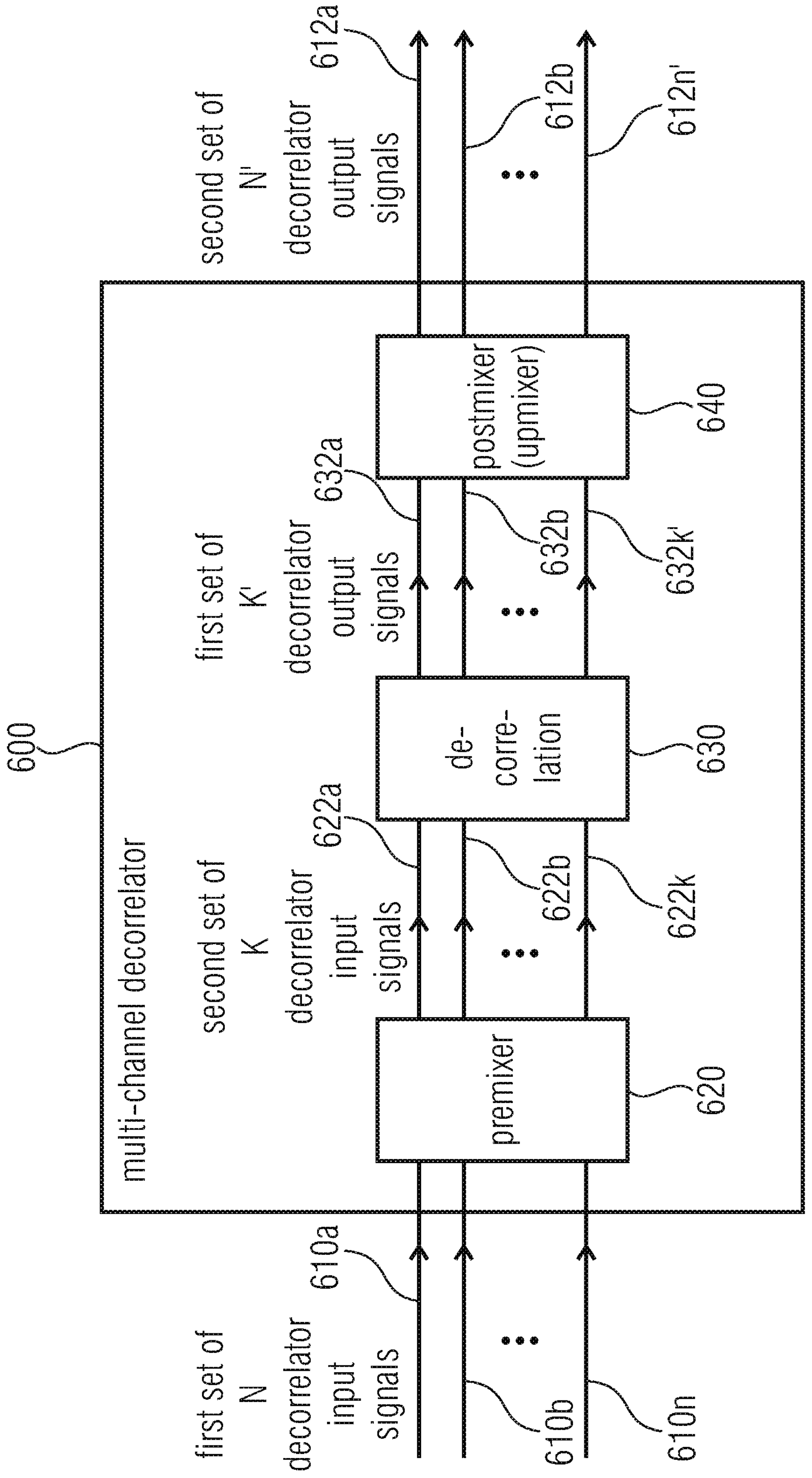
FIG. 6 shows a block schematic diagram of a multi-channel decorrelator, according to an embodiment of the present invention.

FIG. 6 shows a block schematic diagram of a multi-channel decorrelator 600, according to an embodiment of the present invention.

The multi-channel decorrelator 600 is configured to receive a first set of N decorrelator input signals 610*a* to 610*n* and provide, on the basis thereof, a second set of N' decorrelator output signals 612*a* to 612*n'*. In other words, the multi-channel decorrelator 600 is configured for providing a plurality of (at least approximately) decorrelated signals 612*a* to 612*n'* on the basis of the decorrelator input signals 610*a* to 610*n*.

The multi-channel decorrelator 600 comprises a premixer 620, which is configured to premix the first set of N decorrelator input signals 610*a* to 610*n* into a second set of K decorrelator input signals 622*a* to 622*k*, wherein K is smaller than N (with K and N being integers). The multi-channel decorrelator 600 also comprises a decorrelation (or decorrelator core) 630, which is configured to provide a first set of K' decorrelator output signals 632*a* to 632*k'* on the basis of the second set of K decorrelator input signals 622*a* to 622*k*. Moreover, the multi-channel decorrelator comprises an postmixer 640, which is configured to upmix the first set of K' decorrelator output signals 632*a* to 632*k'* into a second set of N' decorrelator output signals 612*a* to 612*n'*, wherein N' is larger than K' (with N' and K' being integers).

However, it should be noted that the given structure of the multi-channel decorrelator 600 should be considered as an example only, and that it is not necessitated to subdivide the multi-channel decorrelator 600 into functional blocks (for example, into the premixer 620, the decorrelation or decorrelator core 630 and the postmixer 640) as long as the functionality described herein is provided.

Regarding the functionality of the multi-channel decorrelator 600, it should also be noted that the concept of performing a premixing, to derive the second set of K decorrelator input signals from the first set of N decorrelator input signals, and of performing the decorrelation on the basis of the (premixed or "downmixed") second set of K decorrelator input signals brings along a reduction of a complexity when compared to a concept in which the actual decorrelation is applied, for example, directly to N decorrelator input signals. Moreover, the second (upmixed) set of N' decorrelator output signals is obtained on the basis of the first (original) set of decorrelator output signals, which are the result of the actual decorrelation, on the basis of an postmixing, which may be performed by the upmixer 640. Thus, the multi-channel decorrelator 600 effectively (when seen from the outside) receives N decorrelator input signals and provides, on the basis thereof, N' decorrelator output signals, while the actual decorrelator core 630 only operates on a smaller number of signals (namely K downmixed decorrelator input signals 622*a* to 622*k* of the second set of K decorrelator input signals). Thus, the complexity of the multi-channel decorrelator 600 can be substantially reduced, when compared to conventional decorrelators, by performing a downmixing or "premixing" (which may be a linear premixing without any decorrelation functionality) at an input side of the decorrelation (or decorrelator core) 630 and by performing the upmixing or "postmixing" (for example, a linear upmixing without any additional decorrelation functionality) on the basis of the (original) output signals 632*a* to 632*k*' of the decorrelation (decorrelator core) 630.

Moreover, it should be noted that the multi-channel decorrelator 600 can be supplemented by any of the features and functionalities described herein with respect to the multi-channel decorrelation and also with respect to the multi-channel audio decoders. It should be noted that the features described herein can be added to the multi-channel decorrelator 600 either individually or in combination, to thereby improve or enhance the multi-channel decorrelator 600.

It should be noted that a multi-channel decorrelator without complexity reduction can be derived from the above described multichannel decorrelator for K=N (and possibly K'=N' or even K=N=K'=N').

7. Multi-Channel Audio Decoder According to FIG. 7

Figure 7:
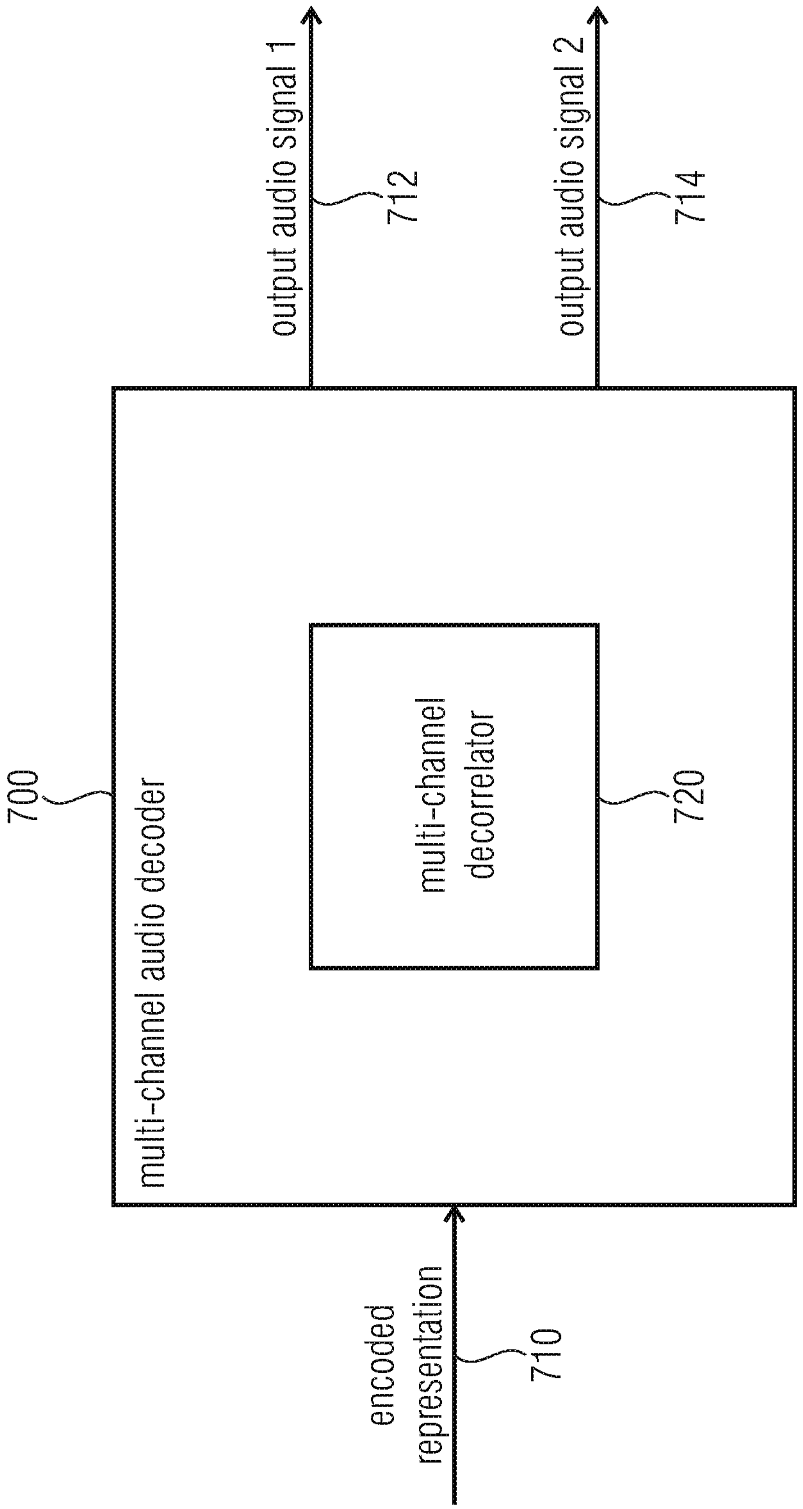
FIG. 7 shows a block schematic diagram of a multi-channel audio decoder, according to an embodiment of the present invention.

FIG. 7 shows a block schematic diagram of a multi-channel audio decoder 700, according to an embodiment of the invention.

The multi-channel audio decoder 700 is configured to receive an encoded representation 710 and to provide, on the basis of thereof, at least two output signals 712, 714. The multi-channel audio decoder 700 comprises a multi-channel decorrelator 720, which may be substantially identical to the multi-channel decorrelator 600 according to FIG. 6. Moreover, the multi-channel audio decoder 700 may comprise any of the features and functionalities of a multi-channel audio decoder which are known to the man skilled in the art or which are described herein with respect to other multi-channel audio decoders.

Moreover, it should be noted that the multi-channel audio decoder 700 comprises a particularly high efficiency when compared to conventional multi-channel audio decoders, since the multi-channel audio decoder 700 uses the high-efficiency multi-channel decorrelator 720.

8. Multi-Channel Audio Encoder According to FIG. 8

Figure 8:
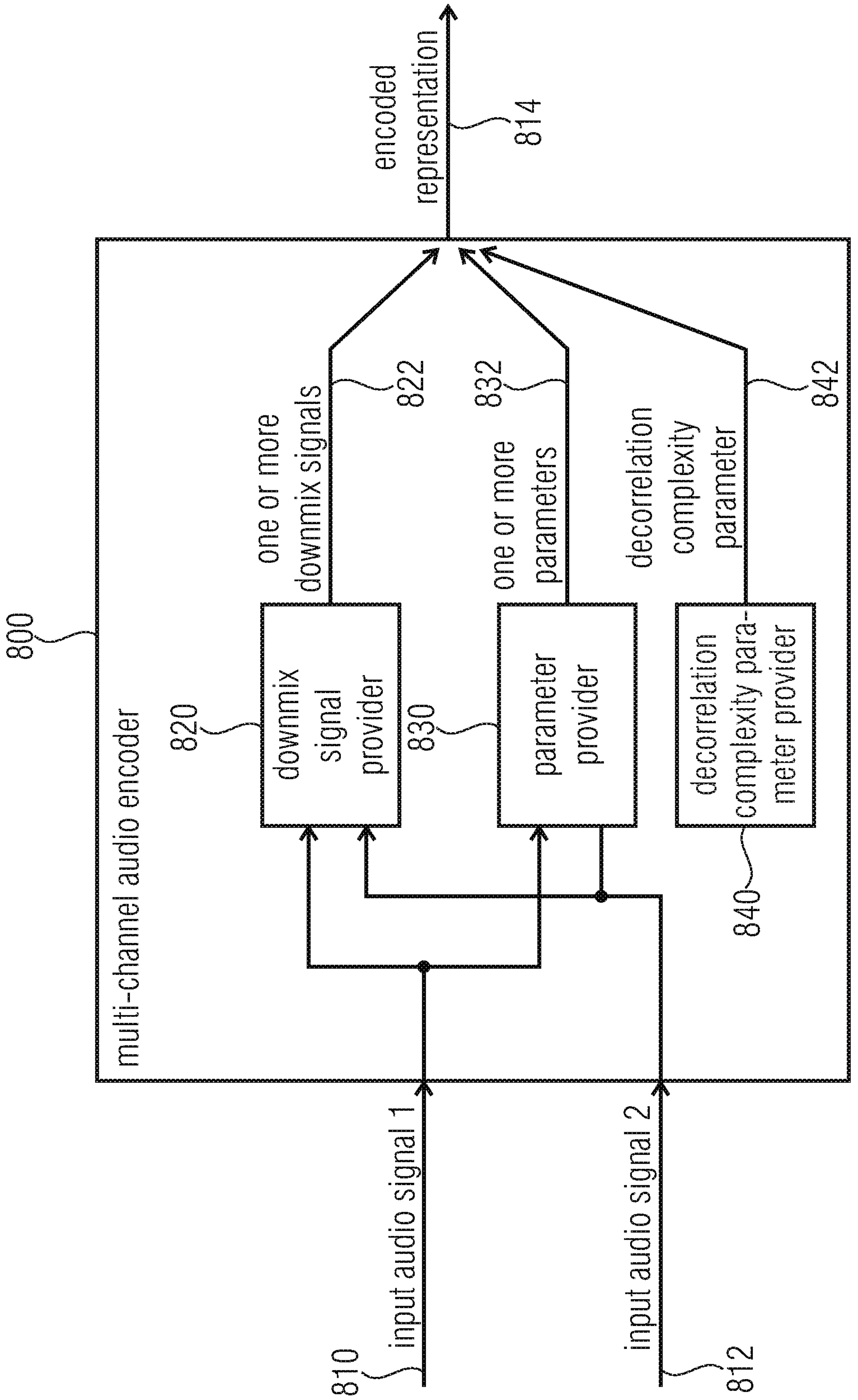
FIG. 8 shows a block schematic diagram of a multi-channel audio encoder, according to an embodiment of the present invention.

FIG. 8 shows a block schematic diagram of a multi-channel audio encoder 800 according to an embodiment of the present invention. The multi-channel audio encoder 800 is configured to receive at least two input audio signals 810, 812 and to provide, on the basis thereof, an encoded representation 814 of an audio content represented by the input audio signals 810, 812.

The multi-channel audio encoder 800 comprises a downmix signal provider 820, which is configured to provide one or more downmix signals 822 on the basis of the at least two input audio signals 810, 812. The multi-channel audio encoder 800 also comprises a parameter provider 830 which is configured to provide one or more parameters 832 (for example, cross-correlation parameters or cross-covariance parameters, or inter-object-correlation parameters and/or object level difference parameters) on the basis of the input audio signals 810,812. Moreover, the multi-channel audio encoder 800 comprises a decorrelation complexity parameter provider 840 which is configured to provide a decorrelation complexity parameter 842 describing a complexity of a decorrelation to be used at the side of an audio decoder (which receives the encoded representation 814). The one or more downmix signals 822, the one or more parameters 832 and the decorrelation complexity parameter 842 are included into the encoded representation 814, advantageously in an encoded form.

However, it should be noted that the internal structure of the multi-channel audio encoder 800 (for example, the presence of the downmix signal provider 820, of the parameter provider 830 and of the decorrelation complexity parameter provider 840) should be considered as an example only. Different structures are possible as long as the functionality described herein is achieved.

Regarding the functionality of the multi-channel audio encoder 800, it should be noted that the multi-channel encoder provides an encoded representation 814, wherein the one or more downmix signals 822 and the one or more parameters 832 may be similar to, or equal to, downmix signals and parameters provided by conventional audio encoders (like, for example, conventional SAOC audio encoders or USAC audio encoders). However, the multi-channel audio encoder 800 is also configured to provide the decorrelation complexity parameter 842, which allows to determine a decorrelation complexity which is applied at the side of an audio decoder. Accordingly, the decorrelation complexity can be adapted to the audio content which is currently encoded. For example, it is possible to signal a desired decorrelation complexity, which corresponds to an achievable audio quality, in dependence on an encoder-sided knowledge about the characteristics of the input audio signals. For example, if it is found that spatial characteristics are important for an audio signal, a higher decorrelation complexity can be signaled, using the decorrelation complexity parameter 842, when compared to a case in which spatial characteristics are not so important. Alternatively, the usage of a high decorrelation complexity can be signaled using the decorrelation complexity parameter 842, if it is found that a passage of the audio content or the entire audio content is such that a high complexity decorrelation is necessitated at a side of an audio decoder for other reasons.

To summarize, the multi-channel audio encoder 800 provides for the possibility to control a multi-channel audio decoder, to use a decorrelation complexity which is adapted to signal characteristics or desired playback characteristics which can be set by the multi-channel audio encoder 800.

Moreover, it should be noted that the multi-channel audio encoder 800 may be supplemented by any of the features and functionalities described herein regarding a multi-channel audio encoder, either individually or in combination. For example, some or all of the features described herein with respect to multi-channel audio encoders can be added to the multi-channel audio encoder 800. Moreover, the multi-channel audio encoder 800 may be adapted for cooperation with the multi-channel audio decoders described herein.

9. Method for Providing a Plurality of Decorrelated Signals on the Basis of a Plurality of Decorrelator Input Signals, According to FIG. 9

Figure 9:
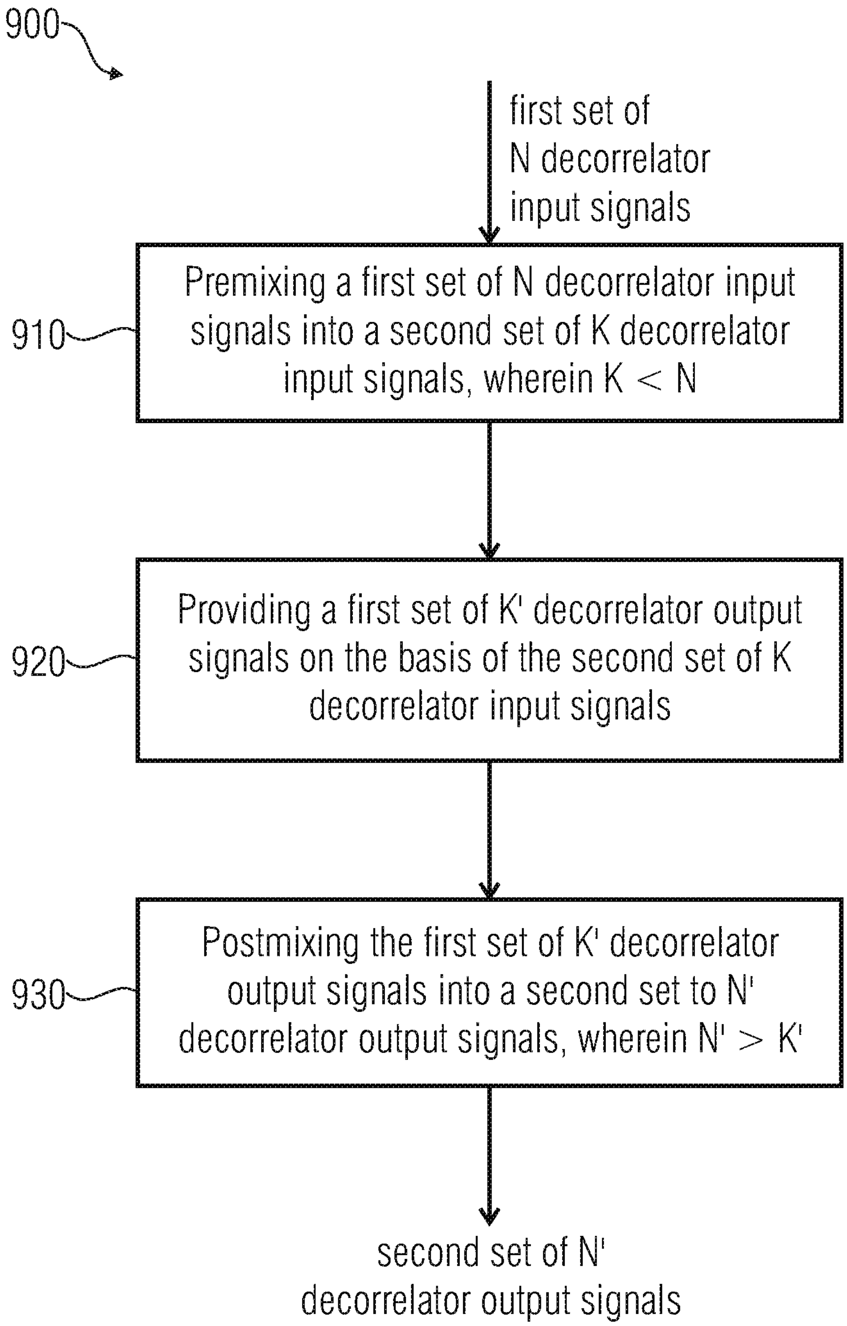
FIG. 9 shows a flowchart of a method for providing plurality of decorrelated signals on the basis of a plurality of decorrelator input signals, according to an embodiment of the present invention.

FIG. 9 shows a flowchart of a method 900 for providing a plurality of decorrelated signals on the basis of a plurality of decorrelator input signals.

The method 900 comprises premixing 910 a first set of N decorrelator input signals into a second set of K decorrelator input signals, wherein K is smaller than N. The method 900 also comprises providing 920 a first set of K' decorrelator output signals on the basis of the second set of K decorrelator input signals. For example, the first set of K' decorrelator output signals may be provided on the basis of the second set of K decorrelator input signals using a decorrelation, which may be performed, for example, using a decorrelator core or using a decorrelation algorithm. The method 900 further comprises postmixing 930 the first set of K' decorrelator output signals into a second set to N' decorrelator output signals, wherein N' is larger than K' (with N' and K' being integer numbers). Accordingly, the second set of N' decorrelator output signals, which are the output of the method 900, may be provided on the basis of the first set of N decorrelator input signals, which are the input to the method 900.

It should be noted that the method 900 is based on the same considerations as the multi-channel decorrelator described above. Moreover, it should be noted that the method 900 may be supplemented by any of the features and functionalities described herein with respect to the multi-channel decorrelator (and also with respect to the multi-channel audio encoder, if applicable), either individually or taken in combination.

10. Method for Providing at Least Two Output Audio Signals on the Basis of an Encoded Representation, According to FIG. 10

Figure 10:
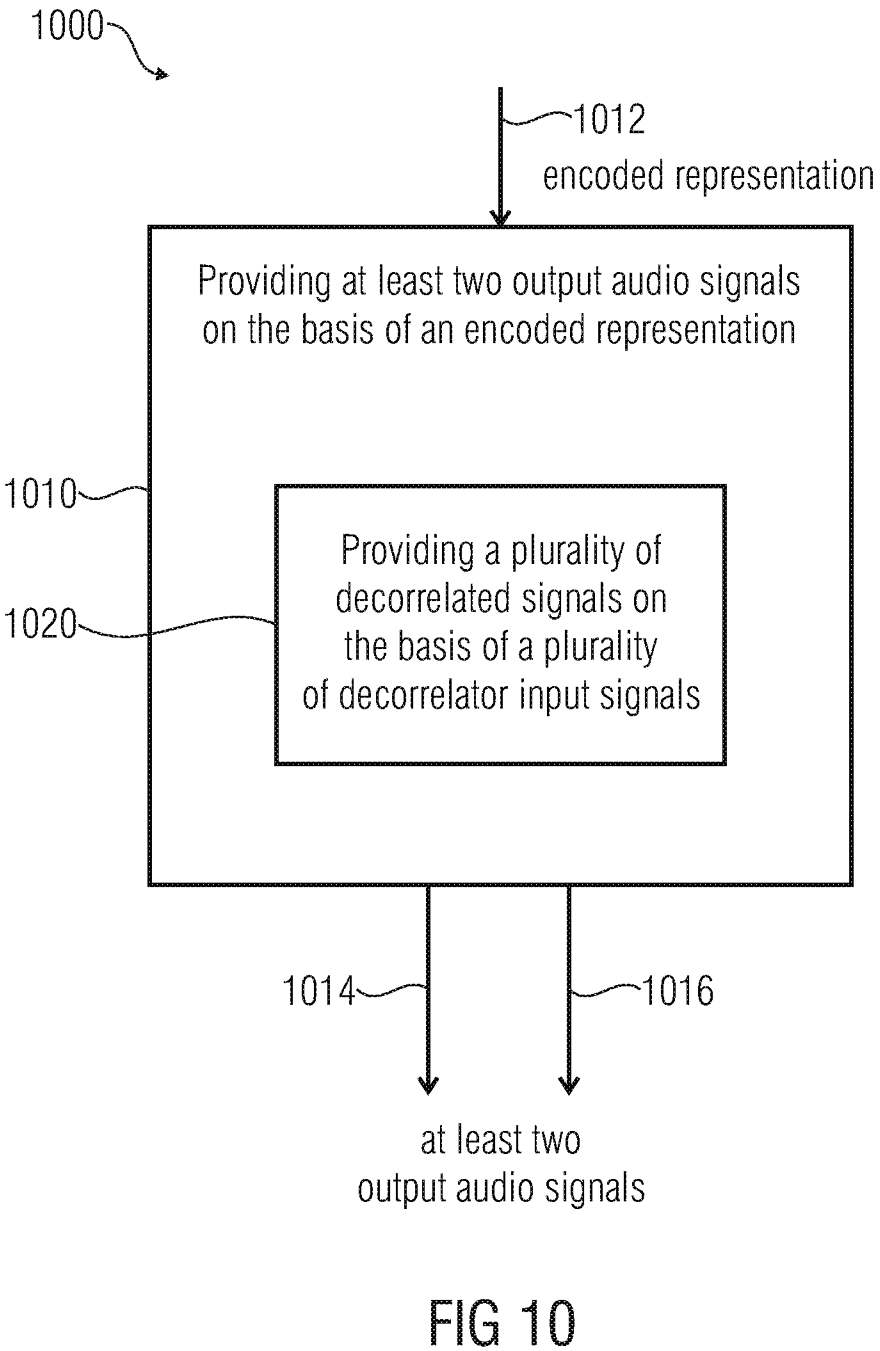
FIG. 10 shows a flowchart of a method for providing at least two output audio signals on the basis of an encoded representation, according to an embodiment of the present invention.

FIG. 10 shows a flowchart of a method 1000 for providing at least two output audio signals on the basis of an encoded representation.

The method 1000 comprises providing 1010 at least two output audio signals 1014, 1016 on the basis of an encoded representation 1012. The method 1000 comprises providing 1020 a plurality of decorrelated signals on the basis of a plurality of decorrelator input signals in accordance with the method 900 according to FIG. 9.

It should be noted that the method 1000 is based on the same considerations as the multi-channel audio decoder 700 according to FIG. 7.

Also, it should be noted that the method 1000 can be supplemented by any of the features and functionalities described herein with respect to the multi-channel decoders, either individually or in combination.

11. Method for Providing an Encoded Representation on the Basis of at Least Two Input Audio Signals, According to FIG. 11

Figure 11:
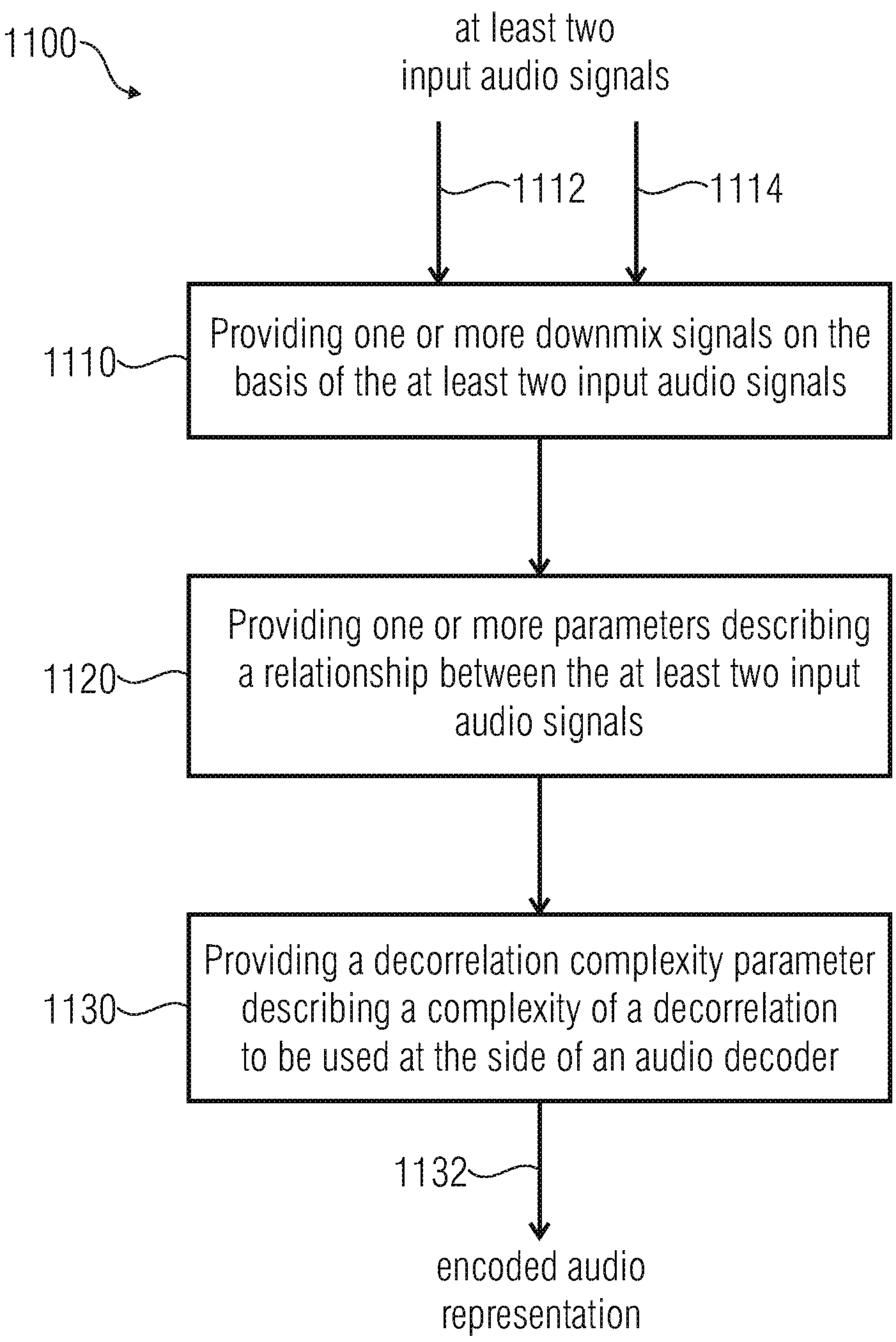
FIG. 11 shows a flowchart of a method for providing an encoded representation on the basis of at least two input audio signals, according to an embodiment of the present invention.

FIG. 11 shows a flowchart of a method 1100 for providing an encoded representation on the basis of at least two input audio signals.

The method 1100 comprises providing 1110 one or more downmix signals on the basis of the at least two input audio signals 1112, 1114. The method 1100 also comprises providing 1120 one or more parameters describing a relationship between the at least two input audio signals 1112, 1114. Furthermore, the method 1100 comprises providing 1130 a decorrelation complexity parameter describing a complexity of a decorrelation to be used at the side of an audio decoder. Accordingly, an encoded representation 1132 is provided on the basis of the at least two input audio signals 1112, 1114, wherein the encoded representation typically comprises the one or more downmix signals, the one or more parameters describing a relationship between the at least two input audio signals and the decorrelation complexity parameter in an encoded form.

It should be noted that the steps 1110, 1120, 1130 may be performed in parallel or in a different order in some embodiments according to the invention. Moreover, it should be noted that the method 1100 is based on the same considerations as the multi-channel audio encoder 800 according to FIG. 8, and that the method 1100 can be supplemented by any of the features and functionalities described herein with respect to the multi-channel audio encoder, either in combination or individually. Moreover, it should be noted that the method 1100 can be adapted to match the multi-channel audio decoder and the method for providing at least two output audio signals described herein.

12. Encoded Audio Representation According to FIG. 12

Figure 12:
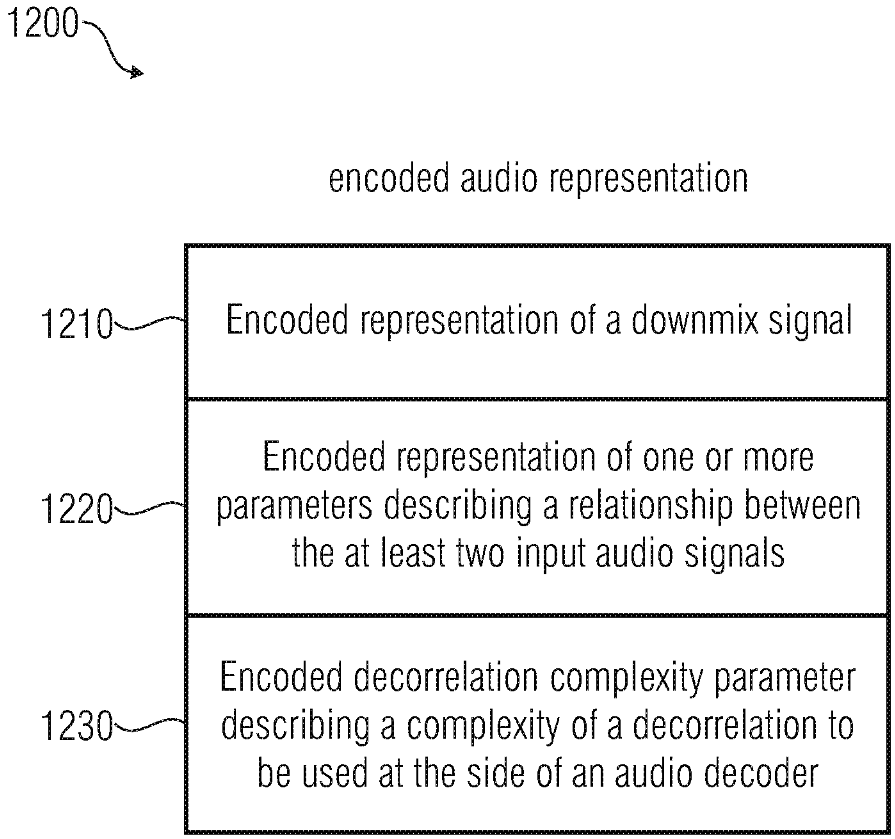
FIG. 12 shows a schematic representation of an encoded representation, according to an embodiment of the present invention.

FIG. 12 shows a schematic representation of an encoded audio representation, according to an embodiment of the present invention. The encoded audio representation 1200 comprises an encoded representation 1210 of a downmix signal, an encoded representation 1220 of one or more parameters describing a relationship between the at least two input audio signals, and an encoded decorrelation complexity parameter 1230 describing a complexity of a decorrelation to be used at the side of an audio decoder. Accordingly, the encoded audio representation 1200 allows to adjust the decorrelation complexity used by a multi-channel audio decoder, which brings along an improved decoding efficiency, and possible an improved audio quality, or an improved tradeoff between coding efficiency and audio quality. Moreover, it should be noted that the encoded audio representation 1200 may be provided by the multi-channel audio encoder as described herein, and may be used by the multi-channel audio decoder as described herein. Accordingly, the encoded audio representation 1200 can be supplemented by any of the features described with respect to the multi-channel audio encoders and with respect to the multi-channel audio decoders.

13. Notation and Underlying Considerations

Recently, parametric techniques for the bitrate efficient transmission/storage of audio scenes containing multiple audio objects have been proposed in the field of audio coding (see, for example, references [BCC], [JSC], [SAOC], [SAOC1], [SAOC2]) and informed source separation (see, for example, references [ISS1], [ISS2], [ISS3], [ISS4], [ISS5], [ISS6]). These techniques aim at reconstructing a desired output audio scene or audio source object based on additional side information describing the transmitted/stored audio scene and/or source objects in the audio scene. This reconstruction takes place in the decoder using a parametric informed source separation scheme. Moreover, reference is also made to the so-called "MPEG Surround" concept, which is described, for example, in the international standard ISO/IEC 23003-1:2007. Moreover, reference is also made to the so-called "Spatial Audio Object Coding" which is described in the international standard ISO/IEC 23003-2:2010. Furthermore, reference is made to the so-called "Unified Speech and Audio Coding" concept, which is described in the international standard ISO/IEC 23003-3:2012. Concepts from these standards can be used in embodiments according to the invention, for example, in the multi-channel audio encoders mentioned herein and the multichannel audio decoders mentioned herein, wherein some adaptations may be necessitated.

In the following, some background information will be described. In particular, an overview on parametric separation schemes will be provided, using the example of MPEG spatial audio object coding (SAOC) technology (see, for example, the reference [SAOC]). The mathematical properties of this method are considered.

13.1. Notation and Definitions

The following mathematical notation is applied in the current document:

$N_{Objects}$ number of audio object signals
$N_{DmxCh}$ number of downmix (processed) channels
$N_{UpmixCh}$ number of upmix (output) channels
$N_{Samples}$ number of processed data samples
D downmix matrix, size $N_{DmxCh} \times N_{Objects}$
X input audio object signal, size $N_{Objects} \times N_{Samples}$
$E_X$ object covariance matrix, size $N_{Objects} \times N_{Objects}$ defined as $E_X = XX^H$
Y downmix audio signal, size $N_{DmxCh} \times N_{Samples}$ defined as $Y = DX$
$E_Y$ covariance matrix of the downmix signals, size $N_{DmxCh} \times N_{DmxCh}$ defined as $E_Y = YY^H$
G parametric source estimation matrix, size $N_{Objects} \times N_{DmxCh}$ which approximates $E_X D^H (D E_X D^H)^{-1}$
$\hat{X}$ parametrically reconstructed object signal, size $N_{Objects} \times N_{Samples}$ which approximates X and defined as $\hat{X} = GY$
R rendering matrix (specified at the decoder side), size $N_{UpmixCh} \times N_{Objects}$
Z ideal rendered output scene signal, size $N_{UpmixCh} \times N_{Samples}$ defined as $Z = RX$
$\hat{Z}$ rendered parametric output, size $N_{UpmixCh} \times N_{Samples}$ defined as $\hat{Z} = R\hat{X}$
C covariance matrix of the ideal output, size $N_{UpmixCh} \times N_{UpmixCh}$ defined as $C = R E_X R^H$
W decorrelator outputs, size $N_{UpmixCh} \times N_{Samples}$
S combined signal $$S = \begin{bmatrix} \hat{Z} \\ W \end{bmatrix},$$

size $2N_{UpmixCh} \times N_{Samples}$
$E_S$ combined signal covariance matrix, size $2N_{UpmixCh} \times 2N_{UpmixCh}$ defined as $E_S = SS^H$
$\tilde{Z}$ final output, size $N_{UpmixCh} \times N_{Samples}$
$(\cdot)^H$ self-adjoint (Hermitian) operator which represents the complex conjugate transpose of $(\cdot)$. The notation $(\cdot)^*$ can be also used.
$F_{decorr}(\cdot)$ decorrelator function
ε is an additive constant or a limitation constant (for example, used in a "maximum" operation or a "max" operation) to avoid division by zero
H=matdiag(M) is a matrix containing the elements from the main diagonal of matrix M on the main diagonal and zero values on the off-diagonal positions.

Without loss of generality, in order to improve readability of equations, for all introduced variables the indices denoting time and frequency dependency are omitted in this document.

13.2. Parametric Separation Systems

General parametric separation systems aim to estimate a number of audio sources from a signal mixture (downmix) using auxiliary parameter information (like, for example, inter-channel correlation values, inter-channel level difference values, inter-object correlation values and/or object level difference information). A typical solution of this task is based on application of the minimum mean squared error (MMSE) estimation algorithms. The SAOC technology is one example of such parametric audio encoding/decoding systems.

Figure 13:
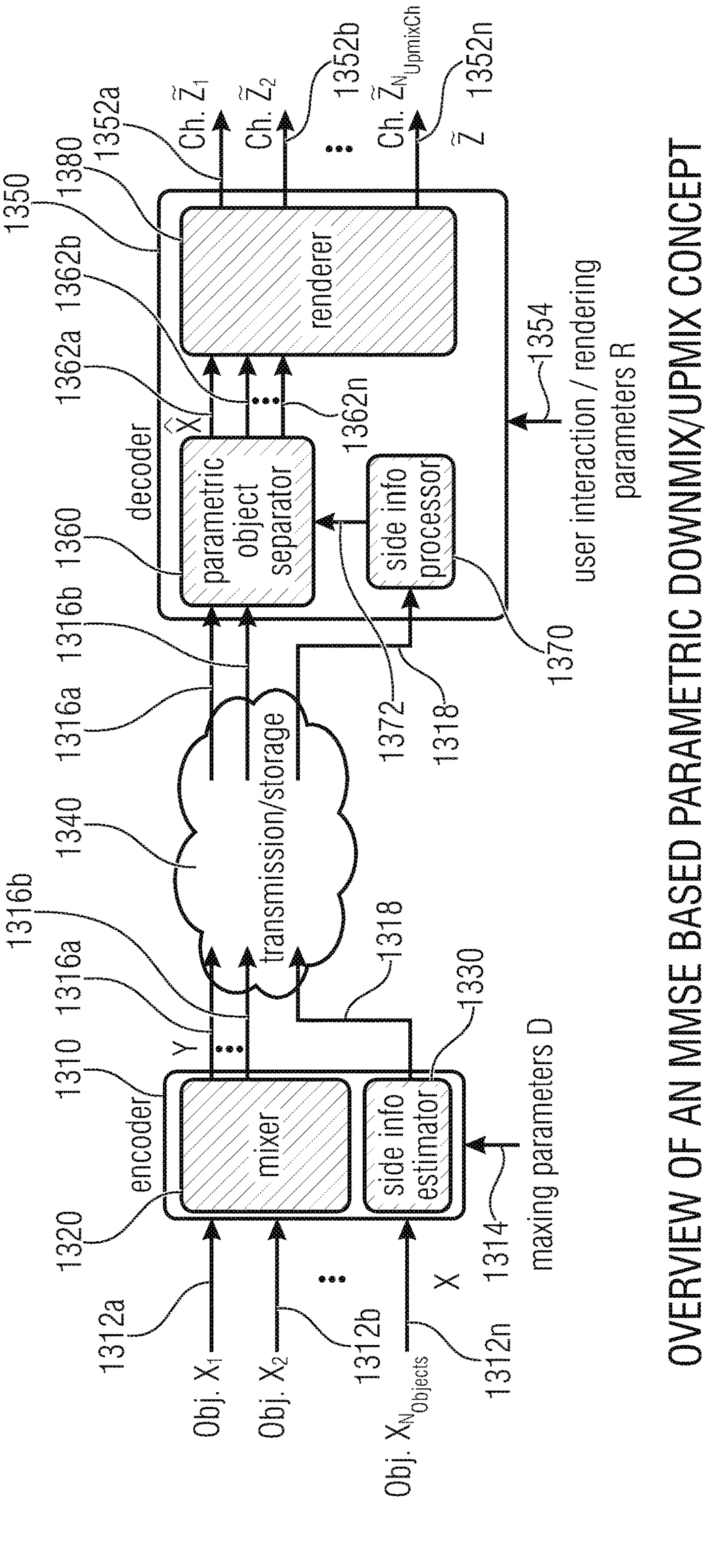
FIG. 13 shows schematic representation which provides an overview of an MMSE based parametric downmix/upmix concept.

FIG. 13 shows the general principle of the SAOC encoder/decoder architecture. In other words, FIG. 13 shows, in the form of a block schematic diagram, an overview of the MMSE based parametric downmix/upmix concept.

An encoder 1310 receives a plurality of object signals 1312*a*, 1312*b* to 1312*n*. Moreover, the encoder 1310 also receives mixing parameters D, 1314, which may, for example, be downmix parameters. The encoder 1310 provides, on the basis thereof, one or more downmix signals 1316*a*, 1316*b*, and so on. Moreover, the encoder provides a side information 1318 The one or more downmix signals and the side information may, for example, be provided in an encoded form.

The encoder 1310 comprises a mixer 1320, which is typically configured to receive the object signals 1312*a* to 1312*n* and to combine (for example downmix) the object signals 1312*a* to 1312*n* into the one or more downmix signals 1316*a*, 1316*b* in dependence on the mixing parameters 1314. Moreover, the encoder comprises a side information estimator 1330, which is configured to derive the side information 1318 from the object signals 1312*a* to 1312*n*. For example, the side information estimator 1330 may be configured to derive the side information 1318 such that the side information describes a relationship between object signals, for example, a cross-correlation between object signals (which may be designated as "inter-object-correlation" IOC) and/or an information describing level differences between object signals (which may be designated as a "object level difference information" OLD).

The one or more downmix signals 1316*a*, 1316*b* and the side information 1318 may be stored and/or transmitted to a decoder 1350, which is indicated at reference numeral 1340.

The decoder 1350 receives the one or more downmix signals 1316*a*, 1316*b* and the side information 1318 (for example, in an encoded form) and provides, on the basis thereof, a plurality of output audio signals 1352*a* to 1352*n*. The decoder 1350 may also receive a user interaction information 1354, which may comprise one or more rendering parameters R (which may define a rendering matrix). The decoder 1350 comprises a parametric object separator 1360, a side information processor 1370 and a renderer 1380. The side information processor 1370 receives the side information 1318 and provides, on the basis thereof, a control information 1372 for the parametric object separator 1360. The parametric object separator 1360 provides a plurality of object signals 1362*a* to 1362*n* on the basis of the downmix signals 1360*a*, 1360*b* and the control information 1372, which is derived from the side information 1318 by the side information processor 1370. For example, the object separator may perform a decoding of the encoded downmix signals and an object separation. The renderer 1380 renders the reconstructed object signals 1362*a* to 1362*n*, to thereby obtain the output audio signals 1352*a* to 1352*n*.

In the following, the functionality of the MMSE based parameter downmix/upmix concept will be discussed.

The general parametric downmix/upmix processing is carried out in a time/frequency selective way and can be described as a sequence of the following steps:

The "encoder" 1310 is provided with input "audio objects" X and "mixing parameters" D. The "mixer" 1320 downmixes the "audio objects" X into a number of "downmix signals" Y using "mixing parameters" D (e.g., downmix gains). The "side info estimator" extracts the side information 1318 describing characteristics of the input "audio objects" X (e.g., covariance properties).

The "downmix signals" Y and side information are transmitted or stored. These downmix audio signals can be further compressed using audio coders (such as MPEG-1/2 Layer II or III, MPEG-2/4 Advanced Audio Coding (AAC), MPEG Unified Speech and Audio Coding (USAC), etc.). The side information can be also represented and encoded efficiently (e.g., as loss-less coded relations of the object powers and object correlation coefficients).

The "decoder" 1350 restores the original "audio objects" from the decoded "downmix signals" using the transmitted side information 1318. The "side info processor" 1370 estimates the un-mixing coefficients 1372 to be applied on the "downmix signals" within "parametric object separator" 1360 to obtain the parametric object reconstruction of X. The reconstructed "audio objects" 1362*a* to 1362*n* are rendered to a (multi-channel) target scene, represented by the output channels $\hat{Z}$, by applying "rendering parameters" R, 1354.

Moreover, it should be noted that the functionalities described with respect to the encoder 1310 and the decoder 1350 may be used in the other audio encoders and audio decoders described herein as well.

13.3. Orthogonality Principle of Minimum Mean Squared Error Estimation

Orthogonality principle is one major property of MMSE estimators. Consider two Hilbert spaces W and V, with V spanned by a set of vectors $y_i$, and a vector $x \in W$. If one wishes to find an estimate $\hat{x} \in V$ which will approximate x as a linear combination of the vectors $y_i \in V$, while minimizing the mean square error, then the error vector will be orthogonal on the space spanned by the vectors $y_i$:

$$(x-\hat{x})y^H=0,$$

As a consequence, the estimation error and the estimate itself are orthogonal:

$$(x-\hat{x})\hat{x}^H=0.$$

Figure 14:
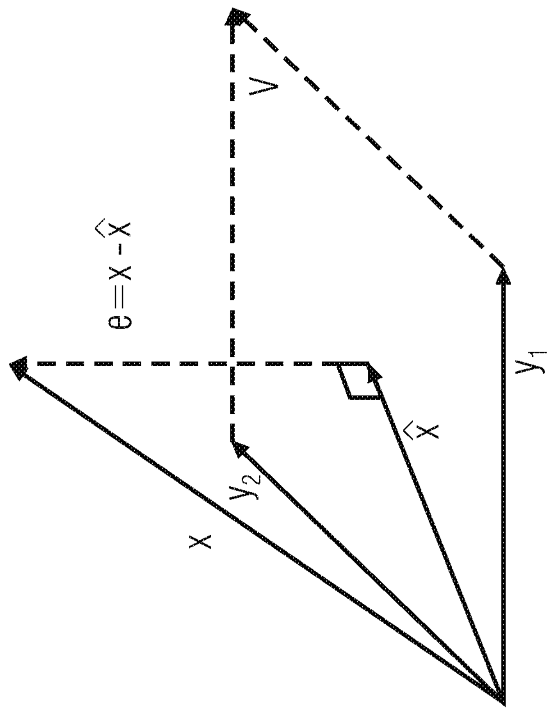
FIG. 14 shows a geometric representation for an orthogonality principle in 3-dimensional space.

Geometrically one could visualize this by the examples shown in FIG. 14.

FIG. 14 shows a geometric representation for orthogonality principle in 3-dimensional space. As can be seen, a vector space is spanned by vectors $y_1$, $y_2$. A vector x is equal to a sum of a vector $\hat{x}$ and a difference vector (or error vector) e. As can be seen, the error vector e is orthogonal to the vector space (or plane) V spanned by vectors $y_1$ and $y_2$. Accordingly, vector $\hat{x}$ can be considered as a best approximation of x within the vector space V.

13.4. Parametric Reconstruction Error

Defining a matrix comprising N signals: X and denoting the estimation error with $X_{Error}$, the following identities can be formulated. The original signal can be represented as a sum of the parametric reconstruction $\hat{X}$ and the reconstruction error $X_{Error}$ as $$X=\hat{X}+X_{Error}.$$

Because of the orthogonality principle, the covariance matrix of the original signals $E_X=XX^H$ can be formulated as a sum of the covariance matrix of the reconstructed signals $\hat{X}\hat{X}^H$ and the covariance matrix of the estimation errors $X_{Error}X_{Error}^H$ as $$\begin{aligned} E_X &= XX^H \\ &= (\hat{X}+X_{Error})(\hat{X}+X_{Error})^H \\ &= \hat{X}\hat{X}^H + X_{Error}X_{Error}^H + \hat{X}X_{Error}^H + X_{Error}\hat{X}^H \\ &= = \hat{X}\hat{X}^H + X_{Error}X_{Error}^H. \end{aligned}$$

When the input objects X are not in the space spanned by the downmix channels (e.g. the number of downmix channels is less than the number of input signals) and the input objects cannot be represented as linear combinations of the downmix channels, the MMSE-based algorithms introduce reconstruction inaccuracy $X_{Error}X_{Error}^H$.

13.5. Inter Object Correlation

In the auditory system, the cross-covariance (coherence/correlation) is closely related to the perception of envelopment, of being surrounded by the sound, and to the perceived width of a sound source. For example in SAOC based systems the Inter-Object Correlation (IOC) parameters are used for characterization of this property:

$$IOC(i,j) = \frac{E_X(i,j)}{\sqrt{E_X(i,i)E_X(j,j)}}.$$

Let us consider an example of reproducing a sound source using two audio signals. If the IOC value is close to one, the sound is perceived as a well-localized point source. If the IOC value is close to zero, the perceived width of the sound source increases and for extreme cases it can even be perceived as two distinct sources [Blauert, Chapter 3].

13.6. Compensation for Reconstruction Inaccuracy

In the case of imperfect parametric reconstruction, the output signal may exhibit a lower energy compared to the original objects. The error in the diagonal elements of the covariance matrix may result in audible level differences and error in the off-diagonal elements in a distorted spatial sound image (compared with the ideal reference output). The proposed method has the purpose to solve this problem.

In the MPEG Surround (MPS), for example, this issue is treated only for some specific channel-based processing scenarios, namely, for mono/stereo downmix and limited static output configurations (e.g., mono, stereo, 5.1, 7.1, etc). In object-oriented technologies, like SAOC, which also uses mono/stereo downmix this problem is treated by applying the MPS post-processing rendering for 5.1 output configuration only.

The existing solutions are limited to standard output configurations and fixed number of input/output channels. Namely, they are realized as consequent application of several blocks implementing just "mono-to-stereo" (or "stereo-to-three") channel decorrelation methods.

Therefore, a general solution (e.g., energy level and correlation properties correction method) for parametric reconstruction inaccuracy compensation is desired, which can be applied for a flexible number of downmix/output channels and arbitrary output configuration setups.

13.7. Conclusions

To conclude, an overview over the notation has been provided. Moreover, a parametric separation system has been described on which embodiments according to the invention are based. Moreover, it has been outlined that the orthogonality principle applies to minimum mean squared error estimation. Moreover, an equation for the computation of a covariance matrix $E_X$ has been provided which applies in the presence of a reconstruction error $X_{Error}$. Also, the relationship between the so-called inter-object correlation values and the elements of a covariance matrix $E_X$ has been provided, which may be applied, for example, in embodiments according to the invention to derive desired covariance characteristics (or correlation characteristics) from the inter-object correlation values (which may be included in the parametric side information), and possibly form the object level differences. Moreover, it has been outlined that the characteristics of reconstructed object signals may differ from desired characteristics because of an imperfect reconstruction. Moreover, it has been outlined that existing solutions to deal with the problem are limited to some specific output configurations and rely on a specific combination of standard blocks, which makes the conventional solutions inflexible.

14. Embodiment According to FIG. 15

14.1. Concept Overview

Embodiments according to the invention extend the MMSE parametric reconstruction methods used in parametric audio separation schemes with a decorrelation solution for an arbitrary number of downmix/upmix channels. Embodiments according to the invention, like, for example, the inventive apparatus and the inventive method, may compensate for the energy loss during a parametric reconstruction and restore the correlation properties of estimated objects.

Figure 15:
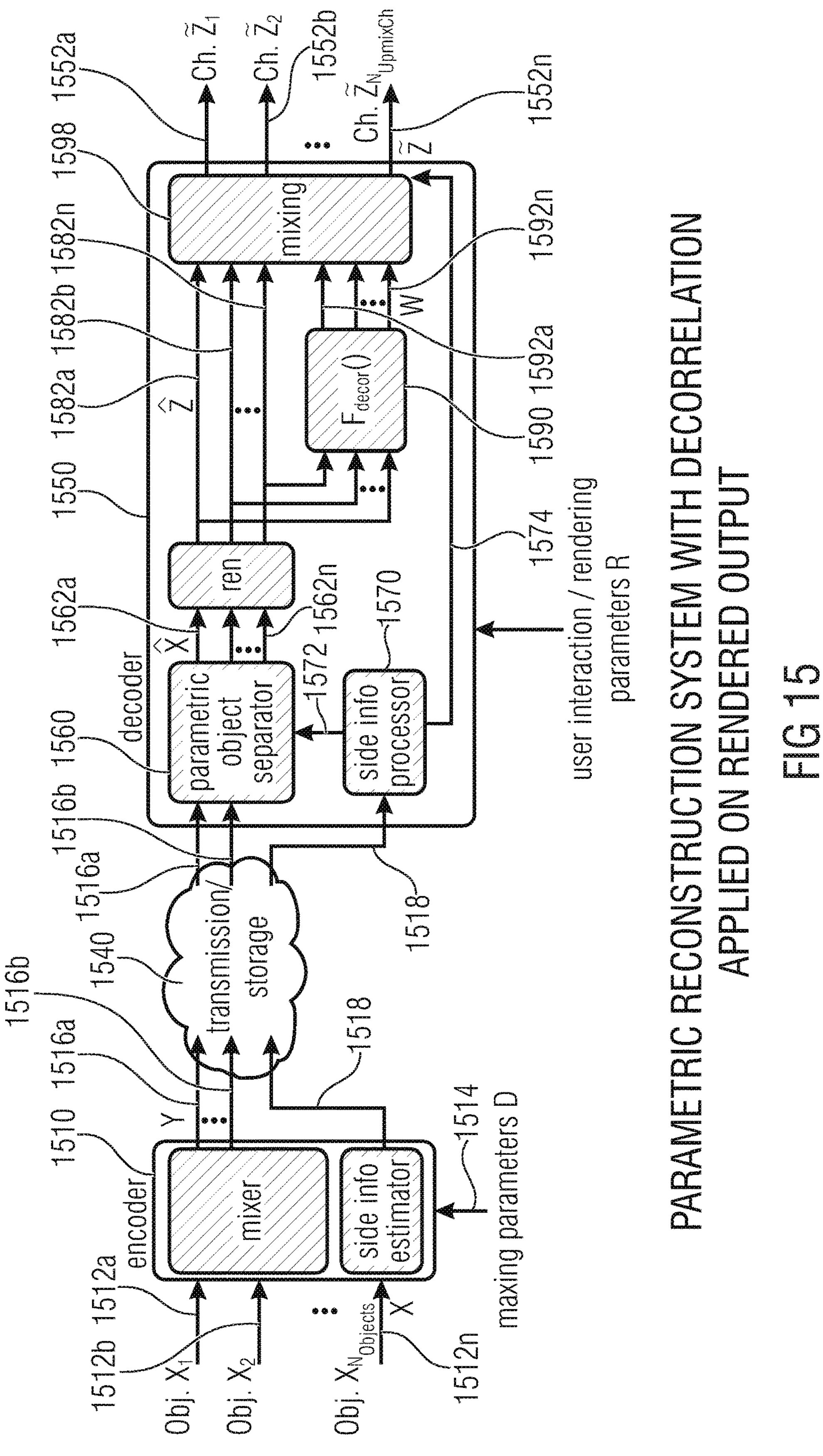
FIG. 15 shows a block schematic diagram of a parametric reconstruction system with decorrelation applied on rendered output, according to an embodiment of the present invention.

FIG. 15 provides an overview of the parametric downmix/upmix concept with an integrated decorrelation path. In other words, FIG. 15 shows, in the form of a block schematic diagram, a parametric reconstruction system with decorrelation applied on rendered output.

The system according to FIG. 15 comprises an encoder 1510, which is substantially identical to the encoder 1310 according to FIG. 13. The encoder 1510 receives a plurality of object signals 1512*a* to 1512*n*, and provides on the basis thereof, one or more downmix signals 1516*a*, 1516*b*, as well as a side information 1518. Downmix signals 1516*a*, 1515*b* may be substantially identical to the downmix signals 1316*a*, 1316*b* and may designated with Y. The side information 1518 may be substantially identical to the side information 1318. However, the side information may, for example, comprise a decorrelation mode parameter or a decorrelation method parameter, or a decorrelation complexity parameter. Moreover, the encoder 1510 may receive mixing parameters 1514.

The parametric reconstruction system also comprises a transmission and/or storage of the one or more downmix signals 1516*a*, 1516*b* and of the side information 1518, wherein the transmission and/or storage is designated with 1540, and wherein the one or more downmix signals 1516*a*, 1516*b* and the side information 1518 (which may include parametric side information) may be encoded.

Moreover, the parametric reconstruction system according to FIG. 15 comprises a decoder 1550, which is configured to receive the transmitted or stored one or more (possibly encoded) downmix signals 1516*a*, 1516*b* and the transmitted or stored (possibly encoded) side information 1518 and to provide, on the basis thereof, output audio signals 1552*a* to 1552*n*. The decoder 1550 (which may be considered as a multi-channel audio decoder) comprises a parametric object separator 1560 and a side information processor 1570. Moreover, the decoder 1550 comprises a renderer 1580, a decorrelator 1590 and a mixer 1598.

The parametric object separator 1560 is configured to receive the one or more downmix signals 1516*a*, 1516*b* and a control information 1572, which is provided by the side information processor 1570 on the basis of the side information 1518, and to provide, on the basis thereof, object signals 1562*a* to 1562*n*, which are also designated with $\hat{X}$, and which may be considered as decoded audio signals. The control information 1572 may, for example, comprise unmixing coefficients to be applied to downmix signals (for example, to decoded downmix signals derived from the encoded downmix signals 1516*a*, 1516*b*) within the parametric object separator to obtain reconstructed object signals (for example, the decoded audio signals 1562*a* to 1562*n*). The renderer 1580 renders the decoded audio signals 1562*a* to 1562*n* (which may be reconstructed object signals, and which may, for example, correspond to the input object signals 1512*a* to 1512*n*), to thereby obtain a plurality of rendered audio signals 1582*a* to 1582*n*. For example, the renderer 1580 may consider rendering parameters R, which may for example be provided by user interaction and which may, for example, define a rendering matrix. However, alternatively, the rendering parameters may be taken from the encoded representation (which may include the encoded downmix signals 1516*a*, 1516*b* and the encoded side information 1518).

The decorrelator 1590 is configured to receive the rendered audio signals 1582*a* to 1582*n* and to provide, on the basis thereof, decorrelated audio signals 1592*a* to 1592*n*, which are also designated with W. The mixer 1598 receives the rendered audio signals 1582*a* to 1582*n* and the decorrelated audio signals 1592*a* to 1592*n*, and combines the rendered audio signals 1582*a* to 1582*n* and the decorrelated audio signals 1592*a* to 1592*n*, to thereby obtain the output audio signals 1552*a* to 1552*n*. The mixer 1598 may also use control information 1574 which is derived by the side information processor 1570 from the encoded side information 1518, as will be described below.

14.2. Decorrelator Function

In the following, some details regarding the decorrelator 1590 will be described. However, it should be noted that different decorrelator concepts may be used, some of which will be described below.

In an embodiment, the decorrelator function $w=F_{decorr}(\hat{z})$ provides an output signal w that is orthogonal to the input signal 2 ($E\{w\hat{z}^H\}=0$). The output signal w has equal (to the input signal $\hat{z}$) spectral and temporal envelope properties (or at least similar properties). Moreover, signal w is perceived similarly and has the same (or similar) subjective quality as the input signal $\hat{z}$ (see, for example, [SAOC2]).

In case of multiple input signals, it is beneficial if the decorrelation function produces multiple outputs that are mutually orthogonal (i.e., $W_i=F_{decorr}(\hat{Z}_i)$, such that $W_i\hat{Z}_j^H=0$ for all i and j, and $W_iW_j^H=0$ for i≠j).

The exact specification for decorrelator function implementation is out of scope of this description. For example, the bank of several Infinite Impulse Response (IIR) filter based decorrelators specified in the MPEG Surround Standard can be utilized for decorrelation purposes [MPS].

The generic decorrelators described in this description are assumed to be ideal. This implies that (in addition to the perceptual requirements) the output of each decorrelator is orthogonal on its input and on the output of all other decorrelators. Therefore, for the given input $\hat{Z}$ with covariance $E_{\hat{Z}}=\hat{Z}\vec{Z}^H$ and output $W=F_{decorr}(\hat{Z})$ the following properties of covariance matrices holds:

$$E_W(i,i)=E_{\hat{Z}}(i,i), E_W(i,j)=0, \text{ for } i\neq j, \hat{Z}W^H=W\hat{Z}^H=0.$$

From these relationships, it follows that $$(\hat{Z}+W)(\hat{Z}+W)^H=E_{\hat{Z}}+\hat{Z}W^H+W\hat{Z}^H+E_W=E_{\hat{Z}}+E_W.$$

The decorrelator output W can be used to compensate for prediction inaccuracy in an MMSE estimator (remembering that the prediction error is orthogonal to the predicted signals) by using the predicted signals as the inputs.

One should still note that the prediction errors are not in a general case orthogonal among themselves. Thus, one aim of the inventive concept (e.g. method) is to create a mixture of the "dry" (i.e., decorrelator input) signal (e.g., rendered audio signals 1582*a* to 1582*n*) and "wet" (i.e., decorrelator output) signal (e.g., decorrelated audio signals 1592*a* to 1592*n*), such that the covariance matrix of the resulting mixture (e.g. output audio signals 1552*a* to 1552*n*) becomes similar to the covariance matrix of the desired output.

Moreover, it should be noted that a complexity reduction for the decorrelation unit may be used, which will be described in detail below, and which may bring along some imperfections of the decorrelated signal, which may, however, be acceptable.

14.3. Output Covariance Correction Using Decorrelated Signals

In the following, a concept will be described to adjust covariance characteristics of the output audio signals 1552*a* to 1552*n* to obtain a reasonably good hearing impression.

The proposed method for the output covariance error correction composes the output signal $\tilde{Z}$ (e.g., the output audio signals 1552*a* to 1552*n*) as a weighted sum of parametrically reconstructed signal $\hat{Z}$ (e.g., the rendered audio signals 1582*a* to 1582*n*) and its decorrelated part W. This sum can be represented as follows $$\tilde{Z}=P\hat{Z}+MW.$$

However, it should be noted that this equation may be considered a most general formulation. A change may optionally be applied to the above formula which is valid (or which can be made) for all "simplified methods" described herein.

The mixing matrices P applied to the direct signal $\hat{Z}$ and M applied to decorrelated signal W have the following structure (with $N=N_{UpmixCh}$, wherein $N_{UpmixCh}$ designates a number of rendered audio signals, which may be equal to a number of output audio signals):

$$P=\begin{bmatrix} p_{1,1} & p_{1,2} & \cdots & p_{1,n} \\ p_{2,2} & p_{2,2} & \cdots & p_{2,N} \\ \vdots & \vdots & \ddots & \vdots \\ p_{N,1} & p_{N,2} & \cdots & p_{N,N} \end{bmatrix}, M=\begin{bmatrix} m_{1,1} & m_{1,2} & \cdots & m_{1,N} \\ m_{2,2} & m_{2,2} & \cdots & m_{2,N} \\ \vdots & \vdots & \ddots & \vdots \\ m_{N,1} & m_{N,2} & \cdots & m_{N,N} \end{bmatrix}.$$

Applying notation for the combined matrix F=[P M] and signal $$S=\begin{bmatrix} \hat{Z} \\ W \end{bmatrix}$$

it yields:

$$\tilde{Z}=FS.$$

Alternatively, however, the equation $$\tilde{Z}=\tilde{F}S$$

may be applied, as will be described in more detail below.

Using this representation, the covariance matrix $E_{\tilde{Z}}$ of the output signal Z is defined as $$E_{\tilde{Z}}=FE_SF^H.$$

The target covariance C of the ideally created rendered output scene is defined as $$C=RE_XR^H.$$

The mixing matrix F is computed such that the covariance matrix $E_{\tilde{Z}}$ of the final output approximates, or equals, the target covariance C as $$E_{\tilde{Z}}\approx C.$$

The mixing matrix F is computed, for example, as a function of known quantities $F=F(E_S, E_X, R)$ as $$F=(U\sqrt{T}U^H)H(V\sqrt{Q^{-1}}V^H),$$

where the matrices U, T and V, Q can be determined, for example, using Singular Value Decomposition (SVD) of the covariance matrices $E_S$ and C yielding $$C=UTU^H, E_S=VQV^H.$$

The prototype matrix H can be chosen according to the desired weightings for the direct and decorrelated signal paths.

For example, a possible prototype matrix H can be determined as $$H=\begin{bmatrix} a_{1,1} & 0 & \ldots & 0 & b_{1,1} & 0 & \ldots & 0 \\ 0 & a_{2,2} & \ldots & 0 & 0 & b_{2,2} & \ldots & 0 \\ \vdots & \vdots & \ddots & \vdots & \vdots & \vdots & \ddots & \vdots \\ 0 & 0 & \ldots & a_{N,N} & 0 & 0 & \ldots & b_{N,N} \end{bmatrix}, \text{ where}$$

$$a_{i,i}^2+b_{i,i}^2=1.$$

In the following, some mathematical derivations for the general matrix F structure will be provided.

In other words, the derivation of the mixing matrix F for a general solution will be described in the following.

The covariance matrices $E_S$ and C can be expressed using, e.g., Singular Value Decomposition (SVD) as $$E_S=VQV^H, C=UTU^H.$$

with T and Q being diagonal matrices with the singular values of C and $E_S$ respectively, and U and V being unitary matrices containing the corresponding singular vectors.

Note, that application of the Schur triangulation or Eigenvalue decomposition (instead of SVD) leads to similar results (or even identical results if the diagonal matrices Q and T are restricted to positive values).

Applying this decomposition to the requirement $E_{\tilde{Z}}\approx C$, it yields (at least approximately)

$$C=FE_SF^H,$$

$$UTU^H=FVQV^HF^H,$$

$$(U\sqrt{T}U^H)(U\sqrt{T}UH)=F(V\sqrt{Q}V^H)(V\sqrt{Q}V^H)F^H,$$

$$(U\sqrt{T}U^H)(U\sqrt{T}U^H)=(FW\sqrt{Q}V^H)(W\sqrt{Q}V^HF^H),$$

$$(U\sqrt{T}U^H)(U\sqrt{T}U^H)^H=(FW\sqrt{Q}V^H)(FW\sqrt{Q}V^H)^H.$$

In order to take care about the dimensionality of the covariance matrices, regularization is needed in some cases. For example, a prototype matrix H of size $N_{UpmixCh}\times 2N_{UpmixCh}$, with the property that $HH^H=I_{N_{UpmixCh}}$ can be applied $$(U\sqrt{T}U^H)HH^H(U\sqrt{T}U^H)=F(V\sqrt{Q}V^H)(V\sqrt{Q}V^H)F^H,$$

$$(U\sqrt{T}U^H)H=F(V\sqrt{Q}V^H).$$

It follows that mixing matrix F can be determined as $$F=(U\sqrt{T}U^H)H(V\sqrt{Q^{-1}}V^H).$$

The prototype matrix H is chosen according to the desired weightings for the direct and decorrelated signal paths. For example, a possible prototype matrix H can be determined as $$H=\begin{bmatrix} a_{1,1} & 0 & \dots & 0 & b_{1,1} & 0 & \dots & 0 \\ 0 & a_{2,2} & \dots & 0 & 0 & b_{2,2} & \dots & 0 \\ \vdots & \vdots & \ddots & \vdots & \vdots & \vdots & \ddots & \vdots \\ 0 & 0 & \dots & a_{N,N} & 0 & 0 & \dots & b_{N,N} \end{bmatrix}, \text{ where}$$

$$a_{i,i}^2+b_{i,i}^2=1.$$

Depending on the condition of the covariance matrix $E_S$ of the combined signals, the last equation may need to include some regularization, but otherwise it should be numerically stable.

To conclude, a concept has been described to derive the output audio signals (represented by matrix $\tilde{Z}$, or equivalently, by vector $\tilde{z}$) on the basis of the rendered audio signals (represented by matrix $\hat{Z}$, or equivalently, vector $\hat{z}$) and the decorrelated audio signals (represented by matrix W, or equivalently, vector w). As can be seen, two mixing matrices P and M of general matrix structure are commonly determined. For example, a combined matrix F, as defined above, may be determined, such that a covariance matrix $E_{\hat{Z}}$ of the output audio signals 1552*a* to 1562*n* approximates, or equals, a desired covariance (also designated as target covariance) C. The desired covariance matrix C may, for example, be derived on the basis of the knowledge of the rendering matrix R (which may be provided by user interaction, for example) and on the basis of a knowledge of the object covariance matrix $E_X$, which may for example be derived on the basis of the encoded side information 1518. For example, the object covariance matrix $E_X$ may be derived using the inter-object correlation values IOC, which are described above, and which may be included in the encoded side information 1518. Thus, the target covariance matrix C may, for example, be provided by the side information processor 1570 as the information 1574, or as part of the information 1574.

However, alternatively, the side information processor 1570 may also directly provide the mixing matrix F as the information 1574 to the mixer 1598.

Moreover, a computation rule for the mixing matrix F has been described, which uses a singular value decomposition. However, it should be noted that there are some degrees of freedom, since the entries $a_{i,i}$ and $b_{i,i}$ of the prototype matrix H may be chosen. The entries of the prototype matrix H are chosen to be somewhere between 0 and 1. If values $a_{i,i}$ are chosen to be closer to one, there will be a significant mixing of rendered output audio signals, while the impact of the decorrelated audio signals is comparatively small, which may be desirable in some situations. However, in some other situations it may be more desirable to have a comparatively large impact of the decorrelated audio signals, while there is only a weak mixing between rendered audio signals. In this case, values $b_{i,i}$ are typically chosen to be larger than $a_{i,i}$. Thus, the decoder 1550 can be adapted to the requirements by appropriately choosing the entries of the prototype matrix H.

14.4. Simplified Methods for Output Covariance Correction

In this section, two alternative structures for the mixing matrix F mentioned above are described along with exemplary algorithms for determining its values. The two alternatives are designed to for different input content (e.g., audio content):

- Covariance adjustment method for highly correlated content (e.g., channel based input with high correlation between different channel pairs).
- Energy compensation method for independent input signals (e.g., object based input, assumed usually independent).

14.4.1. Covariance Adjustment Method (A)

Taking in account that the signal $\hat{Z}$ (e.g., the rendered audio signals 1582*a* to 1582*n*) are already optimal in the MMSE-sense, it is usually not advisable to modify the parametric reconstructions $\hat{Z}$ (e.g., the output audio signals 1552*a* to 1552*n*) in order to improve the covariance properties of the output $\tilde{Z}$ because this may affect the separation quality.

If only the mixture of the decorrelated signals W is manipulated, the mixing matrix P can be reduced to an identity matrix (or a multiple thereof). Thus, this simplified method can be described by setting $$P=\begin{bmatrix} 1 & 0 & \dots & 0 \\ 0 & 1 & \dots & 0 \\ \vdots & \vdots & \ddots & \vdots \\ 0 & 0 & \dots & 1 \end{bmatrix}, M=\begin{bmatrix} m_{1,1} & m_{1,2} & \dots & m_{1,N} \\ m_{2,2} & m_{2,2} & \dots & m_{2,N} \\ \vdots & \vdots & \ddots & \vdots \\ m_{N,1} & m_{N,2} & \dots & m_{N,N} \end{bmatrix}.$$

The final output of the system can be represented as $$\tilde{Z}=\hat{Z}+MW.$$

Consequently the final output covariance of the system can be represented as:

$$E_{\tilde{Z}}=E_{\hat{Z}}+ME_WM^H$$

The difference $\Delta_E$ between the ideal (or desired) output covariance matrix C and the covariance matrix $E_{\hat{Z}}$ of the rendered parametric reconstruction (e.g., of the rendered audio signals) is given by $$\Delta_E=C-E_{\hat{Z}}.$$

Therefore, mixing matrix M is determined such that $$\Delta_E\approx ME_WM^H.$$

The mixing matrix M is computed such that the covariance matrix of the mixed decorrelated signals MW equals or approximates the covariance difference between the desired covariance and the covariance of the dry signals (e.g., of the rendered audio signals). Consequently the covariance of the final output will approximate the target covariance $E_{\tilde{Z}}=C$:

$$M=(U\sqrt{T}U^H)(V\sqrt{Q^{-1}}V^H),$$

where the matrices U, T and V, Q can be determined, for example, using Singular Value Decomposition (SVD) of the covariance matrices $\Delta_E$ and $E_W$ yielding $$\Delta_E=UTU^H, E_W=VQV^H.$$

This approach ensures good cross-correlation reconstruction maximizing use of the dry output (e.g., of the rendered audio signals 1582_a_ to 1582_n_) and utilizes freedom of mixing of decorrelated signals only. In other words, there is no mixing between different rendered audio signals allowed when combining the rendered audio signals (or a scaled version thereof) with the one or more decorrelated audio signals. However, it is allowed that a given decorrelated signal is combined, with a same or different scaling, with a plurality of rendered audio signals, or a scaled version thereof, in order to adjust cross-correlation characteristics or cross-covariance characteristics of the output audio signals. The combination is defined, for example, by the matrix M as defined here.

In the following, some mathematical derivations for the restricted matrix F structure will be provided.

In other words, the derivation of the mixing matrix M for the simplified method "A" will be explained.

The covariance matrices $\Delta_E$ and $E_W$ can be expressed using, e.g., Singular Value Decomposition (SVD) as $$\Delta_E=UTU^H, E_W=VQV^H.$$

with T and Q being diagonal matrices with the singular values of $\Delta_E$ and $E_W$ respectively, and U and V being unitary matrices containing the corresponding singular vectors.

Note, that application of the Schur triangulation or Eigenvalue decomposition (instead of SVD) leads to similar results (or even identical results if the diagonal matrices Q and T are restricted to positive values).

Applying this decomposition to the requirement $E_{\hat{Z}} \approx C$, it yields (at least approximately)

$$\Delta_E=ME_WM^H,$$

$$UTU^H=MVQV^HM^H,$$

$$(U\sqrt{T}U^H)(U\sqrt{T}U^H)=M(V\sqrt{Q}V^H)(V\sqrt{Q}V^H)M^H,$$

$$(U\sqrt{T}U^H)(U\sqrt{T}U^H)=(MV\sqrt{Q}V^H)(V\sqrt{Q}V^HM^H),$$

$$(U\sqrt{T}U^H)(U\sqrt{T}U^H)^H=(MV\sqrt{Q}V^H)(MV\sqrt{Q}V^H)^H,$$

$$(U\sqrt{T}U^H)=M(V\sqrt{Q}V^H).$$

Noting that both sides of the equation represent a square of a matrix, we drop the squaring, and solve for the full matrix M.

It follows that mixing matrix M can be determined as $$M=(U\sqrt{T}U^H)(V\sqrt{Q^{-1}}V^H).$$

This method can be derived from the general method by setting the prototype matrix H as follows $$H=\begin{bmatrix} 1 & 0 & \dots & 0 & 1 & 0 & \dots & 0 \\ 0 & 1 & \dots & 0 & 0 & 1 & \dots & 0 \\ \vdots & \vdots & \ddots & \vdots & \vdots & \vdots & \ddots & \vdots \\ 0 & 0 & \dots & 1 & 0 & 0 & \dots & 1 \end{bmatrix}.$$

Depending on the condition of the covariance matrix $E_W$ of the wet signals, the last equation may need to include some regularization, but otherwise it should be numerically stable.

14.4.2. Energy Compensation Method (B)

Sometimes (depending on the application scenario) is not desired to allow mixing of the parametric reconstructions (e.g., of the rendered audio signals) or the decorrelated signals, but to individually mix each parametrically reconstructed signal (e.g., rendered audio signal) with its own decorrelated signal only.

In order to achieve this requirement, an additional constraint should be introduced to the simplified method "A". Now, the mixing matrix M of the wet signals (decorrelated signals) is necessitated to have a diagonal form:

$$P=\begin{bmatrix} 1 & 0 & \dots & 0 \\ 0 & 1 & \dots & 0 \\ \vdots & \vdots & \ddots & \vdots \\ 0 & 0 & \dots & 1 \end{bmatrix}, M=\begin{bmatrix} m_{1,1} & 0 & \dots & 0 \\ 0 & m_{2,2} & \dots & 0 \\ \vdots & \vdots & \ddots & \vdots \\ 0 & 0 & \dots & m_{N,N} \end{bmatrix}.$$

The main goal of this approach is to use decorrelated signals to compensate for the loss of energy in the parametric reconstruction (e.g., rendered audio signal), while the off-diagonal modification of the covariance matrix of the output signal is ignored, i.e., there is no direct handling of the cross-correlations. Therefore, no cross-leakage between the output objects/channels (e.g., between the rendered audio signals) is introduced in the application of the decorrelated signals.

As a result, only the main diagonal of the target covariance matrix (or desired covariance matrix) can be reached, and the off-diagonals are on the mercy of the accuracy of the parametric reconstruction and the added decorrelated signals. This method is most suitable for object-only based applications, in which the signals can be considered as uncorrelated.

The final output of the method (e.g. the output audio signals) is given by $\hat{Z}=\hat{Z}+MW$ with a diagonal matrix M computed such that the covariance matrix entries corresponding to the energies of the reconstructed signals $E_{\hat{Z}}(i,i)$ are equal with the desired energies $$E_{\hat{Z}}(i,i)=C(i,i).$$

C may be determined as explained above for the general case.

For example, the mixing matrix M can be directly derived by dividing the desired energies of the compensation signals (differences between the desired energies (which may be described by diagonal elements of the cross-covariance matrix C) and the energies of the parametric reconstructions (which may be determined by the audio decoder)) with the energies of the decorrelated signals (which may be determined by the audio decoder):

$$M(i,j)=\begin{cases} \sqrt{\min\left(\lambda_{Dec}, \max\left(0, \frac{C(i,i)-E_{\hat{Z}}(i,i)}{\max(E_W(i,i),\varepsilon)}\right)\right)} & i=j, \\ 0 & i\neq j. \end{cases}$$

wherein $\lambda_{Dec}$ is a non-negative threshold used to limit the amount of decorrelated component added to the output signals (e.g., $\lambda_{Dec}=4$).

It should be noted that the energies can be reconstructed parametrically (for example, using OLDs, IOCs and rendering coefficients) or may be actually computed by the decoder (which is typically more computationally expensive).

This method can be derived from the general method by setting the prototype matrix H as follows:

$$H = \begin{bmatrix} 1 & 0 & \dots & 0 & 1 & 0 & \dots & 0 \\ 0 & 1 & \dots & 0 & 0 & 1 & \dots & 0 \\ \vdots & \vdots & \ddots & \vdots & \vdots & \vdots & \ddots & \vdots \\ 0 & 0 & \dots & 1 & 0 & 0 & \dots & 1 \end{bmatrix}.$$

This method maximizes the use of the dry rendered outputs explicitly. The method is equivalent with the simplification "A" when the covariance matrices have no off-diagonal entries.

This method has a reduced computational complexity.

However, it should be noted that the energy compensation method, doesn't necessarily imply that the cross-correlation terms are not modified. This holds only if we use ideal decorrelators and no complexity reduction for the decorrelation unit. The idea of the method is to recover the energy and ignore the modifications in the cross terms (the changes in the cross-terms will not modify substantially the correlation properties and will not affect the overall spatial impression).

14.5. Requirements for the Mixing Matrix F

In the following, it will be explained that the mixing matrix F, a derivation of which has been described in sections 14.3 and 14.4, fulfills requirements to avoid degradations.

In order to avoid degradations in the output, any method for compensating for the parametric reconstruction errors should produce a result with the following property: if the rendering matrix equals the downmix matrix then the output channels should equal (or at least approximate) the downmix channels. The proposed model fulfills this property. If the rendering matrix is equal with the downmix matrix R=D, the parametric reconstruction is given by $$\hat{Z}=R\hat{X}=D\hat{X}=DGY=DED^H(DED^H)^{-1}Y\approx Y,$$

and the desired covariance matrix will be $$C=RE_XR^H=DE_XD^H=E_Y.$$

Therefore the equation to be solved for obtaining the mixing matrix F is $$E_Y = F\begin{bmatrix} E_Y & 0_{N_{UpmixCh}} \\ 0_{N_{UpmixCh}} & E_W \end{bmatrix}F^H,$$

where $0_{N_{UpmixCh}}$, is a square matrix of size $N_{UpmixCh}$x$N_{UpmixCh}$ of zeros. Solving previous equation for F, one can obtain:

$$F = \begin{bmatrix} 1 & 0 & \dots & 0 & 0 & 0 & \dots & 0 \\ 0 & 1 & \dots & 0 & 0 & 0 & \dots & 0 \\ \vdots & \vdots & \ddots & \vdots & \vdots & \vdots & \ddots & \vdots \\ 0 & 0 & \dots & 1 & 0 & 0 & \dots & 0 \end{bmatrix}.$$

This means that the decorrelated signals will have zero-weight in the summing, and the final output will be given by the dry signals, which are identical with the downmix signals $$\tilde{Z}=P\hat{Z}+MW=\hat{Z}\approx Y.$$

As a result, the given requirement for the system output to equal the downmix signal in this rendering scenario is fulfilled.

14.6. Estimation of Signal Covariance Matrix $E_S$

To obtain the mixing matrix F the knowledge of the covariance matrix $E_S$ of the combined signals S is necessitated or at least desirable.

In principle, it is possible to estimate the covariance matrix $E_S$ directly from the available signals (namely, from parametric reconstruction $\hat{Z}$ and the decorrelator output W). Although this approach may lead to more accurate results, it is may not be practical because of the associated computational complexity. The proposed methods use parametric approximations of the covariance matrix $E_S$.

The general structure of the covariance matrix $E_S$ can be represented as $$E_S = \begin{bmatrix} E_{\hat{Z}} & E_{\hat{Z}W}^H \\ E_{\hat{Z}W} & E_W \end{bmatrix},$$

where the matrix $E_{\hat{Z}W}$ is cross-covariance between the direct $\hat{Z}$ and decorrelated W signals.

Assuming that the decorrelators are ideal (i.e., energy-preserving, the outputs being orthogonal to the inputs, and all outputs being mutually orthogonal), the covariance matrix $E_S$ can be expressed using the simplified form as $$E_S = \begin{bmatrix} E_{\hat{Z}} & 0 \\ 0 & E_W \end{bmatrix}.$$

The covariance matrix $E_{\hat{Z}}$ of the parametrically reconstructed signal $\hat{Z}$ can be determined parametrically as $$E_{\hat{Z}}=RE_{\hat{X}}R^H=RGDE_XD^HG^HR^H.$$

The covariance matrix $E_W$ of the decorrelated signal W is assumed to fulfill the mutual orthogonality property and to contain only the diagonal elements of $E_{\hat{Z}}$ as follows $$E_W(i, j) = \begin{cases} E_{\hat{Z}}(i, i) & \text{for } i = j, \\ 0 & \text{for } i \neq j. \end{cases}$$

If the assumption of mutual orthogonality and/or energy-preservation is violated (e.g., in the case when the number of decorrelators available is smaller than the number of signals to be decorrelated), then the covariance matrix $E_W$ can be estimated as $$E_W=M_{post}[matdiag(M_{pre}E_{\hat{Z}}M_{pre}^H)]^HM_{post}^H.$$

14.7 Optional Improvement: Output Covariance Correction Using Decorrelated Signals and Energy Adjustment Unit In the following, a particularly advantageous concept will be described, which can be combined with the other concepts described herein.

The proposed method for the output covariance error correction composes the output signal as a weighted sum of a parametrically reconstructed signal $\hat{Z}$ and its decorrelated part $\hat{Z}$. This sum can be represented as follows $$\tilde{Z}=P\hat{Z}+MW. \quad (I1)$$

Applying notation for the combined matrix $$F=[P\ M]$$

and signal $$S=\begin{bmatrix}\hat{Z}\\ W\end{bmatrix}$$

it yields:

$$\tilde{Z}=FS \quad \text{(I1)}$$

However, it should be noted that this equation may be considered a most general formulation. A change may optionally be applied to the above formula which is valid for all "simplified methods" described herein.

In the following, a functionality will be described, which may be performed, for example, by an Energy Adjustment unit.

In order to avoid introduction of artifacts in the final output, in extreme cases, different constrains can be imposed on the mixing matrix F (or a mixing matrix $\tilde{F}$). The mentioned constrains can be represented by absolute threshold values or relative threshold values with respect to the energy and/or correlation properties of the target and/or parametrically reconstructed signals (e.g., rendered audio signals).

The method described in this section proposes to achieve this by adding an energy adjustment step in the final output mixing block. The purpose of such processing step is to ensure that, after the mixing step with matrix F (or a "modified" mixing matrix $\tilde{F}$ derived therefrom), the energy levels of the decorrelated (wet) signals (for example, $A_{wet}MW$) and/or the energy levels of the parametrically reconstructed (dry) signals (for example, $A_{dry}P\hat{Z}$) and/or the energy levels of the final output signals (for example, $A_{dry}P\hat{Z}$+AwetMW) do not exceed certain threshold values.

This extra functionality can be achieved by modifying the definition of the combined mixing matrix F to be $$\tilde{F}=[A_{dry}P\ A_{wet}M], \quad \text{(I3)}$$

wherein the two square (or diagonal) energy adjustment matrices $A_{dry}$ and $A_{wet}$ (which may also be referred to as "energy correction matrices") are applied on the mixing weights (for example, P and M) of the parametrically reconstructed (dry) and the decorrelated (wet) signals respectively. As a result, the final output will be $$\begin{aligned}\tilde{Z} &= \tilde{F}S \\ &= A_{dry}P\hat{Z}+A_{wet}MW\end{aligned} \quad \text{(14)}$$

The dry and wet energy correction matrices $A_{dry}$ and $A_{wet}$ are computed such that the contribution of the dry and/or wet signals (for example, $\hat{Z}$ and W) into the final output signals (for example, $\tilde{Z}$) levels, due to the mixing step with matrix $\tilde{F}$, do not exceed a certain relative threshold value with respect to the parametrically reconstructed signals (for example, $\hat{Z}$) and/or decorrelated signals (for example, W) and/or target signals. In other words, there are, in general, multiple possibilities to compute the correction matrices.

The dry and wet energy correction matrices $A_{dry}$ and $A_{wet}$ can be computed, for example, as a function of the energy and/or correlation and/or covariance properties of the dry signals (for example, $\hat{Z}$) and/or wet signals (for example, W) and/or desired final output signals and/or an estimation of the covariance matrix of the dry and/or wet and/or final output signals after the mixing step. It should be noted that the above mentioned possibilities describe some examples how the correction matrices can be obtained.

One possible solution is given by the following expressions:

$$A_{dry}(i,j)=\begin{cases}\min\left(1,\sqrt{\max\left(0,\lambda_{dry}\dfrac{E_{\hat{Z}}(i,i)}{\max(C_{estim}(i,i),\varepsilon)}\right)}\right) & i=j,\\ 0 & i\neq j.\end{cases}$$

and $$A_{wet}(i,j)=\begin{cases}\min\left(1,\sqrt{\max\left(0,\lambda_{wet}\dfrac{E_{\hat{Z}}(i,i)}{\max(C_{estim}(i,i),\varepsilon)}\right)}\right) & i=j,\\ 0 & i\neq j.\end{cases}$$

where $\lambda_{dry}$ and $\lambda_{wet}$ are two threshold values which can be constant or time/frequency variant as a function of the signal properties (e.g., energy, correlation, and/or covariance), ε is a (optional) small non-negative regularization constant, e.g., $\varepsilon=10^{-9}$, $E_{\hat{Z}}$ represents the covariance and/or energy information of the parametrically reconstructed (dry) signals, and $C_{estim}$ represents the estimation of the covariance matrix of the dry or wet signals after the mixing step with matrix F, or the estimation of the covariance matrix of the output signals after the mixing step with matrix F, which would be obtained if no Energy adjustment step as proposed by the current invention would be applied (or worded differently, which would be obtained if the energy adjustment unit was not used).

In the above equations, the "max(.)" operation in the denominator, which provides the maximum value of the arguments, $C_{estim}(i,i)$ and ε, may, for example, be replaced by an addition of ε or another mechanism to avoid a division by zero.

For example, $C_{estim}$ can be given by:

$C_{estim}=ME_WM^H$—the estimation of the covariance matrix of the wet signals after the mixing step with matrix M.

$C_{estim}=PE_{\hat{Z}}P^H$—the estimation of the covariance matrix of the dry signals after the mixing step with matrix P.

$C_{estim}=PE_{\hat{Z}}P^H+ME_WM^H$—the estimation of the covariance matrix of the output signals after the mixing step with matrix F.

In the following, some further simplifications will be described. In other words, Simplified methods for output covariance correction will be described.

Taking in account that the signals $\hat{Z}$ are already optimal in the MMSE-sense, it is usually not advisable to modify the parametric reconstructions (dry signals) $\hat{Z}$ in order to improve the covariance properties of the output $\tilde{Z}$ because this may affect the separation quality.

If only the mixture of the decorrelated (wet) signals W is manipulated, the mixing matrix P can be reduced to an identity matrix. In this case, the energy adjustment matrix corresponding to the parametrically reconstructed (dry) signals can also be reduced to an identity matrix. Thus, this simplified method can be described by setting:

$$P=\begin{bmatrix}1&0&\dots&0\\0&1&\dots&0\\\vdots&\vdots&\ddots&\vdots\\0&0&\dots&1\end{bmatrix},\ A_{dry}=\begin{bmatrix}1&0&\dots&0\\0&1&\dots&0\\\vdots&\vdots&\ddots&\vdots\\0&0&\dots&1\end{bmatrix}.$$

The final output of the system can be represented as:

$$\tilde{Z}=\hat{Z}+A_{wet}MW$$

15. Complexity Reduction for Decorrelation Unit

In the following, it will be described how the complexity of the decorrelators used in embodiments according to the present invention can be reduced.

It should be noted that decorrelator function implementation is often computationally complex. In some applications (e.g., portable decoder solutions) limitations on the number of decorrelators may need to be introduced due to the restricted computational resources. This section provides a description of means for reduction of decorrelator unit complexity by controlling the number of applied decorrelators (or decorrelations). The decorrelation unit interface is depicted in FIGS. 16 and 17.

Figure 16:
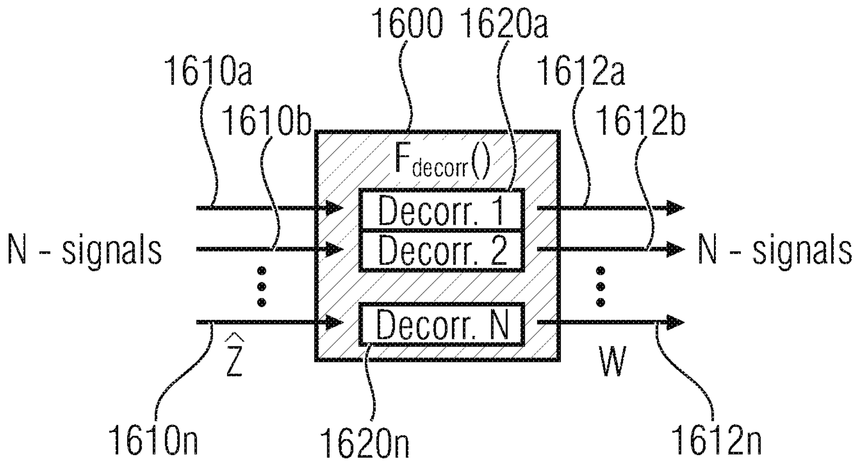
FIG. 16 shows a block schematic diagram of a decorrelation unit.

FIG. 16 shows a block schematic diagram of a simple (conventional) decorrelation unit. The decorrelation unit 1600 according to FIG. 6 is configured to receive N decorrelator input signals 1610*a* to 1610*n*, like for example rendered audio signals Z. Moreover, the decorrelation unit 1600 provides N decorrelator output signals 1612*a* to 1612*n*. The decorrelation unit 1600 may, for example, comprise N individual decorrelators (or decorrelation functions) 1620*a* to 1620*n*. For example, each of the individual decorrelators 1620*a* to 1620*n* may provide one of the decorrelator output signals 1612*a* to 1612*n* on the basis of an associated one of the decorrelator input signals 1610*a* to 1610*n*. Accordingly, N individual decorrelators, or decorrelation functions, 1620*a* to 1620*n* may be necessitated to provide the N decorrelated signals 1612*a* to 1612*n* on the basis of the N decorrelator input signals 1610*a* to 1610*n*.

Figure 17:
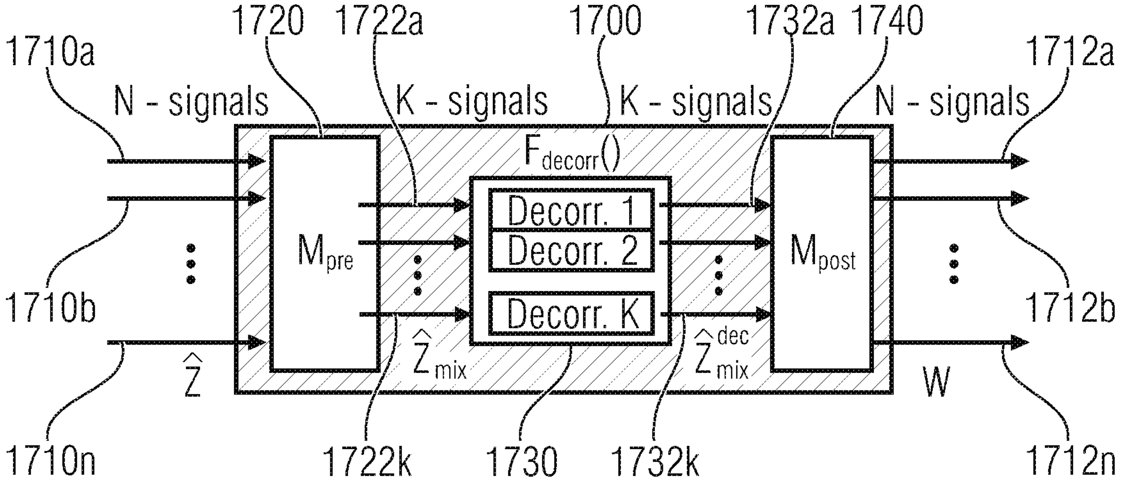
FIG. 17 shows a block schematic diagram of a reduced complexity decorrelation unit, according to an embodiment of the present invention.

However, FIG. 17 shows a block schematic diagram of a reduced complexity decorrelation unit 1700. The reduced complexity decorrelation unit 1700 is configured to receive N decorrelator input signals 1710*a* to 1710*n* and to provide, on the basis thereof, N decorrelator output signals 1712*a* to 1712*n*. For example, the decorrelator input signals 1710*a* to 1710*n* may be rendered audio signals $\hat{Z}$, and the decorrelator output signals 1712*a* to 1712*n* may be decorrelated audio signals W.

The decorrelator 1700 comprises a premixer (or equivalently, a premixing functionality) 1720 which is configured to receive the first set of N decorrelator input signals 1710*a* to 1710*n* and to provide, on the basis thereof, a second set of K decorrelator input signals 1722*a* to 1722*k*. For example, the premixer 1720 may perform a so-called "premixing" or "downmixing" to derive the second set of K decorrelator input signals 1722*a* to 1722*k* on the basis of the first set of N decorrelator input signals 1710*a* to 1710*n*. For example, the K signals of the second set of K decorrelator input signals 1722*a* to 1722*k* may be represented using a matrix $\hat{Z}_{mix}$. The decorrelation unit (or, equivalently, multichannel decorrelator) 1700 also comprises a decorrelator core 1730, which is configured to receive the K signals of the second set of decorrelator input signals 1722*a* to 1722*k*, and to provide, on the basis thereof, K decorrelator output signals which constitute a first set of decorrelator output signals 1732*a* to 1732*k*. For example, the decorrelator core 1730 may comprise K individual decorrelators (or decorrelation functions), wherein each of the individual decorrelators (or decorrelation functions) provides one of the decorrelator output signals of the first set of K decorrelator output signals 1732*a* to 1732*k* on the basis of a corresponding decorrelator input signal of the second set of K decorrelator input signals 1722*a* to 1722*k*. Alternatively, a given decorrelator, or decorrelation function, may be applied K times, such that each of the decorrelator output signals of the first set of K decorrelator output signals 1732*a* to 1732*k* is based on a single one of the decorrelator input signals of the second set of K decorrelator input signals 1722*a* to 1722*k*.

The decorrelation unit 1700 also comprises a postmixer 1740, which is configured to receive the K decorrelator output signals 1732*a* to 1732*k* of the first set of decorrelator output signals and to provide, on the basis thereof, the N signals 1712*a* to 1712*n* of the second set of decorrelator output signals (which constitute the "external" decorrelator output signals).

It should be noted that the premixer 1720 may perform a linear mixing operation, which may be described by a premixing matrix $M_{pre}$. Moreover, the postmixer 1740 performs a linear mixing (or upmixing) operation, which may be represented by a postmixing matrix $M_{post}$, to derive the N decorrelator output signals 1712*a* to 1712*n* of the second set of decorrelator output signals from the first set of K decorrelator output signals 1732*a* to 1732*k* (i.e., from the output signals of the decorrelator core 1730).

The main idea of the proposed method and apparatus is to reduce the number of input signals to the decorrelators (or to the decorrelator core) from N to K by:

- Premixing the signals (e.g., the rendered audio signals) to lower number of channels with $$\hat{Z}_{mix}=M_{pre}\hat{Z}.$$

- Applying the decorrelation using the available K decorrelators (e.g., of the decorrelator core) with $$\hat{Z}_{mix}^{dec}=\mathrm{Decorr}(\hat{Z}_{mix}).$$

- Up-mixing the decorrelated signals back to N channels with $$W=M_{post}\hat{Z}_{mix}^{dec}.$$

The premixing matrix $M_{pre}$ can be constructed based on the downmix/rendering/correlation/etc information such that the matrix product $(M_{pre}M_{pre}^H)$ becomes well-conditioned (with respect to inversion operation). The postmixing matrix can be computed as $$M_{post}\approx M_{pre}^H(M_{pre}M_{pre}^H)^{-1}.$$

Even though the covariance matrix of the intermediate decorrelated signals $\hat{S}$ (or $\hat{Z}_{pre}^{dec}$) is diagonal (assuming ideal decorrelators), the covariance matrix of the final decorrelated signals W will quite likely not be diagonal anymore when using this kind of a processing. Therefore, the covariance matrix may be to be estimated using the mixing matrices as $$E_W=M_{post}[\mathrm{matdiag}(M_{pre}E_{\hat{Z}}M_{pre}^H)]M_{post}^H$$

The number of used decorrelators (or individual decorrelations), K, is not specified and is dependent on the desired computational complexity and available decorrelators. Its value can be varied from N (highest computational complexity) down to 1 (lowest computational complexity).

The number of input signals to the decorrelator unit, N, is arbitrary and the proposed method supports any number of input signals, independent on the rendering configuration of the system.

For example in applications using 3D audio content, with high number of output channels, depending on the output configuration one possible expression for the premixing matrix $M_{pre}$ is described below.

In the following, it will be described how the premixing, which is performed by the premixer 1720 (and, consequently, the postmixing, which is performed by the postmixer 1740) is adjusted if the decorrelation unit 1700 is used in a multi-channel audio decoder, wherein the decorrelator input signals 1710*a* to 1710*n* of the first set of decorrelator input signals are associated with different spatial positions of an audio scene.

For this purpose, FIG. 18 shows a table representation of loudspeaker positions, which are used for different output formats.

In the table 1800 of FIG. 18, a first column 1810 describes a loudspeaker index number. A second column 1820 describes a loudspeaker label. A third column 1830 describes an azimuth position of the respective loudspeaker, and a fourth column 1832 describes an azimuth tolerance of the position of the loudspeaker. A fifth column 1840 describes an elevation of a position of the respective loudspeaker, and a sixth column 1842 describes a corresponding elevation tolerance. A seventh column 1850 indicates which loudspeakers are used for the output format O-2.0. An eighth column 1860 shows which loudspeakers are used for the output format O-5.1. A ninth column 1864 shows which loudspeakers are used for the output format O-7.1. A tenth column 1870 shows which loudspeakers are used for the output format O-8.1, an eleventh column 1880 shows which loudspeakers are used for the output format O-10.1, and a twelfth column 1890 shows which loudspeakers are used for the output formal O-22.2. As can be seen, two loudspeakers are used for output format O-2.0, six loudspeakers are used for output format O-5.1, eight loudspeakers are used for output format O-7.1, nine loudspeakers are used for output format O-8.1, 11 loudspeakers are used for output format O-10.1, and 24 loudspeaker are used for output format O-22.2.

However, it should be noted that one low frequency effect loudspeaker is used for output formats O-5.1, 0-7.1, O-8.1 and O-10.1, and that two low frequency effect loudspeakers (LFE1, LFE2) are used for output format O-22.2. Moreover, it should be noted that, in an embodiment, one rendered audio signal (for example, one of the rendered audio signals 1582*a* to 1582*n*) is associated with each of the loudspeakers, except for the one or more low frequency effect loudspeakers. Accordingly, two rendered audio signals are associated with the two loudspeakers used according to the O-2.0 format, five rendered audio signals are associated with the five non-low-frequency-effect loudspeakers if the O-5.1 format is used, seven rendered audio signals are associated with seven non-low-frequency-effect loudspeakers if the O-7.1 format is used, eight rendered audio signals are associated with the eight non-low-frequency-effect loudspeakers if the O-8.1 format is used, ten rendered audio signals are associated with the ten non-low-frequency-effect loudspeakers if the O-10.1 format is used, and 22 rendered audio signals are associated with the 22 non-low-frequency-effect loudspeakers if the O-22.2 format is used.

However, it is often desirable to use a smaller number of (individual) decorrelators (of the decorrelator core), as mentioned above. In the following, it will be described how the number of decorrelators can be reduced flexibly when the O-22.2 output format is used by a multi-channel audio decoder, such that there are 22 rendered audio signals 1582*a* to 1582*n* (which may be represented by a matrix $\hat{Z}$, or by a vector $\hat{z}$).

FIGS. 19*a* to 19*g* represent different options for premixing the rendered audio signals 1582*a* to 1582*n* under the assumption that there are N=22 rendered audio signals. For example, FIG. 19*a* shows a table representation of entries of a premixing matrix $M_{pre}$. The rows, labeled with 1 to 11 in FIG. 19*a*, represent the rows of the premixing matrix $M_{pre}$, and the columns, labeled with 1 to 22 are associated with columns of the premixing matrix $M_{pre}$. Moreover, it should be noted that each row of the premixing matrix $M_{pre}$ is associated with one of the K decorrelator input signals 1722*a* to 1722*k* of the second set of decorrelator input signals (i.e., with the input signals of the decorrelator core). Moreover, each column of the premixing matrix $M_{pre}$ is associated with one of the N decorrelator input signals 1710*a* to 1710*n* of the first set of decorrelator input signals, and consequently with one of the rendered audio signals 1582*a* to 1582*n* (since the decorrelator input signals 1710*a* to 1710*n* of the first set of decorrelator input signals are typically identical to the rendered audio signals 1582 to 1582*n* in an embodiment). Accordingly, each column of the premixing matrix $M_{pre}$ is associated with a specific loudspeaker and, consequently, since loudspeakers are associate with spatial positions, with a specific spatial position. A row 1910 indicates to which loudspeaker (and, consequently, to which spatial position) the columns of the premixing matrix $M_{pre}$, are associated (wherein the loudspeaker labels are defined in the column 1820 of the table 1800).

In the following, the functionality defined by the premixing $M_{pre}$ of FIG. 19*a* will be described in more detail. As can be seen, rendered audio signals associated with the speakers (or, equivalently, speaker positions) "CH_M_000" and "CH_L_000" are combined, to obtain a first decorrelator input signal of the second set of decorrelator input signals (i.e., a first downmixed decorrelator input signal), which is indicated by the "1"-values in the first and second column of the first row of the premixing matrix $M_{pre}$. Similarly, rendered audio signals associated with speakers (or, equivalently, speaker positions) "CH_U_000" and "CH_T_000" are combined to obtain a second downmixed decorrelator input signal (i.e., a second decorrelator input signal of the second set of decorrelator input signals). Moreover, it can be seen that the premixing matrix $M_{pre}$ of FIG. 19*a* defines eleven combinations of two rendered audio signals each, such that eleven downmixed decorrelator input signals are derived from 22 rendered audio signals. It can also be seen that four center signals are combined, to obtain two downmixed decorrelator input signals (confer columns 1 to 4 and rows 1 and 2 of the premixing matrix). Moreover, it can be seen that the other downmixed decorrelator input signals are each obtained by combining two audio signals associated with the same side of the audio scene. For example, a third downmixed decorrelator input signal, represented by the third row of the premixing matrix, is obtained by combining rendered audio signals associated with an azimuth position of +135° ("CH_M_L135"; "CH_U_L135"). Moreover, it can be seen that a fourth decorrelator input signal (represented by a fourth row of the premix matrix) is obtained by combining rendered audio signals associated with an azimuth position of −135° ("CH_M_R135"; "CH_U_R135"). Accordingly, each of the downmixed decorrelator input signals is obtained by combining two rendered audio signals associated with same (or similar) azimuth position (or, equivalently, horizontal position), wherein there is typically a combination of signals associated with different elevation (or, equivalently, vertical position).

Taking reference now to FIG. 19*b*, which shows premixing coefficients (entries of the premixing matrix $M_{pre}$) for N=22 and K=10. The structure of the table of FIG. 19*b* is identical to the structure of the table of FIG. 19*a*. However, as can be seen, the premixing matrix $M_{pre}$ according to FIG. 19*b* differs from the premixing matrix $M_{pre}$ of FIG. 19*a* in that the first row describes the combination of four rendered audio signals having channel IDs (or positions) "CH_M_000", "CH_L_000", "CH_U_000" and "CH_T_000". In other words, four rendered audio signals associated with vertically adjacent positions are combined in the premixing in order to reduce the number of necessitated decorrelators (ten decorrelators instead of eleven decorrelators for the matrix according to FIG. 19*a*).

Taking reference now to FIG. 19*c*, which shows premixing coefficients (entries of the premixing matrix $M_{pre}$) for N=22 and K=9, it can be seen, that the premixing matrix $M_{pre}$ according to FIG. 19*c* only comprises nine rows. Moreover, it can be seen from the second row of the premixing matrix $M_{pre}$, of FIG. 19*c* that rendered audio signals associated with channel IDs (or positions) "CH_M_L135", "CH_U_L135", "CH_M_R135" and "CH_U_R135" are combined (in a premixer configured according to the premixing matrix of FIG. 19*c*) to obtain a second downmixed decorrelator input signal (decorrelator input signal of the second set of decorrelator input signals). As can be seen, rendered audio signals which have been combined into separate downmixed decorrelator input signals by the premixing matrices according to FIGS. 19*a* and 19*b* are downmixed into a common downmixed decorrelator input signal according to FIG. 19*c*. Moreover, it should be noted that the rendered audio signals having channel IDs "CH_M_L135" and "CH_U_L135" are associated with identical horizontal positions (or azimuth positions) on the same side of the audio scene and spatially adjacent vertical positions (or elevations), and that the rendered audio signals having channel IDs "CH_M_R135" and "CH_U_R135" are associated with identical horizontal positions (or azimuth positions) on a second side of the audio scene and spatially adjacent vertical positions (or elevations). Moreover, it can be said that the rendered audio signals having channel IDs "CH_M_L135", "CH_U_L135", "CH_M_R135" and "CH_U_R135" are associated with a horizontal pair (or even a horizontal quadruple) of spatial positions comprising a left side position and a right side position. In other words, it can be seen in the second row of the premixing matrix $M_{pre}$ of FIG. 19*c* that two of the four rendered audio signals, which are combined to be decorrelated using a single given decorrelator, are associated with spatial positions on a left side of an audio scene, and that two of the four rendered audio signals which are combined to be decorrelated using the same given decorrelator, are associated with spatial positions on a right side of the audio scene. Moreover, it can be seen that the left sided rendered audio signals (of said four rendered audio signals) are associated with spatial positions which are symmetrical, with respect to a central plane of the audio scene, with the spatial positions associated with the right sided rendered audio signals (of said four rendered audio signal), such that a "symmetrical" quadruple of rendered audio signals are combined by the premixing to be decorrelated using a single (individual) decorrelator.

Taking reference to FIGS. 19*d*, 19*e*, 19*f* and 19*g*, it can be seen that more and more rendered audio signals are combined with decreasing number of (individual) decorrelators (i.e. with decreasing K). As can be seen in FIGS. 19*a* to 19*g*, typically rendered audio signals which are downmixed into two separate downmixed decorrelator input signals are combined when decreasing the number of decorrelators by 1. Moreover, it can be seen that typically such rendered audio signals are combined, which are associated with a "symmetrical quadruple" of spatial positions, wherein, for a comparatively high number of decorrelators, only rendered audio signals associated with equal or at least similar horizontal positions (or azimuth positions) are combined, while for comparatively lower number of decorrelators, rendered audio signals associated with spatial positions on opposite sides of the audio scene are also combined.

Taking reference now to FIGS. 20*a* to 20*d*, 21*a* to 21*c*, 22*a* to 22*b* and 23, it should be noted that similar concepts can also be applied for a different number of rendered audio signals.

For example, FIGS. 20*a* to 20*d* describe entries of the premixing matrix $M_{pre}$ for N=10 and for K between 2 and 5.

Similarly, FIGS. 21*a* to 21*c* describe entries of the premixing matrix $M_{pre}$ for N=8 and K between 2 and 4.

Similarly, FIGS. 21*d* to 21*f* describe entries of the premixing matrix $M_{pre}$ for N=7 and K between 2 and 4.

FIGS. 22*a* and 22*b* show entries of the premixing matrix for N=5 and K=2 and K=3.

Finally, FIG. 23 shows entries of the premixing matrix for N=2 and K=1.

To summarize, the premixing matrices according to FIGS. 19 to 23 can be used, for example, in a switchable manner, in a multi-channel decorrelator which is part of a multichannel audio decoder. The switching between the premixing matrices can be performed, for example, in dependence on a desired output configuration (which typically determines a number N of rendered audio signals) and also in dependence on a desired complexity of the decorrelation (which determines the parameter K, and which may be adjusted, for example, in dependence on a complexity information included in an encoded representation of an audio content).

Taking reference now to FIG. 24, the complexity reduction for the 22.2 output format will be described in more detail. As already outlined above, one possible solution for constructing the premixing matrix and the postmixing matrix is to use the spatial information of the reproduction layout to select the channels to be mixed together and compute the mixing coefficients. Based on their position, the geometrically related loudspeakers (and, for example, the rendered audio signals associated therewith) are grouped together, taking vertical and horizontal pairs, as described in the table of FIG. 24. In other words, FIG. 24 shows, in the form of a table, a grouping of loudspeaker positions, which may be associated with rendered audio signals. For example, a first row 2410 describes a first group of loudspeaker positions, which are in a center of an audio scene. A second row 2412 represents a second group of loudspeaker positions, which are spatially related. Loudspeaker positions "CH_M_L135" and "CH_U_L135" are associated with identical azimuth positions (or equivalently horizontal positions) and adjacent elevation positions (or equivalently, vertically adjacent positions). Similarly, positions "CH_M_R135" and "CH_U_R135" comprise identical azimuth (or, equivalently, identical horizontal position) and similar elevation (or, equivalently, vertically adjacent position). Moreover, positions "CH_M_L135", "CH_U_L135", "CH_M_R135" and "CH_U_R135" form a quadruple of positions, wherein positions "CH_M_L135" and "CH_U_L135" are symmetrical to positions "CH_M_R135"

and "CH_U_R135" with respect to a center plane of the audio scene. Moreover, positions "CH_M_180" and "CH_U_180" also comprise identical azimuth position (or, equivalently, identical horizontal position) and similar elevation (or, equivalently, adjacent vertical position).

A third row 2414 represents a third group of positions. It should be noted that positions "CH_M_L030" and "CH_L_L045" are spatially adjacent positions and comprise similar azimuth (or, equivalently, similar horizontal position) and similar elevation (or, equivalently, similar vertical position). The same holds for positions "CH_M_R030" and "CH_L_R045". Moreover, the positions of the third group of positions form a quadruple of positions, wherein positions "CH_M_L030" and "CH_L_L045" are spatially adjacent, and symmetrical with respect to a center plane of the audio scene, to positions "CH_M_R030" and "CH_L_R045".

A fourth row 2416 represents four additional positions, which have similar characteristics when compared to the first four positions of the second row, and which form a symmetrical quadruple of positions.

A fifth row 2418 represents another quadruple of symmetrical positions "CH_M_L060", "CH_U_L045", "CH_M_R060" and "CH_U_R045".

Moreover, it should be noted that rendered audio signals associated with the positions of the different groups of positions may be combined more and more with decreasing number of decorrelators. For example, in the presence of eleven individual decorrelators in a multi-channel decorrelator, rendered audio signals associated with positions in the first and second column may be combined for each group. In addition, rendered audio signals associated with the positions represented in a third and a fourth column may be combined for each group. Furthermore, rendered audio signals associated with the positions shown in the fifth and sixth column may be combined for the second group. Accordingly, eleven downmix decorrelator input signals (which are input into the individual decorrelators) may be obtained. However, if it is desired to have less individual decorrelators, rendered audio signals associated with the positions shown in columns 1 to 4 may be combined for one or more of the groups. Also, rendered audio signals associated with all positions of the second group may be combined, if it is desired to further reduce a number of individual decorrelators.

To summarize, the signals fed to the output layout (for example, to the speakers) have horizontal and vertical dependencies, that should be preserved during the decorrelation process. Therefore, the mixing coefficients are computed such that the channels corresponding to different loudspeaker groups are not mixed together.

Depending on the number of available decorrelators, or the desired level of decorrelation, in each group first are mixed together the vertical pairs (between the middle layer and the upper layer or between the middle layer and the lower layer). Second, the horizontal pairs (between left and right) or remaining vertical pairs are mixed together. For example, in group three, first the channels in the left vertical pair ("CH_M_L030" and "CH_L_L045"), and in the right vertical pair ("CH_M_R030" and "CH_L_R045"), are mixed together, reducing in this way the number of necessitated decorrelators for this group from four to two. If it is desired to reduce even more the number of decorrelators, the obtained horizontal pair is downmixed to only one channel, and the number of necessitated decorrelators for this group is reduced from four to one.

Based on the presented mixing rules, the tables mentioned above (for example, shown in FIGS. 19 to 23) are derived for different levels of desired decorrelation (or for different levels of desired decorrelation complexity).

16. Compatibility with a Secondary External Renderer/Format Converter

In the case when the SAOC decoder (or, more generally, the multi-channel audio decoder) is used together with an external secondary renderer/format converter, the following changes to the proposed concept (method or apparatus) may be used:

- the internal rendering matrix R (e.g., of the renderer) is set to identity $R=I_{N_{Objects}}$ (when an external renderer is used) or initialized with the mixing coefficients derived from an intermediate rendering configuration (when an external format converter is used).
- the number of decorrelators is reduced using the method described in section 15 with the premixing matrix $M_{pre}$ computed based on the feedback information received from the renderer/format converter (e.g., $M_{pre}=D_{convert}$ where $D_{convert}$ is the downmix matrix used inside the format converter). The channels which will be mixed together outside the SAOC decoder, are premixed together and fed to the same decorrelator inside the SAOC decoder.

Using an external format converter, the SAOC internal renderer will pre-render to an intermediate configuration (e.g., the configuration with the highest number of loudspeakers).

To conclude, in some embodiments an information about which of the output audio signals are mixed together in an external renderer or format converter are used to determine the premixing matrix $M_{pre}$, such that the premixing matrix defines a combination of such decorrelator input signals (of the first set of decorrelator input signals) which are actually combined in the external renderer. Thus, information received from the external renderer/format converter (which receives the output audio signals of the multi-channel decoder) is used to select or adjust the premixing matrix (for example, when the internal rendering matrix of the multi-channel audio decoder is set to identity, or initialized with the mixing coefficients derived from an intermediate rendering configuration), and the external renderer/format converter is connected to receive the output audio signals as mentioned above with respect to the multi-channel audio decoder.

17. Bitstream

In the following, it will be described which additional signaling information can be used in a bitstream (or, equivalently, in an encoded representation of the audio content). In embodiments according to the invention, the decorrelation method may be signaled into the bitstream for ensuring a desired quality level. In this way, the user (or an audio encoder) has more flexibility to select the method based on the content. For this purpose, the MPEG SAOC bitstream syntax can be, for example, extended with two bits for specifying the used decorrelation method and/or two bits for specifying the configuration (or complexity).

FIG. 25 shows a syntax representation of bitstream elements "bsDecorrelationMethod" and "bsDecorrelationLevel", which may be added, for example, to a bitstream portion "SAOCSpecifigConfig( )" or "SAOC3DSpecificConfig( )". As can be seen in FIG. 25, two bits may be used for the bitstream element "bsDecorrelationMethod", and two bits may be used for the bitstream element "bsDecorrelation Level".

FIG. 26 shows, in the form of a table, an association between values of the bitstream variable "bsDecorrelation-Method" and the different decorrelation methods. For example, three different decorrelation methods may be signaled by different values of said bitstream variable. For example, an output covariance correction using decorrelated signals, as described, for example, in section 14.3, may be signaled as one of the options. As another option, a covariance adjustment method, for example, as described in section 14.4.1 may be signaled. As yet another option, an energy compensation method, for example, as described in section 14.4.2 may be signaled. Accordingly, three different methods for the reconstruction of signal characteristics of the output audio signals on the basis of the rendered audio signals and the decorrelated audio signals can be selected in dependence on a bitstream variable.

Energy compensation mode uses the method described in section 14.4.2, limited covariance adjustment mode uses the method described in section 14.4.1, and general covariance adjustment mode uses the method described in section 14.3.

Taking reference now to FIG. 27, which shows, in the form of a table representation, how different decorrelation levels can be signaled by the bitstream variable "bsDecorrelation Level", a method for selecting the decorrelation complexity will be described. In other words, said variable can be evaluated by a multi-channel audio decoder comprising the multi-channel decorrelator described above to decide which decorrelation complexity is used. For example, said bitstream parameter may signal different decorrelation "levels" which may be designated with the values: 0, 1, 2 and 3.

An example of decorrelation configurations (which may, for example, be designated as decorrelation levels") is given in the table of FIG. 27. FIG. 27 shows a table representation of a number of decorrelators for different "levels" (e.g., decorrelation levels) and output configurations. In other words, FIG. 27 shows the number K of decorrelator input signals (of the second set of decorrelator input signals), which is used by the multi-channel decorrelator. As can be seen in the table of FIG. 27, a number of (individual) decorrelators used in the multi-channel decorrelator is switched between 11, 9, 7 and 5 for a 22.2 output configuration, in dependence on which "decorrelation level" is signaled by the bitstream parameter "bsDecorrelation-Level". For a 10.1 output configuration, a selection is made between 10, 5, 3 and 2 individual decorrelators, for an 8.1 configuration, a selection is made between 8, 4, 3 or 2 individual decorrelators, and for a 7.1 output configuration, a selection is made between 7, 4, 3 and 2 decorrelators in dependence on the "decorrelation level" signaled by said bitstream parameter. In the 5.1 output configuration, there are only three valid options for the numbers of individual decorrelators, namely 5, 3, or 2. For the 2.1 output configuration, there is only a choice between two individual decorrelators (decorrelation level 0) and one individual decorrelator (decorrelation level 1).

To summarize, the decorrelation method can be determined at the decoder side based on the computational power and an available number of decorrelators. In addition, selection of the number of decorrelators may be made at the encoder side and signaled using a bitstream parameter.

Accordingly, both the method how the decorrelated audio signals are applied, to obtain the output audio signals, and the complexity for the provision of the decorrelated signals can be controlled from the side of an audio encoder using the bitstream parameters shown in FIG. 25 and defined in more detail in FIGS. 26 and 27.

18. Fields of Application for the Inventive Processing

It should be noted that it is one of the purposes of the introduced methods to restore audio cues, which are of greater importance for human perception of an audio scene. Embodiments according to the invention improve a reconstruction accuracy of energy level and correlation properties and therefore increase perceptual audio quality of the final output signal. Embodiments according to the invention can be applied for an arbitrary number of downmix/upmix channels. Moreover, the methods and apparatuses described herein can be combined with existing parametric source separation algorithms. Embodiments according to the invention allow to control computational complexity of the system by setting restrictions on the number of applied decorrelator functions. Embodiments according to the invention can lead to a simplification of the object-based parametric construction algorithms like SAOC by removing an MPS transcoding step.

19. Encoding/Decoding Environment

In the following, an audio encoding/decoding environment will be described in which concepts according to the present invention can be applied.

A 3D audio codec system, in which concepts according to the present invention can be used, is based on an MPEG-D USAC codec for coding of channel and object signals to increase the efficiency for coding a large amount of objects. MPEG-SAOC technology has been adapted. Three types of renderers perform the tasks of rendering objects to channels, rendering channels to headphones or rendering channels to different loudspeaker setups. When object signals are explicitly transmitted or parametrically encoded using SAOC, the corresponding object metadata information is compressed and multiplexed into the 3D audio stream.

Figure 28:
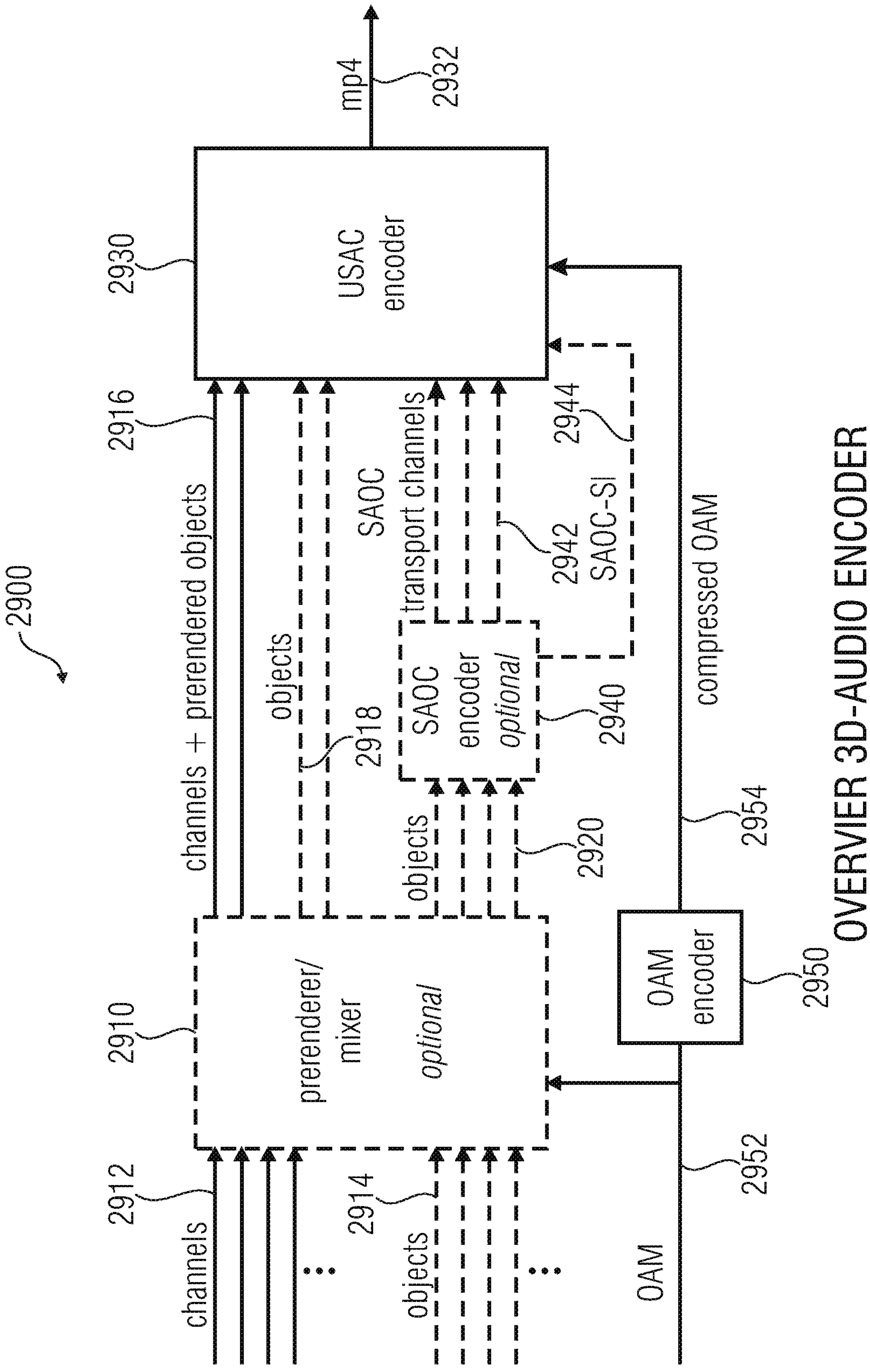
FIG. 28 shows, in the form of a block schematic diagram, an overview over a 3D audio encoder.
Figure 29:
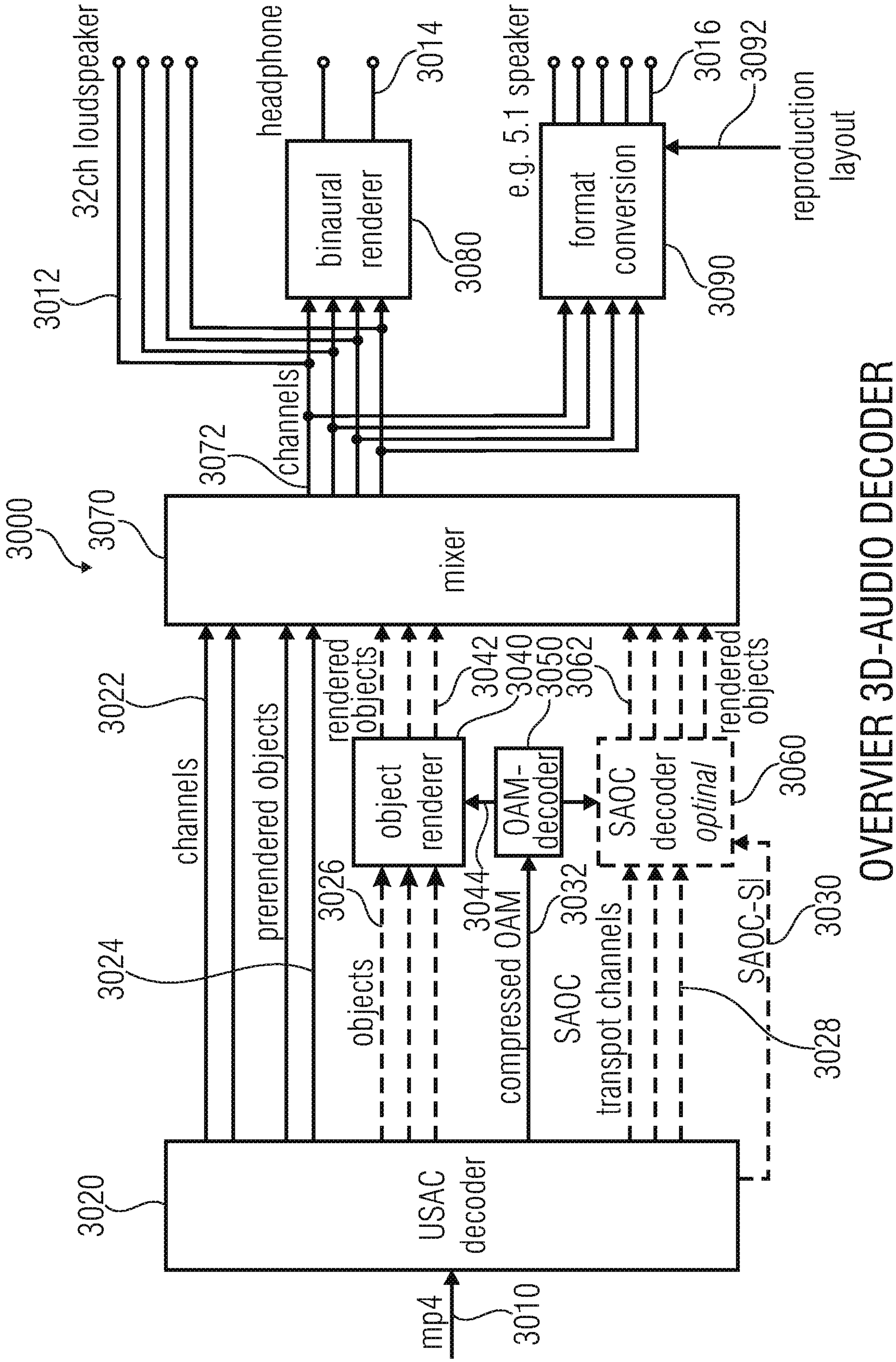
FIG. 29 shows, in the form of a block schematic diagram, an overview over a 3D audio decoder.
Figure 30:
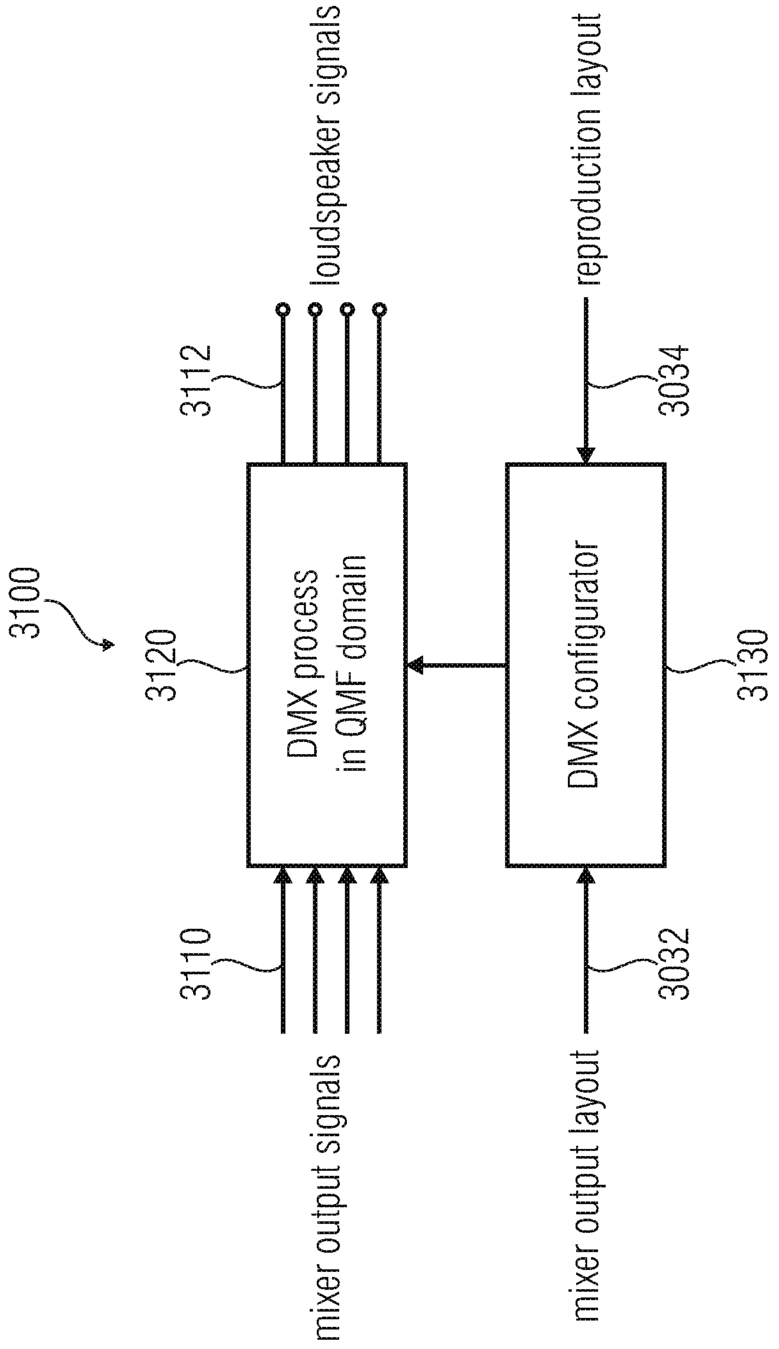
FIG. 30 shows a block schematic diagram of a structure of a format converter.

FIGS. 28, 29 and 30 show the different algorithmic blocks of the 3D audio system.

FIG. 28 shows a block schematic diagram of such an audio encoder, and FIG. 29 shows a block schematic diagram of such an audio decoder. In other words, FIGS. 28 and 29 show the different algorithm blocks of the 3D audio system.

Taking reference now to FIG. 28, which shows a block schematic diagram of a 3D audio encoder 2900, some details will be explained. The encoder 2900 comprises an optional pre-renderer/mixer 2910, which receives one or more channel signals 2912 and one or more object signals 2914 and provides, on the basis thereof, one or more channel signals 2916 as well as one or more object signals 2918, 2920. The audio encoder also comprises an USAC encoder 2930 and optionally an SAOC encoder 2940. The SAOC encoder 2940 is configured to provide one or more SAOC transport channels 2942 and a SAOC side information 2944 on the basis of one or more objects 2920 provided to the SAOC encoder. Moreover, the USAC encoder 2930 is configured to receive the channel signals 2916 comprising channels and pre-rendered objects from the pre-renderer/mixer 2910, to receive one or more object signals 2918 from the pre-renderer/mixer 2910, and to receive one or more SAOC transport channels 2942 and SAOC side information 2944, and provides, on the basis thereof, an encoded representation 2932. Moreover, the audio encoder 2900 also comprises an object metadata encoder 2950 which is configured to receive object metadata 2952 (which may be evaluated by the pre-renderer/mixer 2910) and to encode the object metadata to obtain encoded object metadata 2954. Encoded metadata is also received by the USAC encoder 2930 and used to provide the encoded representation 2932.

Some details regarding the individual components of the audio encoder 2900 will be described below.

Taking reference now to FIG. 29, an audio decoder 3000 will be described. The audio decoder 3000 is configured to receive an encoded representation 3010 and to provide, on the basis thereof, a multi-channel loudspeaker signal 3012, headphone signals 3014 and/or loudspeaker signals 3016 in an alternative format (for example, in a 5.1 format). The audio decoder 3000 comprises a USAC decoder 3020, which provides one or more channel signals 3022, one or more pre-rendered object signals 3024, one or more object signals 3026, one or more SAOC transport channels 3028, a SAOC side information 3030 and a compressed object metadata information 3032 on the basis of the encoded representation 3010. The audio decoder 3000 also comprises an object renderer 3040, which is configured to provide one or more rendered object signals 3042 on the basis of the one or more object signals 3026 and an object metadata information 3044, wherein the object metadata information 3044 is provided by an object metadata decoder 3050 on the basis of the compressed object metadata information 3032. The audio decoder 3000 also comprises, optionally, an SAOC decoder 3060, which is configured to receive the SAOC transport channel 3028 and the SAOC side information 3030, and to provide, on the basis thereof, one or more rendered object signals 3062. The audio decoder 3000 also comprises a mixer 3070, which is configured to receive the channel signals 3022, the pre-rendered object signals 3024, the rendered object signals 3042 and the rendered object signals 3062, and to provide, on the basis thereof, a plurality of mixed channel signals 3072, which may, for example, constitute the multi-channel loudspeaker signals 3012. The audio decoder 3000 may, for example, also comprise a binaural renderer 3080, which is configured to receive the mixed channel signals 3072 and to provide, on the basis thereof, the headphone signals 3014. Moreover, the audio decoder 3000 may comprise a format conversion 3090, which is configured to receive the mixed channel signals 3072 and a reproduction layout information 3092 and to provide, on the basis thereof, a loudspeaker signal 3016 for an alternative loudspeaker setup.

In the following, some details regarding the components of the audio encoder 2900 and of the audio decoder 3000 will be described.

19.1. Pre-Renderer/Mixer

The pre-renderer/mixer 2910 can be optionally used to convert a channel plus object input scene into a channel scene before encoding. Functionally, it may, for example, be identical to the object renderer/mixer described below.

Pre-rendering of objects may, for example, ensure a deterministic signal entropy at the encoder input that is basically independent of the number of simultaneously active object signals.

With pre-rendering of objects, no object metadata transmission is necessitated.

Discrete object signals are rendered to the channel layout that the encoder is configured to use, the weights of the objects for each channel are obtained from the associated object metadata (OAM) 1952.

19.2. USAC Core Codec

The core codec 2930, 3020 for loudspeaker-channel signals, discrete object signals, object downmix signals and pre-rendered signals is based on MPEG-D USAC technology. It handles decoding of the multitude of signals by creating channel- and object-mapping information based on the geometric and semantic information of the input channel and object assignment. This mapping information describes, how input channels and objects are mapped to USAC channel elements (CPEs, SCEs, LFEs) and the corresponding information is transmitted to the decoder.

All additional payloads like SAOC data or object metadata have been passed through extension elements and have been considered in the encoders rate control. Decoding of objects is possible in different ways, dependent on the rate/distortion requirements and the interactivity requirements for the renderer. The following object coding variants are possible:

Pre-rendered objects: object signals are pre-rendered and mixed to the 22.2 channel signals before encoding. The subsequent coding chain sees 22.2 channel signals.

Discrete object waveforms: objects as applied as monophonic waveforms to the encoder. The encoder uses single channel elements SCEs to transmit the objects in addition to the channel signals. The decoded objects are rendered and mixed at the receiver side. Compressed object metadata information is transmitted to the receiver/renderer alongside.

Parametric object waveforms: object properties and their relation to each other are described by means of SAOC parameters. The downmix of the object signals is coded with USAC. The parametric information is transmitted alongside. The number of downmix channels is chosen depending on the number of objects and the overall data rate. Compressed object metadata information is transmitted to the SAOC renderer.

19.3. SAOC

The SAOC encoder 2940 and the SAOC decoder 3060 for object signals are based on MPEG SAOC technology. The system is capable of recreating, modifying and rendering a number of audio objects based on a smaller number of transmitted channels and additional parametric data (object level differences OLDs, inter-object correlations IOCs, downmix gains DMGs). The additional parametric data exhibits a significantly lower data rate than necessitated for transmitted all objects individually, making decoding very efficient. The SAOC encoder takes as input the object/channel signals as monophonic waveforms and outputs the parametric information (which is packed into the 3D audio bitstream 2932, 3010) and the SAOC transport channels (which are encoded using single channel elements and transmitted). The SAOC decoder 3000 reconstructs the object/channel signals from the decoded SAOC transport channels 3028 and parametric information 3030, and generates the output audio scene based on the reproduction layout, the decompressed object metadata information and optionally on the user interaction information.

19.4. Object Metadata Codec

For each object, the associated metadata that specifies the geometrical position and volume of the object in 3D space is efficiently coded by quantization of the object properties in time and space. The compressed object metadata cOAM 2954, 3032 is transmitted to the receiver as side information.

19.5. Object Renderer/Mixer

The object renderer utilizes the decompressed object metadata OAM 3044 to generate object waveforms according to the given reproduction format. Each object is rendered to certain output channels according to its metadata. The output of this block results from the sum of the partial results.

If both channel based content as well as discrete/parametric objects are decoded, the channel based waveforms and the rendered object waveforms are mixed before outputting the resulting waveforms (or before feeding them to a post-processor module like the binaural renderer or the loudspeaker renderer module).

19.6. Binaural Renderer

The binaural renderer module 3080 produces a binaural downmix of the multi-channel audio material, such that each input channel is represented by a virtual sound source. The processing is conducted frame-wise in QMF domain. The binauralization is based on measured binaural room impulse responses.

19.7. Loudspeaker Renderer/Format Conversion

The loudspeaker renderer 3090 converts between the transmitted channel configuration and the desired reproduction format. It is thus called "format converter" in the following. The format converter performs conversions to lower numbers of output channels, i.e. it creates downmixes. The system automatically generates optimized downmix matrices for the given combination of input and output formats and applies these matrices in a downmix process. The format converter allows for standard loudspeaker configurations as well as for random configurations with non-standard loudspeaker positions.

FIG. 30 shows a block schematic diagram of a format converter. In other words, FIG. 30 shows the structure of the format converter.

As can be seen, the format converter 3100 receives mixer output signals 3110, for example the mixed channel signals 3072, and provides loudspeaker signals 3112, for example the speaker signals 3016. The format converter comprises a downmix process 3120 in the QMF domain and a downmix configurator 3130, wherein the downmix configurator provides configuration information for the downmix process 3020 on the basis of a mixer output layout information 3032 and a reproduction layout information 3034.

19.8. General Remarks

Moreover, it should be noted that the concepts described herein, for example, the audio decoder 100, the audio encoder 200, the multi-channel decorrelator 600, the multi-channel audio decoder 700, the audio encoder 800 or the audio decoder 1550 can be used within the audio encoder 2900 and/or within the audio decoder 3000. For example, the audio encoders/decoders mentioned above may be used as part of the SAOC encoder 2940 and/or as a part of the SAOC decoder 3060. However, the concepts mentioned above may also be used at other positions of the 3D audio decoder 3000 and/or of the audio encoder 2900.

Naturally, the methods mentioned above may also be used in concepts for encoding or decoding audio information according to FIGS. 28 and 29.

20. Additional Embodiment 20.1 Introduction

In the following, another embodiment according to the present invention will be described.

Figures 31, 32:
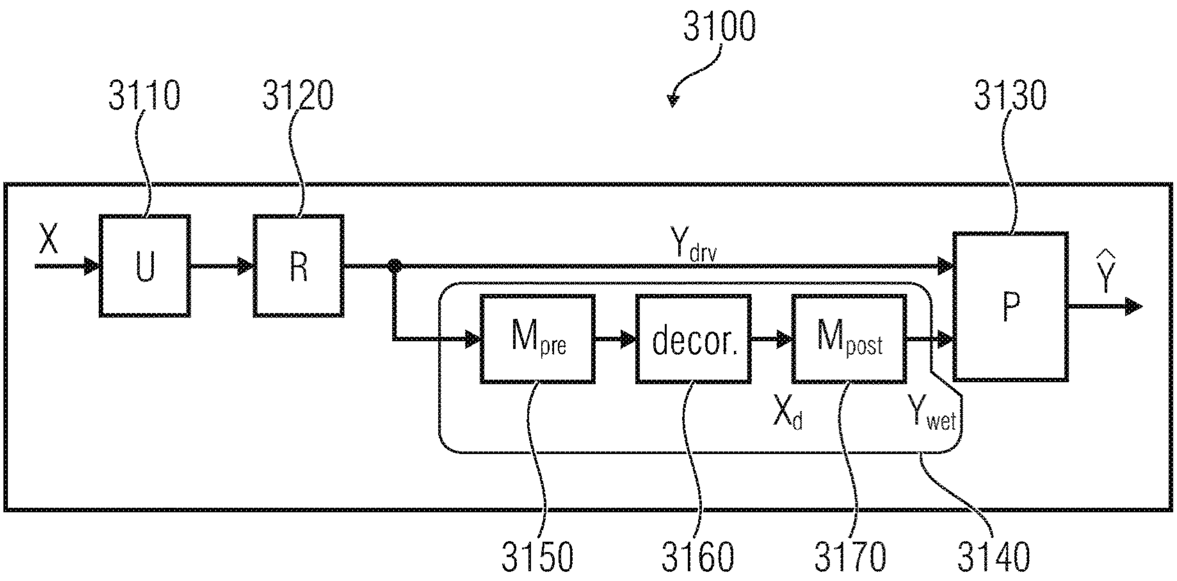
FIG. 31 shows a block schematic diagram of a downmix processor, according to an embodiment of the present invention.
FIG. 32 shows a table representing decoding modes for different number of SAOC downmix objects.

FIG. 31 shows a block schematic diagram of a downmix processor, according to an embodiment of the present invention.

The downmix processor 3100 comprises an unmixer 3110, a renderer 3120, a combiner 3130 and a multi-channel decorrelator 3140. The renderer provides rendered audio signals $Y_{dry}$ to the combiner 3130 and to the multichannel decorrelator 3140. The multichannel decorrelator comprises a premixer 3150, which receives the rendered audio signals (which may be considered as a first set of decorrelator input signals) and provides, on the basis thereof, a premixed second set of decorrelator input signals to a decorrelator core 3160. The decorrelator core provides a first set of decorrelator output signals on the basis of the second set of decorrelator input signals for usage by a postmixer 3170. the postmixer postmixes (or upmixes) the decorrelator output signals provided by the decorrelator core 3160, to obtain a postmixed second set of decorrelator output signals, which is provided to the combiner 3130.

The renderer 3130 may, for example, apply a matrix R for the rendering, the premixer may, for example, apply a matrix $M_{pre}$ for the premixing, the postmixer may, for example, apply a matrix $M_{post}$ for the postmixing, and the combiner may, for example, apply a matrix P for the combining.

It should be noted that the downmix processor 3100, or individual components or functionalities thereof, may be used in the audio decoders described herein. Moreover, it should be noted that the downmix processor may be supplemented by any of the features and functionalities described herein.

20.2 SAOC 3D Processing

The hybrid filterbank described in ISO/IEC 23003-1:2007 is applied. The dequantization of the DMG, OLD, IOC parameters follows the same rules as defined in 7.1.2 of ISO/IEC 23003-2:2010.

20.2.1 Signals and Parameters

The audio signals are defined for every time slot n and every hybrid subband k. The corresponding SAOC 3D parameters are defined for each parameter time slot l and processing band m. The subsequent mapping between the hybrid and parameter domain is specified by Table A.31 of ISO/IEC 23003-1:2007. Hence, all calculations are performed with respect to the certain time/band indices and the corresponding dimensionalities are implied for each introduced variable.

The data available at the SAOC 3D decoder consists of the multi-channel downmix signal X, the covariance matrix E, the rendering matrix R and downmix matrix D.

20.2.1.1 Object Parameters

The covariance matrix E of size N×N with elements $e_{i,j}$ represents an approximation of the original signal covariance matrix E≈SS* and is obtained from the OLD and IOC parameters as:

$$e_{i,j}=\sqrt{\mathrm{OLD}_i\mathrm{OLD}_j}\,\mathrm{IOC}_{i,j}.$$

Here, the dequantized object parameters are obtained as:

$$\mathrm{OLD}_i=D_{OLD}(i,l,m),\mathrm{IOC}_{i,j}=D_{ICO}(i,j,l,m).$$

20.2.1.3 Downmix Matrix

The downmix matrix D applied to the input audio signals S determines the downmix signal as X=DS. The downmix matrix D of size $N_{dmx}$×N is obtained as:

$$D=D_{dmx}D_{premix}.$$

The matrix $D_{dmx}$ and matrix $D_{premix}$ have different sizes depending on the processing mode.

The matrix $D_{dmx}$ is obtained from the DMG parameters as:

$$d_{i,j}=\begin{cases}0, & \text{if no } DMG \text{ data for } (i,\ j) \text{ is present in the bitstream} \\ 10^{0.05DMG_{i,j}}, & \text{otherwise}\end{cases}.$$

Here, the dequantized downmix parameters are obtained as:

$$DMG_{i,j}=D_{DMG}(i,j,l).$$

20.2.1.3.1 Direct Mode

In case of direct mode, no premixing is used. The matrix $D_{premix}$ has the size N×N and is given by: $D_{premix}$=I. The matrix $D_{dmx}$ has size $N_{dmx}$×N and is obtained from the DMG parameters according to 20.2.1.3.

20.2.1.3.2 Premixing Mode

In case of premixing mode the matrix $D_{premix}$ has size $(N_{ch}+N_{premix})$×N and is given by:

$$D_{premix}=\begin{pmatrix} I & 0 \\ 0 & A \end{pmatrix},$$

where the premixing matrix A of size $N_{premix}$ x$N_{obj}$ is received as an input to the SAOC 3D decoder, from the object renderer.

The matrix $D_{dmx}$ has size $N_{dmx}\times(N_{ch}+N_{premix})$ and is obtained from the DMG parameters according to 20.2.1.3

20.2.1.4 Rendering Matrix

The rendering matrix R applied to the input audio signals S determines the target rendered output as Y=RS. The rendering matrix R of size $N_{out}$×N is given by $$R=(R_{ch}R_{obj}),$$

where $R_{ch}$ of size $N_{out}$ x$N_{ch}$ represents the rendering matrix associated with the input channels and $R_{obj}$ of size $N_{out}$ x$N_{obj}$ represents the rendering matrix associated with the input objects.

20.2.1.4 Target Output Covariance Matrix

The covariance matrix c of size $N_{out}\times N_{out}$ with elements $c_{i,j}$ represents an approximation of the target output signal covariance matrix C≈YY* and is obtained from the covariance matrix E and the rendering matrix R:

$$C=RER^*.$$

20.2.2 Decoding

The method for obtaining an output signal using SAOC 3D parameters and rendering information is described. The SAOC 3D decoder my, for example, and consist of the SAOC 3D parameter processor and the SAOC 3D downmix processor.

20.2.2.1 Downmix Processor

The output signal of the downmix processor (represented in the hybrid QMF domain) is fed into the corresponding synthesis filterbank as described in ISO/IEC 23003-1:2007 yielding the final output of the SAOC 3D decoder. A detailed structure of the downmix processor is depicted in FIG. 31

The output signal $\hat{Y}$ is computed from the multi-channel downmix signal X and the decorrelated multi-channel signal $X_d$ as:

$$\hat{Y}=P_{dry}RUX+P_{wet}M_{post}X_d,$$

where U represents the parametric unmixing matrix and is defined in 20.2.2.1.1 and 20.2.2.1.2. The decorrelated multi-channel signal $X_d$ is computed according to 20.2.3.

$$X_d=\text{decorrFunc}(M_{pre}Y_{dry}).$$

The mixing matrix $P=(P_{dry}, P_{wet})$ is described in 20.2.3. The matrices $M_{pre}$ for different output configuration are given in FIGS. 19 to 23 and the matrices $M_{post}$ are obtained using the following equation:

$$M_{post}=M^*_{pre}(M_{pre}M^*_{pre})^{-1}.$$

The decoding mode is controlled by the bitstream element bsNumSaocDmxObjects, as shown in FIG. 32.

20.2.2.1.1 Combined Decoding Mode

In case of combined decoding mode the parametric unmixing matrix u is given by:

$$U=ED^*J.$$

The matrix j of size $N_{dmx}\times N_{dmx}$ is given by $J\approx\Delta^{-1}$ with Δ=DED*.

20.2.2.1.2 Independent Decoding Mode

In case of independent decoding mode the unmixing matrix u is given by:

$$U=\begin{pmatrix} U_{ch} & 0 \\ 0 & U_{obj} \end{pmatrix},$$

where $U_{ch}=E_{ch}D^*_{ch}J_{ch}$ and $U_{obj}=E_{obj}D^*_{obj}J_{obj}$.

The channel based covariance matrix $E_{ch}$ of size $N_{ch}\times N_{ch}$ and the object based covariance matrix $E_{obj}$ of size $N_{obj}\times N_{obj}$ are obtained from the covariance matrix E by selecting only the corresponding diagonal blocks:

$$E=\begin{pmatrix} E_{ch} & E_{ch,obj} \\ E_{obj,ch} & E_{obj} \end{pmatrix},$$

where the matrix $E_{ch,obj}=(E_{obj,ch})^*$ represents the cross-covariance matrix between the input channels and input objects and is not necessitated to be calculated.

The channel based downmix matrix $D_{ch}$ of size $N_{ch}^{dmx}\times N_{ch}$ and the object based downmix matrix $D_{obj}$ of size $N_{obj}^{dmx}\times N_{obj}$ are obtained from the downmix matrix D by selecting only the corresponding diagonal blocks:

$$D=\begin{pmatrix} D_{ch} & 0 \\ 0 & D_{obj} \end{pmatrix}.$$

The matrix $J_{ch}\approx(D_{ch}E_{ch}D^*_{ch})^{-1}$ of size $N_{ch}^{dmx}\times D_{ch}^{dmx}$ is derived accordingly to 20.2.2.1.4 for $\Delta=D_{ch}E_{ch}D^*_{ch}$.

The matrix $J_{obj}\approx(D_{obj}E_{obj}D^*_{obj})^{-1}$ of size $N_{obj}^{dmx}\times N_{obj}^{dmx}$ is derived accordingly to 20.2.2.1.4 for $\Delta=D_{obj}E_{obj}D^*_{obj}$.

20.2.2.1.4 Calculation of Matrix J

The matrix $J\approx\Delta^{-1}$ is calculated using the following equation:

$$J=V\Lambda^{inv}V^*.$$

Here the singular vector V of the matrix Δ are obtained using the following characteristic equation:

$$V\Lambda V=\Delta.$$

The regularized inverse $\Lambda^{inv}$ of the diagonal singular value matrix Λ is computed as $$\lambda_{i,j}^{inv}=\begin{cases} \frac{1}{\lambda_{i,j}}, & \text{if} \quad i=j \text{ and } \lambda_{i,j}\geq T_{reg}^{\Lambda} \\ 0, & \text{otherwise} \end{cases},$$

The relative regularization scalar $T_{reg}^{\Lambda}$ is determined using absolute threshold $T_{reg}$ and maximal value of Λ as $$T_{reg}^{\Lambda}=\max(\lambda_{i,i})T_{reg}, T_{reg}=10^{-2}.$$

20.2.3. Decorrelation

The decorrelated signals $X_d$ are created from the decorrelator described in 6.6.2 of ISO/IEC 23003-1:2007, with bsDecorrConfig==0 and a decorrelator index, X, according to tables in FIGS. 19 to 24. Hence, the decorrFunc( ) denotes the decorrelation process:

$$X_d = \text{decorrFunc}(M_{pre} Y_{dry}).$$

20.2.4. Mixing Matrix P—First Option

The calculation of mixing matrix $P=(P_{dry}\ P_{wet})$ is controlled by the bitstream element bsDecorrelationMethod. The matrix P has size $N_{out} \times 2N_{out}$ and the $P_{dry}$ and $P_{wet}$ have both the size $N_{out} \times N_{out}$.

20.2.4.1 Energy Compensation Mode

The energy compensation mode uses decorrelated signals to compensate for the loss of energy in the parametric reconstruction. The mixing matrices $P_{dry}$ and $P_{wet}$ are given by:

$$P_{dry} = I,$$

$$p_{i,j}^{wet} = \begin{cases} \sqrt{\min\left(\lambda_{Dec}, \max\left(0, \dfrac{C(i,i) - E_Y^{dry}(i,i)}{\max(\varepsilon, E_Y^{wet}(i,i))}\right)\right)} & i = j, \\ 0 & i \neq j. \end{cases}$$

where $\lambda_{Dec}=4$ is a constant used to limit the amount of decorrelated component added to the output signals.

20.2.4.2 Limited Covariance Adjustment Mode

The limited covariance adjustment mode ensures that the covariance matrix of the mixed decorrelated signals $P_{wet} Y_{dry}$ approximates the difference covariance matrix $\Delta_E$: $P_{wet} E_Y^{wet} P^*_{wet} \approx \Delta_E$. The mixing matrices $P_{dry}$ and $P_{wet}$ are defined using the following equations:

$$P_{dry} = I,$$

$$P_{wet} = (V_1 \sqrt{Q_1} V_1^*)(V_2 \sqrt{Q_2^{inv}} V^*_2),$$

where the regularized inverse $Q_2^{inv}$ of the diagonal singular value matrix $Q_2$ is computed as $$Q_2^{inv}(i,j) = \begin{cases} \dfrac{1}{Q_2(i,j)}, & \text{if} \quad i = j \text{ and } Q_2(i,j) \geq T_{reg}^{\wedge}, \\ 0, & \text{otherwise,} \end{cases}$$

The relative regularization scalar $T_{reg}^{\wedge}$ is determined using absolute threshold $T_{reg}$ and maximal value of $Q_2^{inv}$ as $$T_{reg}^{\wedge} = \max(Q_2^{inv}(i,i)) T_{reg}, T_{reg} = 10^{-2}.$$

The matrix $\Delta_E$ is decomposed using the Singular Value Decomposition as:

$$\Delta_E = V_1 Q_1 V^*_1.$$

The covariance matrix of the decorrelated signals $E_Y^{wet}$ is also expressed using Singular Value Decomposition:

$$E_Y^{wet} = V_2 Q_2 V^*_2.$$

20.2.4.3. General Covariance Adjustment Mode

The general covariance adjustment mode ensures that the covariance matrix of the final output signals $\hat{Y}$ ($E_{\hat{Y}} = \hat{Y}\hat{Y}^*$) approximates the target covariance matrix: $E_{\hat{Y}} \approx C$. The mixing matrix P is defined using the following equation:

$$P = (V_1 \sqrt{Q_1} V^*_1) H (V_2 \sqrt{Q_2^{inv}} V^*_2),$$

where the regularized inverse $Q_2^{inv}$ of the diagonal singular value matrix $Q_2$ is computed as $$Q_2^{inv}(i,j) = \begin{cases} \dfrac{1}{Q_2(i,j)}, & \text{if} \quad i = j \text{ and } Q_2(i,j) \geq T_{reg}^{\wedge}, \\ 0, & \text{otherwise,} \end{cases}$$

The relative regularization scalar $T_{reg}^{\wedge}$ is determined using absolute threshold $T_{reg}$ and maximal value of $Q_2^{inv}$ as $$T_{reg}^{\wedge} = \max(Q_2^{inv}(i,i)) T_{reg}, T_{reg} = 10^{-2}.$$

The target covariance matrix c is decomposed using the Singular Value Decomposition as:

$$C = V_1 Q_1 V^*_1.$$

The covariance matrix of the combined signals $E_Y^{com}$ is also expressed using Singular Value Decomposition:

$$E_Y^{com} = V_2 Q_2 V^*_2.$$

The matrix H represents a prototype weighting matrix of size ($N_{out} \times 2N_{out}$) and is given by the following equation:

$$H = \begin{pmatrix} 1/\sqrt{2} & 0 & \cdots & 0 & 1/\sqrt{2} & 0 & \cdots & 0 \\ 0 & 1/\sqrt{2} & \cdots & 0 & 0 & 1/\sqrt{2} & \cdots & 0 \\ \vdots & \vdots & \ddots & 0 & \vdots & \vdots & \ddots & 0 \\ 0 & 0 & \cdots & 1/\sqrt{2} & 0 & 0 & \cdots & 1/\sqrt{2} \end{pmatrix}.$$

20.2.4.4 Introduced Covariance Matrices

The matrix $\Delta_E$ represents the difference between the target output covariance matrix C and the covariance matrix $E_Y^{dry}$ of the parametrically reconstructed signals and is given by:

$$\Delta_E = C - E_Y^{dry}.$$

The matrix $E_Y^{dry}$ represents the covariance matrix of the parametrically estimated signals $E_Y^{dry} \approx Y_{dry} Y^*_{dry}$ and is defined using the following equation:

$$E_Y^{dry} = RUEU^*R^*.$$

The matrix $E_Y^{wet}$ represents the covariance matrix of the decorrelated signals $E_Y^{wet} \approx Y_{wet} Y^*_{wet}$ and is defined using the following equation:

$$E_Y^{wet} = M_{post}[\text{matdiag}(M_{pre} E_Y^{dry} M^*_{pre})] M^*_{post}.$$

Considering the signal $Y_{com}$ consisting of the combination of the parametric estimated and decorrelated signals:

$$Y_{com} = \begin{pmatrix} Y_{dry} \\ Y_{wet} \end{pmatrix},$$

the covariance matrix of $Y_{com}$ is defined by the following equation:

$$E_Y^{com} = \begin{pmatrix} E_Y^{dry} & 0 \\ 0 & E_Y^{wet} \end{pmatrix}.$$

The matrix $\hat{E}_Y^{wet}$ represents, for example, the estimated covariance matrix of the decorrelated signals after the mixing matrix $P_{wet}$ has been applied, and is defined using the following equation:

$$\hat{E}_Y^{wet}=P_{wet}E_Y^{wet}P^*_{wet}.$$

20.2.5. Mixing Matrix P—Second Option

The calculation of mixing matrix $P=[P_{dry}\ A_{wet}P_{wet}]$ is controlled by the bitstream element bsDecorrelationMethod. The matrix P has the size $N_{out}\times 2N_{out}$ and the matrices $P_{dry}$ and $P_{wet}$ have both the size $N_{out}\ xN_{out}$. The limitation matrix $A_{wet}$ of size $N_{out}\ xN_{out}$ is given by:

$$A_{wet}=matdiag\left(\min\left(1,\sqrt{\max\left(0,\lambda_{Dec}\frac{E_Y^{dry}(i,i)}{\max\left(\varepsilon,\hat{E}_Y^{wet}(i,i)\right)}\right)}\right)\right),$$

where the covariance matrices $E_Y^{dry}$, $E_Y^{wet}$ and $\hat{E}_Y^{wet}$ are given, for example, in section 20.2.4.4 and $\lambda_{Dec}=4$ is a constant used to limit the amount of decorrelated component added to the output signals.

20.2.5.1 Energy Compensation Mode

The energy compensation mode uses decorrelated signals to compensate for the loss of energy in the parametric reconstruction. The mixing matrices $P_{dry}$ and $P_{wet}$ are given by:

$$P_{dry}=I,$$

$$p_{i,j}^{wet}=\begin{cases}\sqrt{\max\left(0,\frac{C(i,i)-E_Y^{dry}(i,i)}{\max(\varepsilon,E_Y^{wet}(i,i))}\right)} & i=j,\\ 0 & i\neq j.\end{cases}$$

20.2.5.2 Further Concepts and Details

Regarding further concepts and additional details, reference is also made to sections 20.2.4.2 to 20.2.4.4.

20.3 Remarks Regarding the Notation

It should be noted that different notations are used within the present application. However, it is clear from the context which notation applies to a specific equation.

For example, the mixing matrix is designated with F or $\tilde{F}$ in some parts of the description, while the mixing matrix is designated with P in other parts of the description.

Moreover, a component of the mixing matrix to be applied to a dry signal (or to dry signals) is designated with P in some parts of the description and with $P_{dry}$ in other parts of the description. Similarly, a component of the mixing matrix to be applied to a wet signal (or to wet signals) is designated with M in some parts of the description and with $P_{wet}$ in other parts of the description. Moreover, the covariance matrix $E_W$ of the wet signals (before the mixing step with matrix M) is equal to the covariance matrix $E_Y^{wet}$ of the decorrelated signals.

21. Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[BCC] C. Faller and F. Baumgarte, "Binaural Cue Coding—Part II: Schemes and applications," IEEE Trans. on Speech and Audio Proc., vol. 11, no. 6, November 2003.

[Blauert] J. Blauert, "Spatial Hearing—The Psychophysics of Human Sound Localization", Revised Edition, The MIT Press, London, 1997.

[JSC] C. Faller, "Parametric Joint-Coding of Audio Sources", 120th AES Convention, Paris, 2006.

[ISS1] M. Parvaix and L. Girin: "Informed Source Separation of underdetermined instantaneous Stereo Mixtures using Source Index Embedding", IEEE ICASSP, 2010.

[ISS2] M. Parvaix, L. Girin, J.-M. Brossier: "A watermarking-based method for informed source separation of audio signals with a single sensor", IEEE Transactions on Audio, Speech and Language Processing, 2010.

[ISS3] A. Liutkus and J. Pinel and R. Badeau and L. Girin and G. Richard: "Informed source separation through spectrogram coding and data embedding", Signal Processing Journal, 2011.

[ISS4] A. Ozerov, A. Liutkus, R. Badeau, G. Richard: "Informed source separation: source coding meets source separation", IEEE Workshop on Applications of Signal Processing to Audio and Acoustics, 2011.

[ISS5] S. Zhang and L. Girin: "An Informed Source Separation System for Speech Signals", INTERSPEECH, 2011.

[ISS6] L. Girin and J. Pinel: "Informed Audio Source Separation from Compressed Linear Stereo Mixtures", AES 42nd International Conference: Semantic Audio, 2011.

[MPS] ISO/IEC, "Information technology—MPEG audio technologies—Part 1: MPEG Surround," ISO/IEC JTC1/SC29/WG11 (MPEG) international Standard 23003-1: 2006.

[OCD] J. Vilkamo, T. Bäckström, and A. Kuntz. "Optimized covariance domain framework for time-frequency processing of spatial audio", Journal of the Audio Engineering Society, 2013. in press.

[SAOC1] J. Herre, S. Disch, J. Hilpert, O. Hellmuth: "From SAC To SAOC—Recent Developments in Parametric Coding of Spatial Audio", 22nd Regional UK AES Conference, Cambridge, UK, April 2007.

[SAOC2] J. Engdegård, B. Resch, C. Falch, O. Hellmuth, J. Hilpert, A. Hölzer, L. Terentiev, J. Breebaart, J. Koppens, E. Schuijers and W. Oomen: "Spatial Audio Object Coding (SAOC)—The Upcoming MPEG Standard on Parametric Object Based Audio Coding", 124th AES Convention, Amsterdam 2008.

[SAOC] ISO/IEC, "MPEG audio technologies—Part 2: Spatial Audio Object Coding (SAOC)," ISO/IEC JTC1/SC29/WG11 (MPEG) International Standard 23003-2.

International Patent No. WO/2006/026452, "MULTI-CHANNEL DECORRELATION IN SPATIAL AUDIO CODING" issued on 9 Mar. 2006.

The invention claimed is:

1. A multi-channel audio decoder for providing at least two output audio signals on the basis of an encoded representation, wherein the multi-channel audio decoder comprises a renderer configured to render a plurality of decoded audio signals, which are acquired on the basis of the encoded representation, to a multi-channel target scene in dependence on one or more rendering parameters which define a rendering matrix, to acquire a plurality of rendered audio signals, and wherein the multi-channel audio decoder comprises a decorrelator configured to derive one or more decorrelated audio signals from the rendered audio signals, and wherein the multi-channel audio decoder comprises a combiner configured to combine the rendered audio signals, or a scaled version thereof, with the one or more decorrelated audio signals, to acquire the at least two output audio signals;

wherein the multi-channel audio decoder is configured to acquire the decoded audio signals using a parametric reconstruction;

wherein the decoded audio signals are reconstructed object signals, and wherein the multi-channel audio decoder is configured to derive the reconstructed object signals from one or more downmix signals using a side information.

2. The multi-channel audio decoder according to claim 1, wherein the multi-channel audio decoder is configured to derive un-mixing coefficients from the side information and to apply the un-mixing coefficients to derive the reconstructed object signals from the one or more downmix signals using the un-mixing coefficients.

3. The multi-channel audio decoder according to claim 1, wherein the multi-channel audio decoder is configured to combine the rendered audio signals with the one or more decorrelated audio signals, to at least partially achieve desired correlation characteristics or covariance characteristics of the output audio signals.

4. The multi-channel audio decoder according to claim 1, wherein the multi-channel audio decoder is configured to combine the rendered audio signals with the one or more decorrelated audio signals, to at least partially compensate for an energy loss during a parametric reconstruction of the decoded audio signals, which are rendered to acquire the plurality of rendered audio signals.

5. The multi-channel audio decoder according to claim 1, wherein the multi-channel audio decoder is configured to determine desired correlation characteristics or desired covariance characteristics of the at least two output audio signals, and wherein the multi-channel audio decoder is configured to adjust a combination of the rendered audio signals with the one or more decorrelated audio signals, to acquire the at least two output audio signals, such that correlation characteristics or covariance characteristics of the acquired at least two output audio signals approximate or equal the desired correlation characteristics or desired covariance characteristics.

6. The multi-channel audio decoder according to claim 5, wherein the multi-channel audio decoder is configured to determine the desired correlation characteristics or the desired covariance characteristics in dependence on a rendering information describing a rendering of the plurality of decoded audio signals, which are acquired on the basis of the encoded representation, to acquire the plurality of rendered audio signals.

7. The multi-channel audio decoder according to claim 5, wherein the multi-channel audio decoder is configured to determine the desired correlation characteristics or the desired covariance characteristics in dependence on an object correlation information or an object covariance information describing characteristics of a plurality of audio objects and/or a relationship between a plurality of audio objects.

8. The multi-channel audio decoder according to claim 7, wherein the multi-channel audio decoder is configured to determine the object correlation information or object covariance information on the basis of a side information comprised in the encoded representation.

9. The multi-channel audio decoder according to claim 5, wherein the multi-channel audio decoder is configured to determine actual correlation characteristics or covariance characteristics of the rendered audio signals and the one or more decorrelated audio signals, and to adjust the combination of the rendered audio signals with the one or more decorrelated audio signals, to acquire the output audio signals, in dependence on the actual correlation characteristics or covariance characteristics of the rendered audio signals and the one or more decorrelated audio signals.

10. The multi-channel audio decoder according to claim 1, wherein the combiner is configured to combine the rendered audio signals $\hat{Z}$ with the one or more decorrelated audio signals W, to acquire the at least two output audio signals $\tilde{Z}$ according to $$\tilde{Z}=P\hat{Z}+MW$$

wherein P is a mixing matrix which is applied to the rendered audio signals $\hat{Z}$, and wherein M is a mixing matrix which is applied to the one or more decorrelated audio signals W.

11. The multi-channel audio decoder according to claim 10, wherein the multi-channel audio decoder is configured to adjust at least one out of the mixing matrix P and the mixing matrix M such that correlation characteristics or covariance characteristics of the at least two output audio signals $\tilde{Z}$ approximate or equal desired correlation characteristics or desired covariance characteristics.

12. The multi-channel audio decoder according to claim 10, wherein the multi-channel audio decoder is configured to jointly compute the mixing matrix P and the mixing matrix M.

13. The multi-channel audio decoder according to claim 10, wherein the multi-channel audio decoder is configured to acquire a combined mixing matrix F, with $$F=[P\ M]$$

such that a covariance matrix $E_{\tilde{Z}}$ of the at least two output audio signals $\tilde{Z}$ approximates or equals a desired covariance matrix C.

14. The multi-channel audio decoder according to claim 13, wherein the multi-channel audio decoder is configured to determine the combined mixing matrix F such that the covariance matrix $$E_{\tilde{Z}}=FE_SF^H$$

is equal to the desired covariance matrix $$C=RE_XR^H,$$

wherein $E_s$ is a covariance matrix of a signal S combining the rendered audio signals $\hat{Z}$ and the one or more decorrelated audio signals W, which is defined as $$S=\begin{bmatrix}\hat{Z}\\ W\end{bmatrix},$$

and wherein $E_x$ is an object covariance matrix.

15. The multi-channel audio decoder according to claim 10, wherein the multi-channel audio decoder is configured to set the mixing matrix P to be an identity matrix, or a multiple thereof, and to compute the mixing matrix M.

16. The multi-channel audio decoder according to claim 15, wherein the multi-channel audio decoder is configured to determine the mixing matrix M such that a difference $\Delta_E$ between a desired covariance matrix C and a covariance matrix $E_{\hat{Z}}$, which is defined as $\Delta_E=C-E_{\hat{Z}}$ is equal to, or approximates, a covariance $ME_wM^H$, wherein the desired covariance matrix C is defined as $C=RE_xR^H$, wherein R is a rendering matrix, wherein EX is an object covariance matrix, and wherein $E_w$ is a covariance matrix of the one or more decorrelated signals, and wherein $E_{\hat{Z}}$ is a covariance matrix of the rendered audio signals.

17. The multi-channel audio decoder according to claim 16, wherein the multi-channel audio decoder is configured to determine the mixing matrix M according to $$M=(U\sqrt{T}U^H)(V\sqrt{Q^{-1}}V^H),$$

where the matrices U, T, V and Q are determined using Singular Value Decomposition of the covariance matrices $\Delta_E$ and $E_w$ yielding $$\Delta_E=UTU^H$$

and $$E_w=VQV^H.$$

18. The multi-channel audio decoder according to claim 10, wherein the multi-channel audio decoder is configured to determine the mixing matrices P, M under a restriction that a given rendered audio signal is only mixed with a decorrelated version of the given rendered audio signal itself.

19. The multi-channel audio decoder according to claim 18, wherein the multi-channel audio decoder is configured to combine the rendered audio signals $\hat{Z}$ with the one or more decorrelated audio signals W, to acquire the two or more output audio signals $\tilde{Z}$ according to $$\tilde{Z}=\hat{Z}'MW,$$

wherein M is a diagonal mixing matrix which is applied to the one or more decorrelated audio signals W, and wherein the multi-channel audio decoder is configured to compute diagonal elements of the mixing matrix M such that diagonal elements of a covariance matrix of the two or more output audio signals are equal to desired energies.

20. The multi-channel audio decoder according to claim 19, wherein the multi-channel audio decoder is configured to compute the elements of the mixing matrix M according to $$M(i,j)=\begin{cases}\sqrt{\min\left(\lambda_{Dec},\max\left(0,\frac{C(i,i)-E_{\hat{Z}}(i,i)}{\max(E_W(i,i),\varepsilon)}\right)\right)} & i=j,\\ 0 & i\neq j.\end{cases},$$

wherein the desired covariance matrix C is defined as $$C=RE_xR^H,$$

wherein R is a rendering matrix, wherein EX is an object covariance matrix, wherein $E_w$ is a covariance matrix of the of the one or more decorrelated signals, and wherein $\lambda_{Dec}$ is a threshold value limiting an amount of decorrelation added to the signals.

21. The multi-channel audio decoder according to claim 10, wherein the multi-channel audio decoder is configured to combine the rendered audio signals with the one or more decorrelated audio signals such that only autocorrelation values or autocovariance values of rendered audio signals are modified while cross-correlation values or cross-covariance values are left unchanged.

22. The multi-channel audio decoder according to claim 10, wherein the multi-channel audio decoder is configured to set the mixing matrix P to be an identity matrix, or a multiple thereof, and to compute the mixing matrix M under the restriction that M is a diagonal matrix.

23. The multi-channel audio decoder according to claim 1, wherein the combiner is configured to combine the rendered audio signals $\hat{Z}$ with the one or more decorrelated audio signals W, to acquire the at least two output audio signals $\tilde{Z}$ according to $$\tilde{Z}=A_{dry}P\hat{Z}+MW$$

or according to $$\tilde{Z}=P\hat{Z}+A_{wet}MW$$

or according to $$\tilde{Z}=A_{dry}P\hat{Z}+A_{wet}MW$$

wherein P is a mixing matrix which is applied to the rendered audio signals $\hat{Z}$, and wherein M is a mixing matrix which is applied to the one or more decorrelated audio signals W, wherein $A_{dry}$ is a first correction matrix or a first adjustment matrix, wherein $A_{wet}$ is a second correction matrix or a second adjustment matrix.

24. The multi-channel audio decoder according to claim 23, wherein the multi-channel audio decoder is configured to adjust at least one out of the mixing matrix P and the mixing matrix M such that correlation characteristics or covariance characteristics of the at least two output audio signals $\tilde{Z}$ or of audio signals acquired by a mixing of $\hat{Z}$ and W using P and M approximate or equal desired correlation characteristics or desired covariance characteristics.

25. The multi-channel audio decoder according to claim 23, wherein the multi-channel audio decoder is configured to jointly compute the mixing matrix P and the mixing matrix M.

26. The multi-channel audio decoder according to claim 23, wherein the multi-channel audio decoder is configured to acquire a combined mixing matrix F, with $$F=[P\ M]$$

such that a covariance matrix $E_{\tilde{Z}}$ of the at least two output audio signals $\tilde{Z}$ or a covariance matrix of audio signals acquired by a mixing of $\hat{Z}$ and W using P and M approximates or equals a desired covariance matrix C.

27. The multi-channel audio decoder according to claim 26, wherein the multi-channel audio decoder is configured to determine the combined mixing matrix F such that the covariance matrix $$E_{\tilde{Z}}=FE_SF^H$$

is equal to the desired covariance matrix $$C=RE_XR^H,$$

wherein $E_s$ is a covariance matrix of a signal S combining the rendered audio signals $\hat{Z}$ and the one or more decorrelated audio signals W, which is defined as $$S=\begin{bmatrix}\hat{Z}\\ W\end{bmatrix},$$

and wherein $E_x$ is an object covariance matrix.

28. The multi-channel audio decoder according to claim 23, wherein the multi-channel audio decoder is configured to determine the first correction matrix such that a contribution of the rendered audio signals onto the at least two output audio signals is limited, and/or wherein the multi-channel audio decoder is configured to determine the second correction matrix such that a contribution of the decorrelated audio signals onto the at least two output audio signals is limited.

29. The multi-channel audio decoder according to claim 23, wherein the multi-channel audio decoder is configured to determine the first correction matrix in dependence on properties of the rendered audio signals, and/or in dependence on properties of the one or more decorrelated audio signals, and/or in dependence on properties of desired output audio signals, and/or in dependence on estimated properties of mixed rendered audio signals, and/or in dependence on estimated properties of mixed decorrelated audio signals, such that a contribution of the rendered audio signals onto the two or more output audio signals is limited, and/or wherein the multi-channel audio decoder is configured to determine the second correction matrix in dependence on a properties of the rendered audio signals, and/or in dependence on properties of the one or more decorrelated audio signals, and/or in dependence on properties of desired output audio signals, and/or in dependence on estimated properties of mixed rendered audio signals, and/or in dependence on estimated properties of mixed decorrelated audio signals, such that a contribution of the one or more decorrelated audio signals onto the two or more output audio signals is limited.

30. The multi-channel audio decoder according to claim 29, wherein the properties of the rendered audio signals, and/or of the decorrelated audio signals, and/or of the desired output audio signals, and/or of the mixed rendered audio signals, and/or the mixed decorrelated audio signals are energy properties, or correlation properties, or covariance properties.

31. The multi-channel audio decoder according to claim 23, wherein the multi-channel audio decoder is configured to determine the combined mixing matrix F according to $$F=(U\sqrt{T}U^H)H(V\sqrt{Q^{-1}}V^H),$$

where the matrices U, T, V and Q are determined using Singular Value Decomposition of the covariance matrices $E_s$ and C yielding $$C=UTU^H,$$

and $$E_s=VQV^H,$$

wherein the matrix H is defined as $$H=\begin{bmatrix} a_{1,1} & 0 & \dots & 0 & b_{1,1} & 0 & \dots & 0 \\ 0 & a_{2,2} & \dots & 0 & 0 & b_{2,2} & \dots & 0 \\ \vdots & \vdots & \ddots & \vdots & \vdots & \vdots & \ddots & \vdots \\ 0 & 0 & \dots & a_{N,N} & 0 & 0 & \dots & b_{N,N} \end{bmatrix}$$

wherein $a_{i,i}$ and $b_{i,i}$ are chosen such that $$a_{i,j}^2+b_{i,j}^2=1.$$

32. The multi-channel audio decoder according to claim 1, wherein the combiner is configured to combine the rendered audio signals $\hat{Z}$ with the one or more decorrelated audio signals W, to acquire the output audio signals $\tilde{Z}$ according to $$\tilde{Z}=P\hat{Z}+A_{wet}MW$$

wherein the multi-channel audio decoder is configured to provide the correction matrix $A_{wet}$ such that $A_{wet}$ is a diagonal matrix and such that entries $A_{wet}$ (i, i) of the correction matrix $A_{wet}$ are reduced when compared to normal, unreduced diagonal entries of the correction matrix $A_{wet}$ if a ratio between an intensity ($E_y^{dry}$ (i, i)) of a rendered audio signal and an intensity ($\hat{E}_Y^{wet}$ (i, i)) of a mixed decorrelated audio signal, with mixing matrix M, in an i-th output audio signal would be smaller than a threshold value.

33. The multi-channel audio decoder according to claim 32, wherein the threshold value is a predetermined constant threshold value or wherein the threshold value is time-variant and/or frequency variant in dependence on signal properties, for example, energy properties, correlation properties and/or covariance properties.

34. The multi-channel audio decoder according to claim 1, wherein the combiner is configured to combine the rendered audio signals $\hat{Z}$ with the one or more decorrelated audio signals W, to acquire the two or more output audio signals $\tilde{Z}$ according to $$\tilde{Z}=P\hat{Z}+A_{wet}MW$$

wherein $P=P_{dry}$, wherein $M=P_{wet}$, wherein $$A_{wet}=matdiag\left(\min\left(1,\sqrt{\max\left(0,\lambda_{Dec}\frac{E_Y^{dry}(i,i)}{\hat{E}_Y^{wet}(i,i)}\right)}\right)\right),$$

wherein $E_y^{dry}$ is a covariance matrix of the rendered audio signals $\hat{Z}$, and wherein $\hat{E}_Y^{wet}$ is an estimated covariance matrix of the one or more decorrelated audio signals after the matrix $P_{wet}$ has been applied.

35. The multi-channel audio decoder according to claim 1, wherein the multi-channel audio decoder is configured to consider correlation characteristics or covariance characteristics of the decorrelated audio signals when determining how to combine the rendered audio signals, or the scaled version thereof, with the one or more decorrelated audio signals.

36. The multi-channel audio decoder according to claim 1, wherein the multi-channel audio decoder is configured to mix rendered audio signals and decorrelated audio signals, such that a given output audio signal is provided on the basis of two or more rendered audio signals and at least one decorrelated audio signal.

37. The multi-channel audio decoder according to claim 1, wherein the multi-channel audio decoder is configured to switch between different modes, in which different restrictions are applied for determining how to combine the rendered audio signals, or a scaled version thereof, with the one or more decorrelated audio signals, to acquire the output audio signals.

38. The multi-channel audio decoder according to claim 37, wherein the multi-channel audio decoder is configured to evaluate a bitstream element of the encoded representation indicating which of the three modes for combining the rendered audio signals, or a scaled version thereof, with the one or more decorrelated audio signals is to be used, and to select the mode in dependence on said bitstream element.

39. The multi-channel audio decoder according to claim 1, wherein the multi-channel audio decoder is configured to switch among a first mode, in which a mixing between different rendered audio signals is allowed when combining the rendered audio signals, or a scaled version thereof, with the one or more decorrelated audio signals, a second mode in which no mixing between different rendered audio signals is allowed when combining the rendered audio signals, or a scaled version thereof, with the one or more decorrelated audio signals, and in which it is allowed that a given decorrelated signal is combined, with same or different scaling, with a plurality of rendered audio signals, or a scaled version thereof, in order to adjust cross-correlation characteristics or cross-covariance characteristics of the output audio signals, and a third mode in which no mixing between different rendered audio signals is allowed when combining the rendered audio signals, or a scaled version thereof, with the one or more decorrelated audio signals, and in which it is not allowed that a given decorrelated signal is combined with rendered audio signals other than a rendered audio signal from which the given decorrelated signal is derived.

40. A method for providing at least two output audio signals on the basis of an encoded representation, the method comprising:

rendering a plurality of decoded audio signals, which are acquired on the basis of the encoded representation, to a multi-channel target scene in dependence on one or more rendering parameters which define a rendering matrix, to acquire a plurality of rendered audio signals, deriving one or more decorrelated audio signals from the rendered audio signals, and combining the rendered audio signals, or a scaled version thereof, with the one or more decorrelated audio signals, to acquire the output audio signals;

wherein the decoded audio signals, which are rendered to acquire the plurality of rendered audio signals, are acquired using a parametric reconstruction;

wherein the decoded audio signals are reconstructed object signals; and wherein the reconstructed object signals are derived from one or more downmix signals using a side information.

41. A non-transitory digital storage medium comprising a computer program for performing the method according to claim 40 when the computer program runs on a computer.

42. A multi-channel audio decoder for providing at least two output audio signals on the basis of an encoded representation, wherein the multi-channel audio decoder comprises a renderer configured to render a plurality of decoded audio signals, which are acquired on the basis of the encoded representation, to a multi-channel target scene in dependence on one or more rendering parameters which define a rendering matrix, to acquire a plurality of rendered audio signals, and wherein the multi-channel audio decoder comprises a decorrelator configured to derive one or more decorrelated audio signals from the rendered audio signals, and wherein the multi-channel audio decoder comprises a combiner configured to combine the rendered audio signals, or a scaled version thereof, with the one or more decorrelated audio signals, to acquire the at least two output audio signals;

wherein the multi-channel audio decoder is configured to acquire the decoded audio signals using a parametric reconstruction;

wherein the decoded audio signals are reconstructed object signals, and wherein the multi-channel audio decoder is configured to derive the reconstructed object signals from one or more downmix signals using a side information;

wherein one of the rendered audio signals is associated with each of a plurality of loudspeakers associated with the multi-channel target scene, except for the one or more low frequency effect loudspeakers.

43. A multi-channel audio decoder for providing at least two output audio signals on the basis of an encoded representation, wherein the multi-channel audio decoder comprises a renderer configured to render a plurality of decoded audio signals, which are acquired on the basis of the encoded representation, to a multi-channel target scene in dependence on one or more rendering parameters which define a rendering matrix, to thereby acquire a plurality of rendered audio signals, wherein the multi-channel audio decoder comprises a decorrelator configured to derive one or more decorrelated audio signals from the rendered audio signals, wherein the multi-channel audio decoder comprises a combiner configured to combine the rendered audio signals, or a scaled version thereof, with the one or more decorrelated audio signals, to acquire the at least two output audio signals, wherein the multi-channel audio decoder is configured to acquire the decoded audio signals using a parametric reconstruction, wherein the decoded audio signals are reconstructed object signals, wherein the multi-channel audio decoder is configured to derive the reconstructed object signals from one or more downmix signals using a side information, wherein each of the rendered audio signals is individually associated with a different loudspeaker of a plurality of loudspeakers associated with the multi-channel target scene, wherein each of the output audio signals is individually associated with a different loudspeaker of the plurality of loudspeakers associated with the multi-channel target scene, and wherein a number of rendered audio signals provided by the renderer is equal to a number of the output audio signals.

44. A multi-channel audio decoder for providing at least two output audio signals on the basis of an encoded representation, wherein the multi-channel audio decoder comprises a renderer configured to render a plurality of decoded audio signals, which are acquired on the basis of the encoded representation, to a multi-channel target scene in dependence on one or more rendering parameters which define a rendering matrix, to acquire a plurality of rendered audio signals, and wherein the multi-channel audio decoder comprises a decorrelator configured to derive one or more decorrelated audio signals from the rendered audio signals, and wherein the multi-channel audio decoder comprises a combiner configured to combine the rendered audio signals, or a scaled version thereof, with the one or more decorrelated audio signals, to acquire the at least two output audio signals;

wherein the multi-channel audio decoder is configured to acquire the decoded audio signals using a parametric reconstruction;

wherein the decoded audio signals are reconstructed object signals, and wherein the multi-channel audio decoder is configured to derive the reconstructed object signals from one or more downmix signals using a side information;

wherein each of the rendered audio signals is associated with a different loudspeaker of a plurality of loudspeakers ef associated with the multi-channel target scene;

wherein there are more decoded audio signals which are input into the renderer than rendered audio signals.

45. A multi-channel audio decoder for providing at least two output audio signals on the basis of an encoded representation, wherein the multi-channel audio decoder comprises a renderer configured to render a plurality of decoded audio signals, which are acquired on the basis of the encoded representation, to a multi-channel target scene, which is defined by a loudspeaker configuration, in dependence on one or more rendering parameters which define a rendering matrix, to acquire a plurality of rendered audio signals that are rendered to the target scene, and wherein the multi-channel audio decoder comprises a decorrelator configured to derive one or more decorrelated audio signals from the rendered audio signals, and wherein the multi-channel audio decoder comprises a combiner configured to combine the rendered audio signals, or a scaled version thereof, with the one or more decorrelated audio signals, to acquire the at least two output audio signals;

wherein the multi-channel audio decoder is configured to acquire the decoded audio signals using a parametric reconstruction;

wherein the decoded audio signals are reconstructed object signals, and wherein the multi-channel audio decoder is configured to derive the reconstructed object signals from one or more downmix signals using a side information;

wherein each of the rendered audio signals is associated with a different loudspeaker of a plurality of loudspeakers associated with the multi-channel target scene;

wherein a number of decoded audio signals which are input into the renderer is larger than a number of the rendered audio signals; and wherein there is a one-to-one association between the rendered audio signals and corresponding loudspeaker positions within the multi-channel target scene, except for one or more low-frequency-effect loudspeakers.

46. A multi-channel audio decoder for providing at least two output audio signals on the basis of an encoded representation, wherein the multi-channel audio decoder comprises a renderer configured to render a plurality of decoded audio signals, which are acquired on the basis of the encoded representation, to a final multi-channel target scene, which is defined by a loudspeaker configuration, in dependence on one or more rendering parameters which define a rendering matrix, to acquire a plurality of rendered audio signals that are rendered to the multi-channel target scene, and wherein the multi-channel audio decoder comprises a decorrelator configured to derive one or more decorrelated audio signals from the rendered audio signals, which are obtained as a final result of the rendering, and wherein the multi-channel audio decoder comprises a combiner configured to combine the rendered audio signals, or a scaled version thereof, with the one or more decorrelated audio signals, to acquire the at least two output audio signals, wherein correlation characteristics or covariance characteristics of the at least two output audio signals are adjusted by adding the one or more decorrelated signals after the rendering, not by adding decorrelated signals before the rendering or during the rendering;

wherein the multi-channel audio decoder is configured to acquire the decoded audio signals using a parametric reconstruction;

wherein the decoded audio signals are reconstructed object signals, and wherein the multi-channel audio decoder is configured to derive the reconstructed object signals from one or more downmix signals using a side information;

wherein each of the rendered audio signals is individually associated with a different loudspeaker of a plurality of loudspeakers of the final multi-channel target scene;

wherein a number of decoded audio signals which are input into the renderer is larger than a number of the rendered audio signals; and wherein there is a one-to-one association between the rendered audio signals and corresponding loudspeaker positions associated with the multi-channel target scene, except for one or more low-frequency-effect loudspeakers.

47. A multi-channel audio decoder for providing at least two output audio signals on the basis of an encoded representation, wherein the multi-channel audio decoder is configured to derive reconstructed object signals from one or more downmix signals using a side information and using a parametric reconstruction;

wherein the multi-channel audio decoder comprises a renderer configured to render the reconstructed object signals, which are acquired on the basis of the encoded representation, to a multi-channel target scene, which is defined by a loudspeaker configuration, in dependence on one or more rendering parameters which define a rendering matrix, to acquire a plurality of rendered audio signals that are rendered to the multi-channel target scene, wherein a number of reconstructed object signals which are input into the renderer is larger than a number of the rendered audio signals; and wherein each of the rendered audio signals is individually associated with a different loudspeaker of a plurality of loudspeakers associated with the multi-channel target scene, wherein there is a one-to-one association between the rendered audio signals and corresponding loudspeaker positions associated with the multi-channel target scene, except for one or more low-frequency-effect loudspeakers; and wherein the multi-channel audio decoder comprises a decorrelator configured to derive one or more decorrelated audio signals from the rendered audio signals, which are obtained as a final result of the rendering, and wherein the multi-channel audio decoder comprises a combiner configured to combine the rendered audio signals, or a scaled version thereof, with the one or more decorrelated audio signals, to acquire the at least two output audio signals, wherein the at least two output audio signals are associated with the loudspeaker positions associated with the multi-channel target scene;

wherein correlation characteristics or covariance characteristics of the at least two output audio signals are adjusted by adding the one or more decorrelated signals after the rendering, not by adding decorrelated signals before the rendering or during the rendering.

* * * * *